(12) United States Patent
Grube et al.

(10) Patent No.: US 9,203,902 B2
(45) Date of Patent: Dec. 1, 2015

(54) SECURELY AND RELIABLY STORING DATA IN A DISPERSED STORAGE NETWORK

(71) Applicant: CLEVERSAFE, INC., Chicago, IL (US)

(72) Inventors: Gary W. Grube, Barrington Hills, IL (US); Timothy W. Markison, Mesa, AZ (US)

(73) Assignee: CLEVERSAFE, INC., Chicago, IL (US)

( * ) Notice: Subject to any disclaimer, the term of this patent is extended or adjusted under 35 U.S.C. 154(b) by 332 days.

(21) Appl. No.: 13/707,153

(22) Filed: Dec. 6, 2012

(65) Prior Publication Data
US 2013/0198317 A1    Aug. 1, 2013

Related U.S. Application Data

(60) Provisional application No. 61/593,126, filed on Jan. 31, 2012.

(51) Int. Cl.
| | |
|---|---|
| *G06F 15/167* | (2006.01) |
| *H04L 29/08* | (2006.01) |
| *G06F 11/20* | (2006.01) |
| *G06F 11/14* | (2006.01) |

(Continued)

(52) U.S. Cl.
CPC .............. *H04L 67/1097* (2013.01); *G06F 9/50* (2013.01); *G06F 11/1096* (2013.01); *G06F 11/14* (2013.01); *G06F 11/2053* (2013.01); *G06F 11/2094* (2013.01); *G06F 11/1092* (2013.01)

(58) Field of Classification Search
CPC . G06F 11/1076; G06F 11/1662; G06F 11/08; G06F 11/00; G06F 11/2053; H04L 67/1097
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |

(Continued)

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

(Continued)

*Primary Examiner* — Yves Dalencourt
(74) *Attorney, Agent, or Firm* — Garlick & Markison; Timothy W. Markison

(57) ABSTRACT

A method begins by ingesting distributed storage (DS) units of a set of DS units storing respective portions of data. The method continues with each of the ingesting DS units generating first respective partial redundancy data and second respective partial redundancy data, sending the first respective partial redundancy data to a first redundancy DS unit of the set of DS units, and sending the second respective partial redundancy data to a second redundancy DS unit. The method continues with the first redundancy DS unit generating first respective redundancy data based on the first respective partial redundancy data of each of the ingesting DS units and storing the first respective redundancy data. The method continues with the second redundancy DS unit generating second respective redundancy data based on the second respective partial redundancy data of each of the ingesting DS units and storing the second respective redundancy data.

13 Claims, 57 Drawing Sheets

(51) Int. Cl.
*G06F 9/50* (2006.01)
*G06F 11/10* (2006.01)

(56) References Cited

U.S. PATENT DOCUMENTS

| | | | |
|---|---|---|---|
| 5,671,349 A * | 9/1997 | Hashemi et al. | 714/6.12 |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,596,570 B1 * | 9/2009 | Emigh et al. | 1/1 |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner

DST allocation info 242  |  data partition info 320: [w] data ID;  No. of partitions;  Addr. info for each partition;  format conversion indication task execution info 322

| task 326 | task ordering 328 | data partition 330 | set of DT EX mods 332 | Name 334 | intermediate result info 324 ||||
|---|---|---|---|---|---|---|---|---|
| | | | | | interm. result processing 336 | scratch pad storage 338 | intermediate result storage 340 ||
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 2_3, 2_4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 2_6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 2_3, 2_4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 2_3, 2_4_2, & 5_2 | R3-2 | DST unit 5 | DST unit 5 | DST units 5,6, 1-3 |

FIG. 32

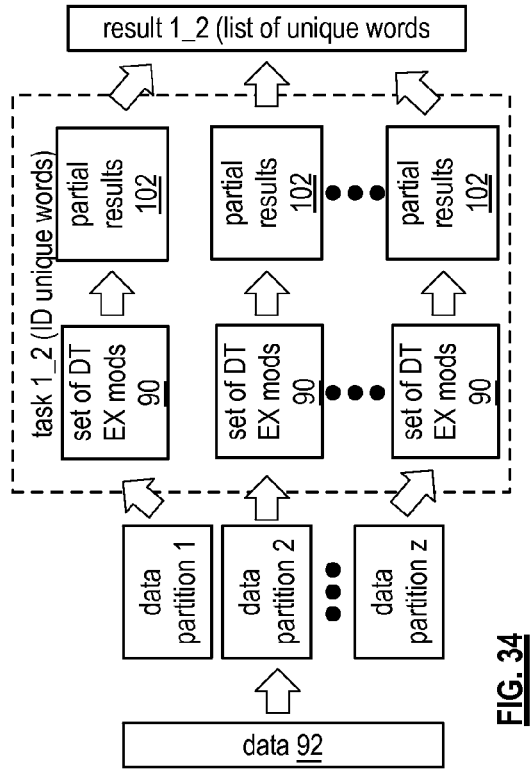
FIG. 34
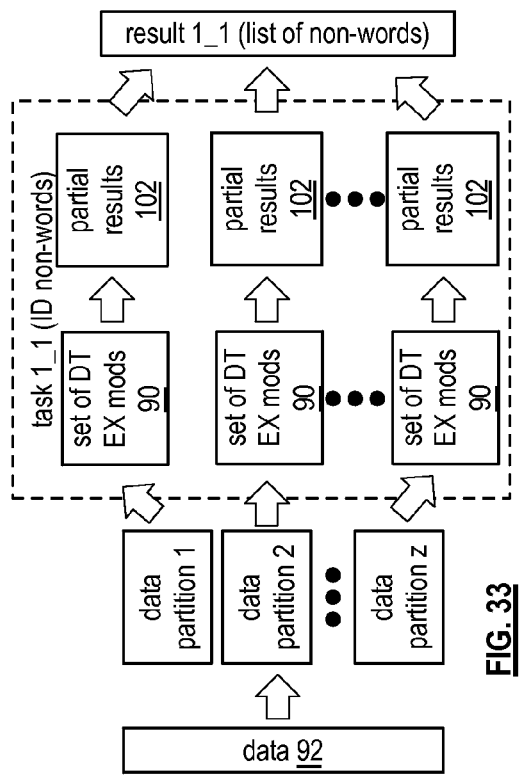
FIG. 33
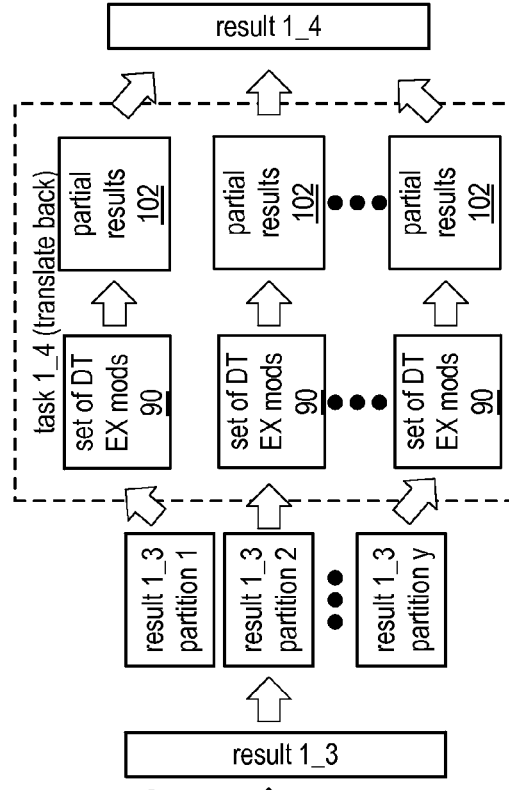
FIG. 35
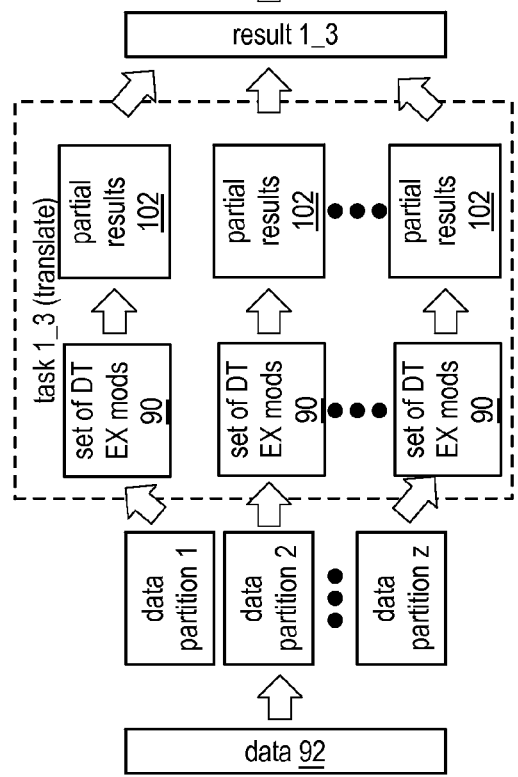

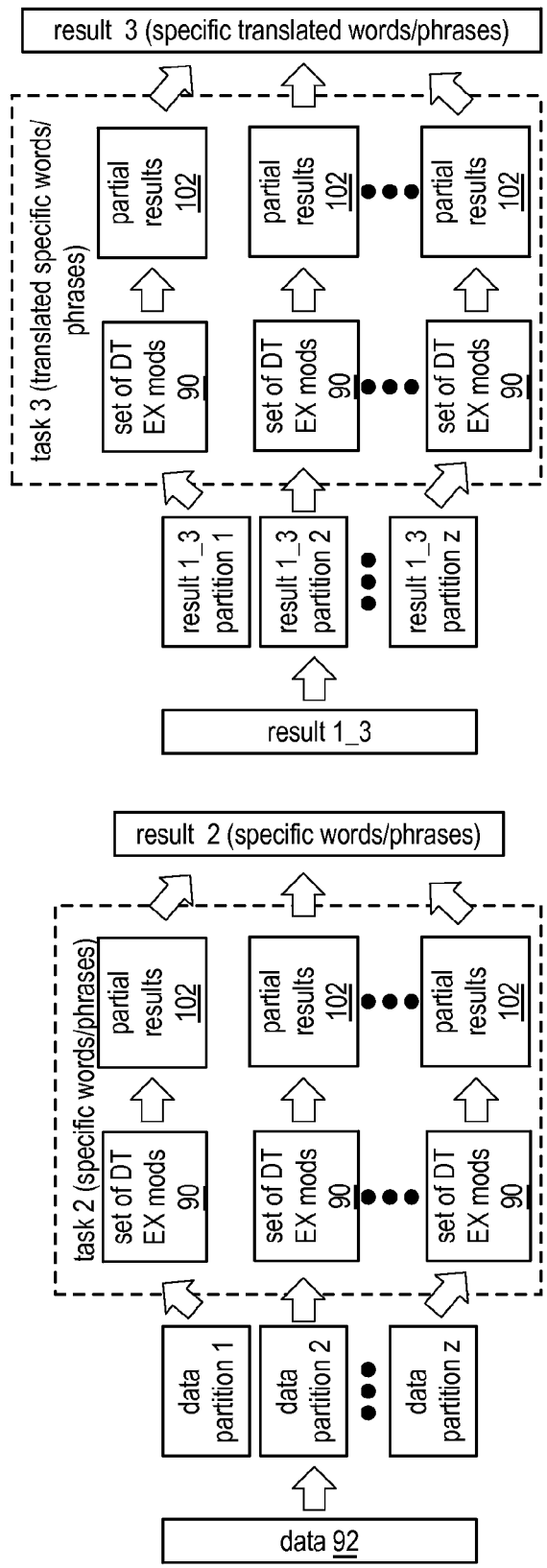
FIG. 38
FIG. 37
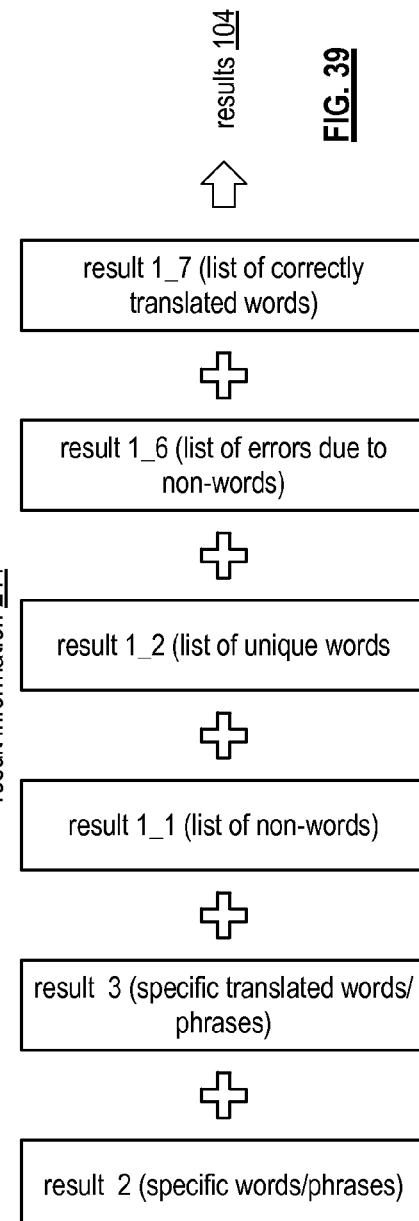
FIG. 39

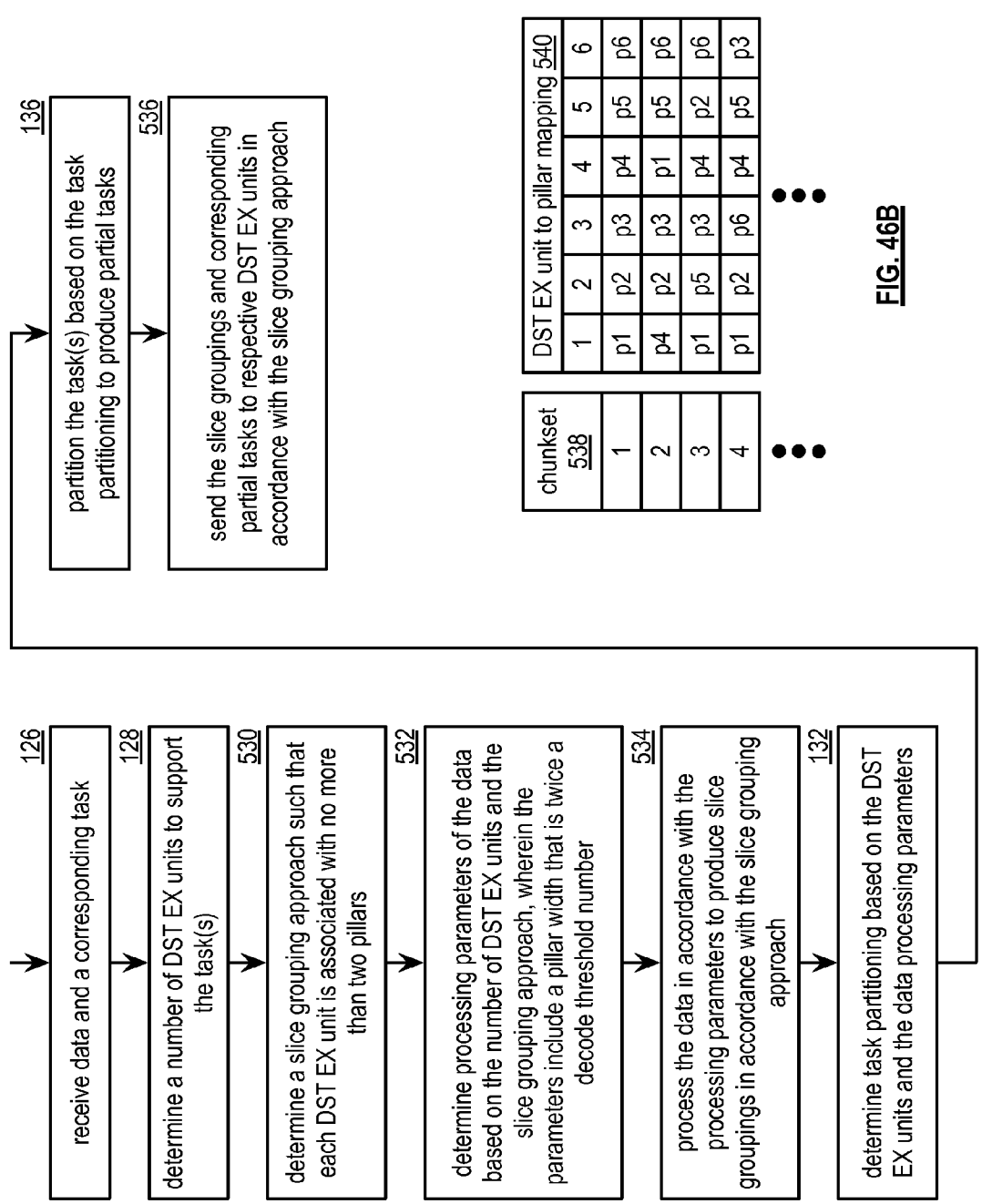

SECURELY AND RELIABLY STORING DATA IN A DISPERSED STORAGE NETWORK

CROSS REFERENCE TO RELATED PATENTS

This patent application is claiming priority under 35 USC §119 to a provisionally filed patent application entitled REDISTRIBUTING DATA IN A DISTRIBUTED STORAGE AND TASK NETWORK having a provisional filing date of Jan. 31, 2012, and a provisional Ser. No. 61/593,126.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computer networks and more particularly to dispersed storage of data and distributed task processing of data.

2. Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 46A is a flowchart illustrating an example of determining a slice grouping in accordance with the present invention;

FIG. 46B is a diagram illustrating an example of a dispersed storage and task execution unit to pillar mapping in accordance with the present invention;

DETAILED DESCRIPTION OF THE INVENTION

Figure 1:
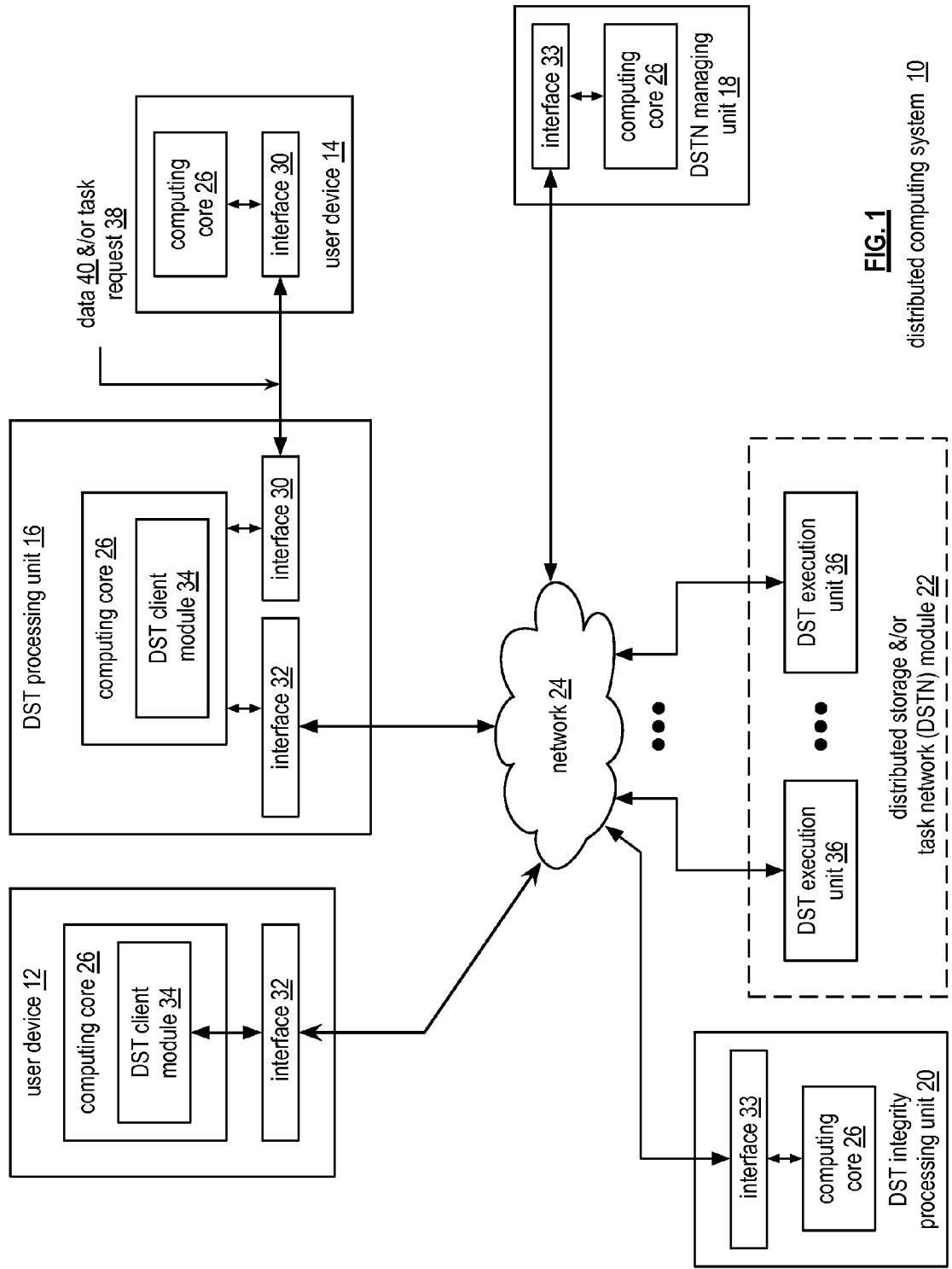
FIG. 1 is a schematic block diagram of an embodiment of a distributed computing system in accordance with the present invention.

FIG. 1 is a schematic block diagram of an embodiment of a distributed computing system 10 that includes user devices 12 and/or user devices 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interfaces 30 support a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g. or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
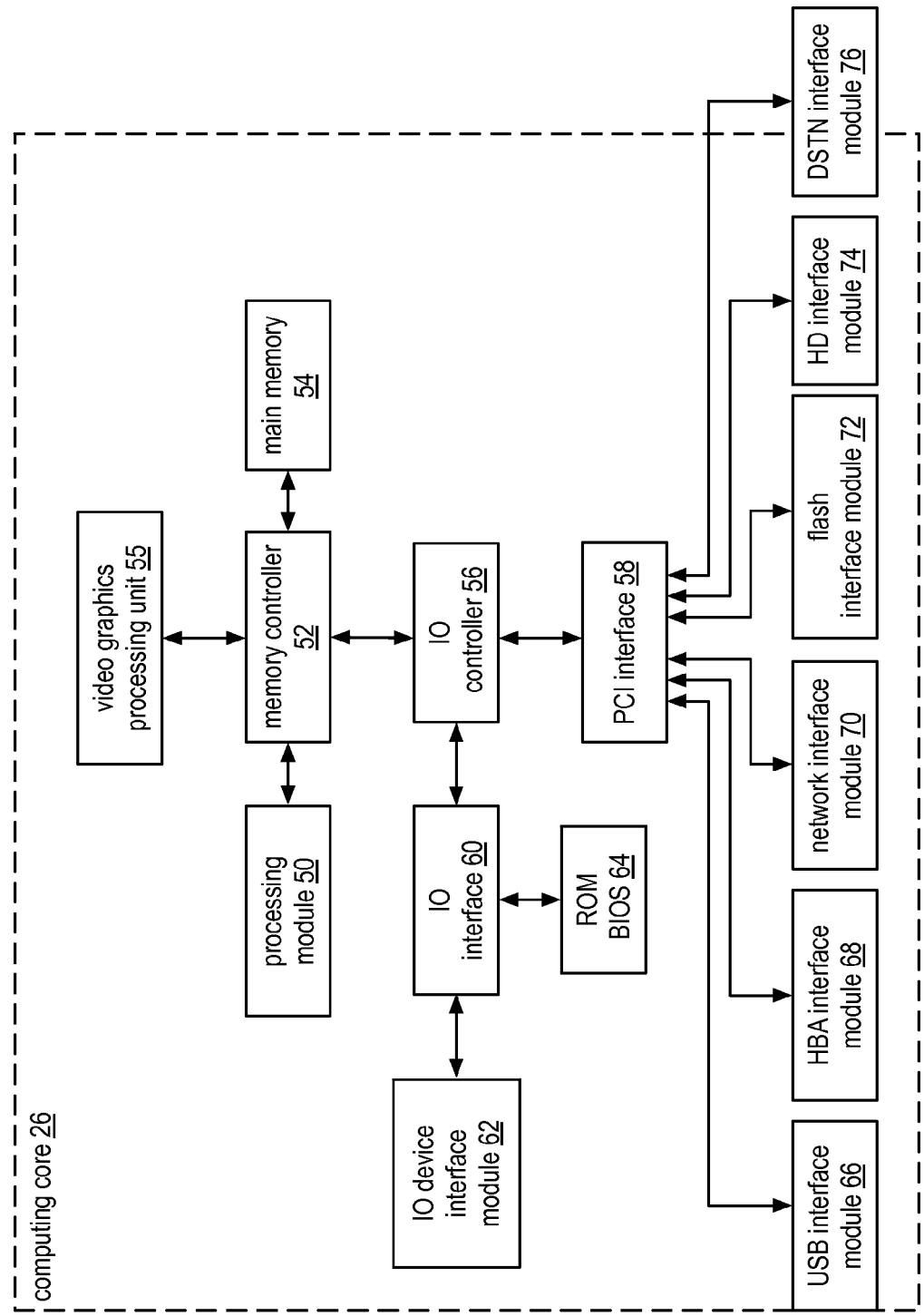
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
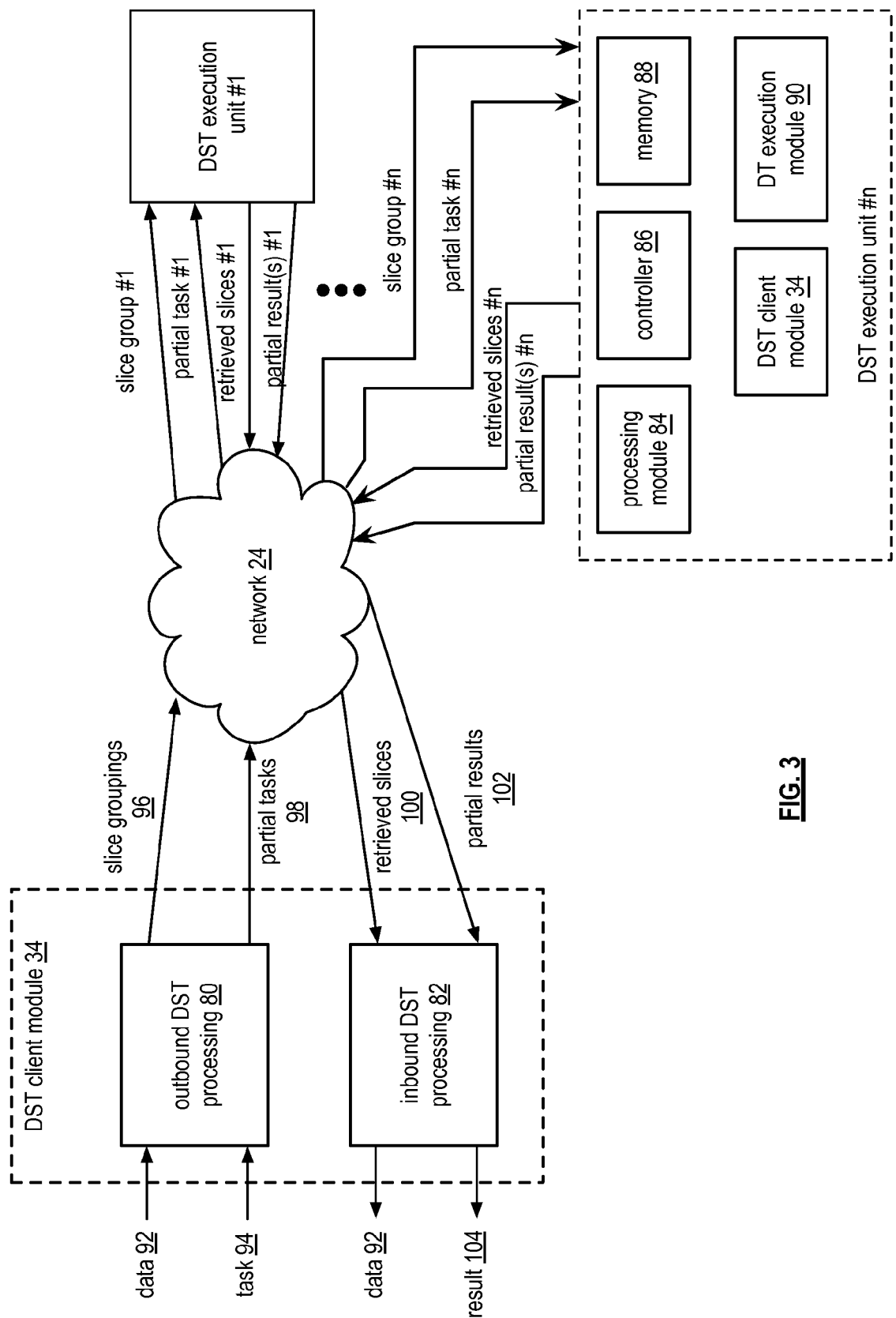
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terra-Bytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22. For example, the outbound DST processing section 80 sends slice group 1 and partial task 1 to DST execution unit 1. As another example, the outbound DST processing section 80 sends slice group #n and partial task #n to DST execution unit #n.

Each DST execution unit 36 performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units 36 send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
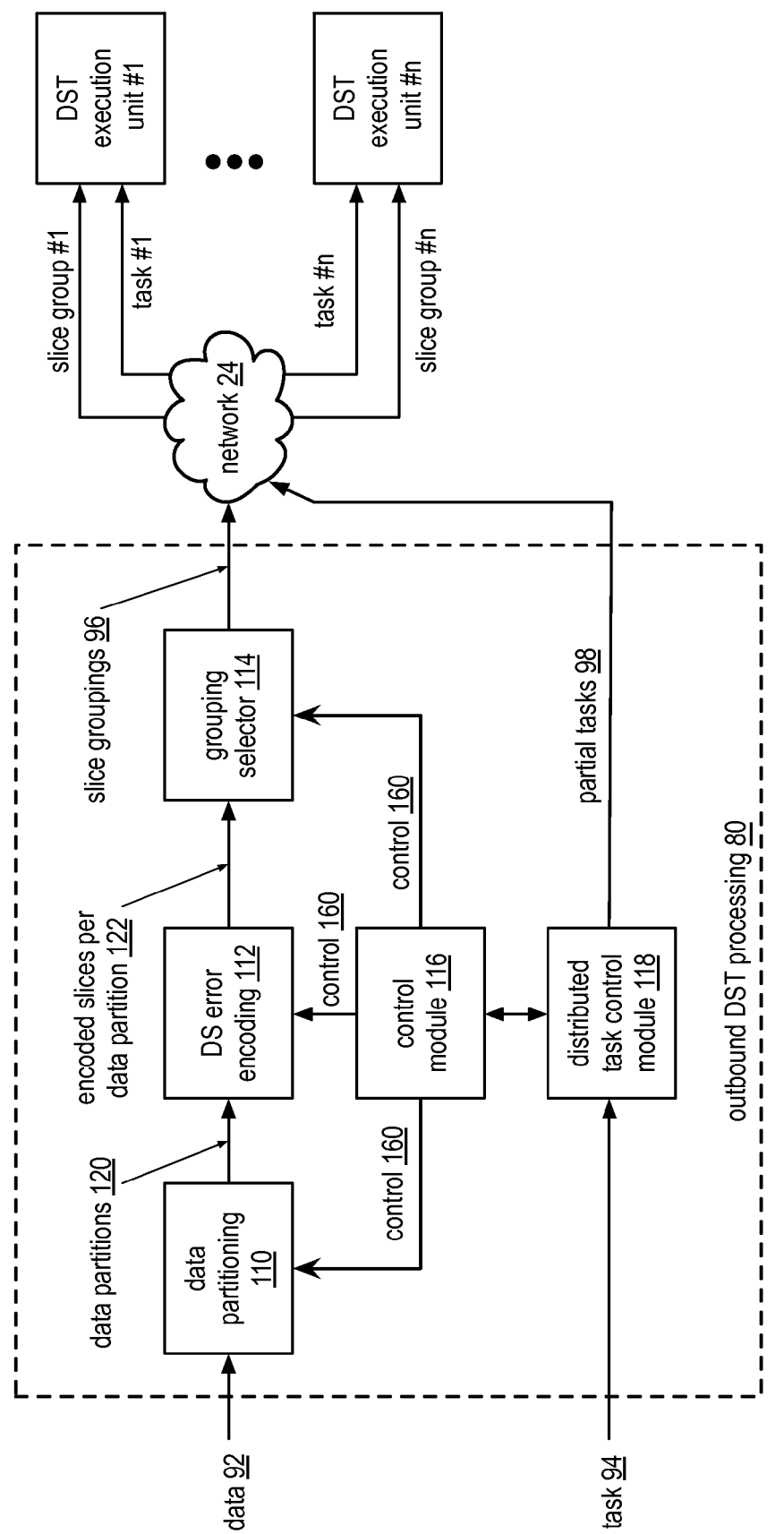
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terra-Bytes) into 100,000 data segments, each being 1 Giga-Byte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phase and a second set of partial tasks for finding and counting the second phrase. The distributed task control module 118 sends respective first and/or second partial tasks 98 to each DST execution unit 36.

Figure 5:
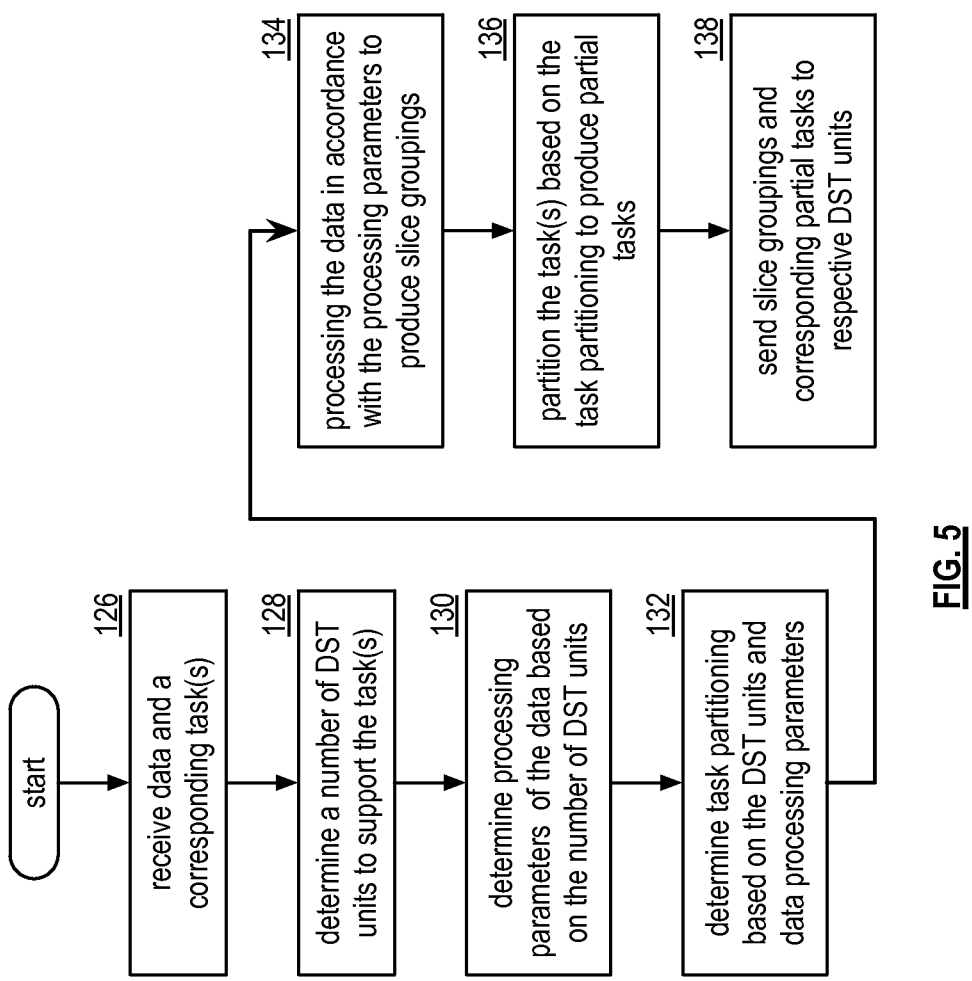
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if, the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or and the other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to the selected DST units.

Figure 6:
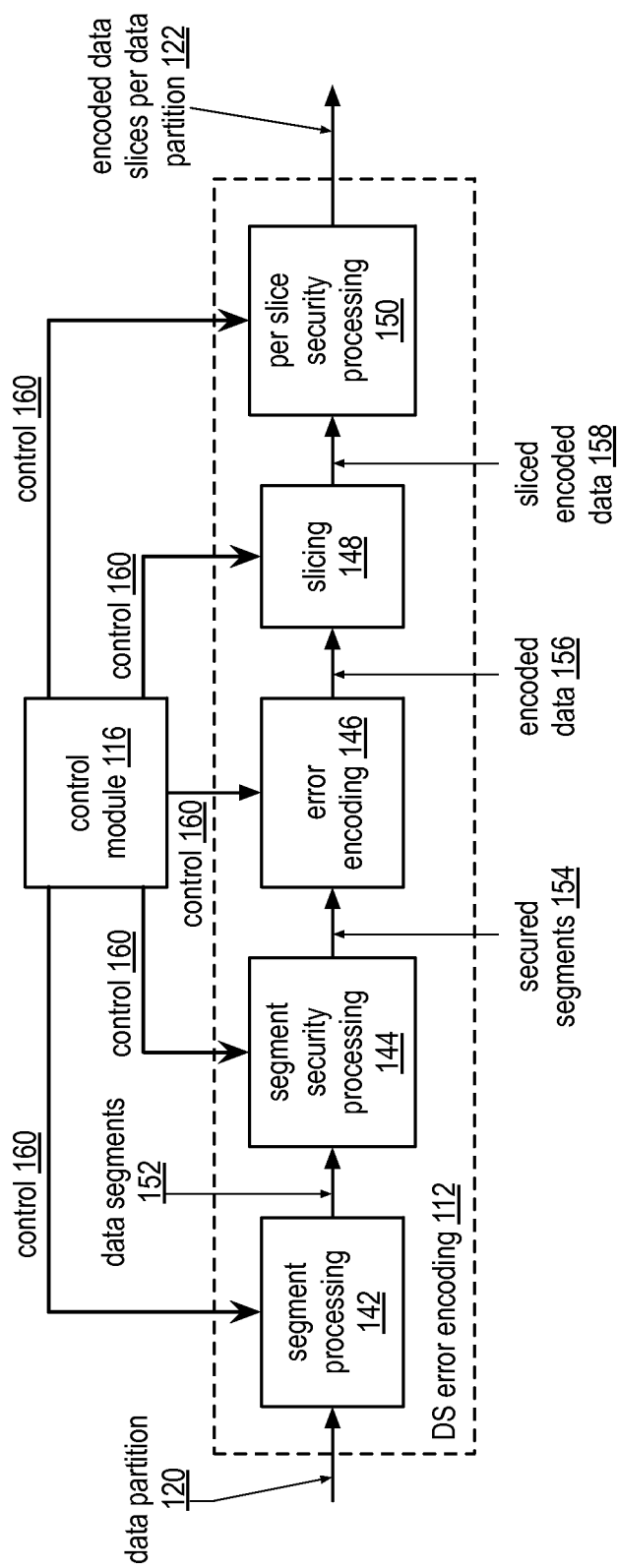
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
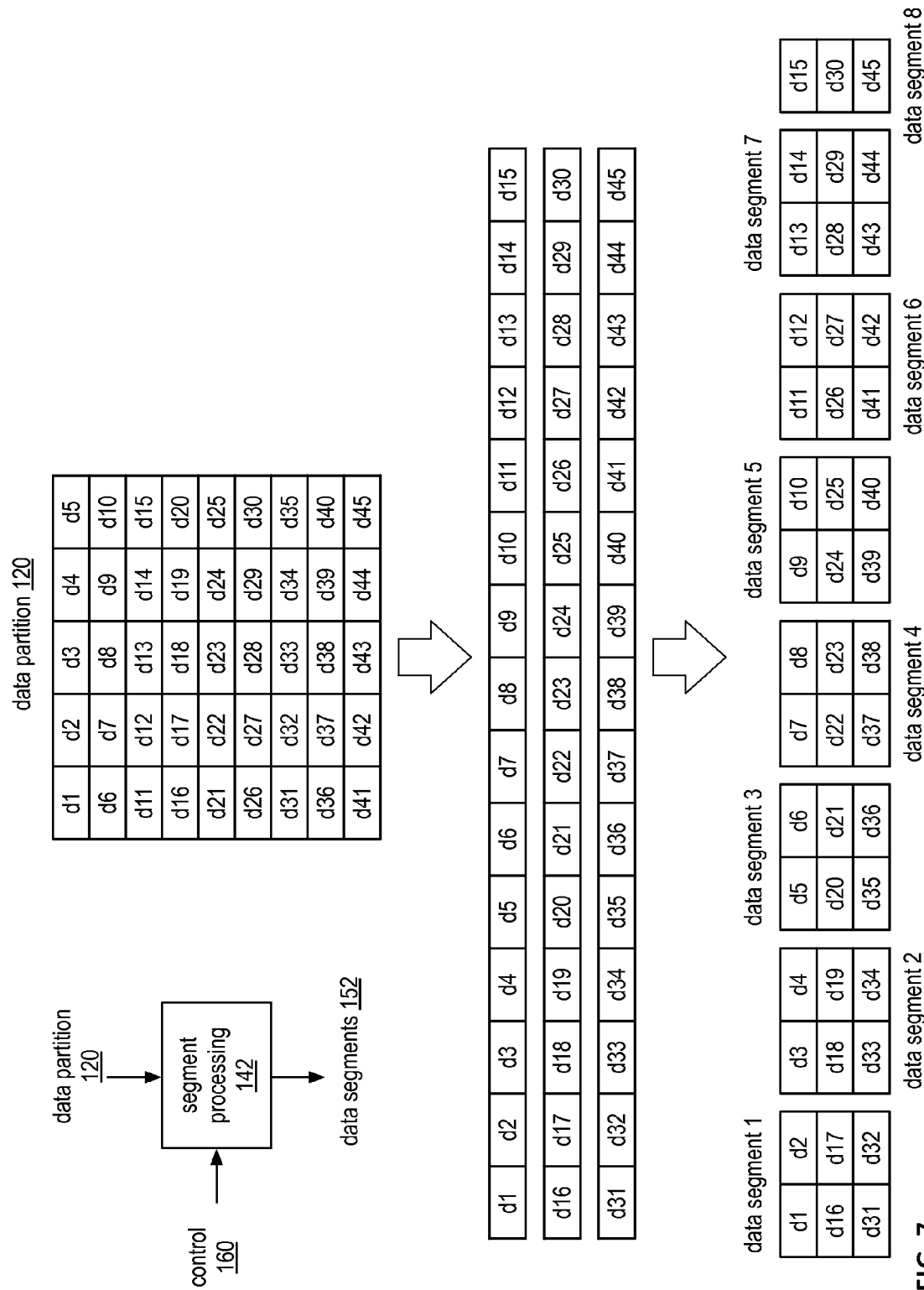
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45) and receives segmenting information (i.e., control information 160) from a control module. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
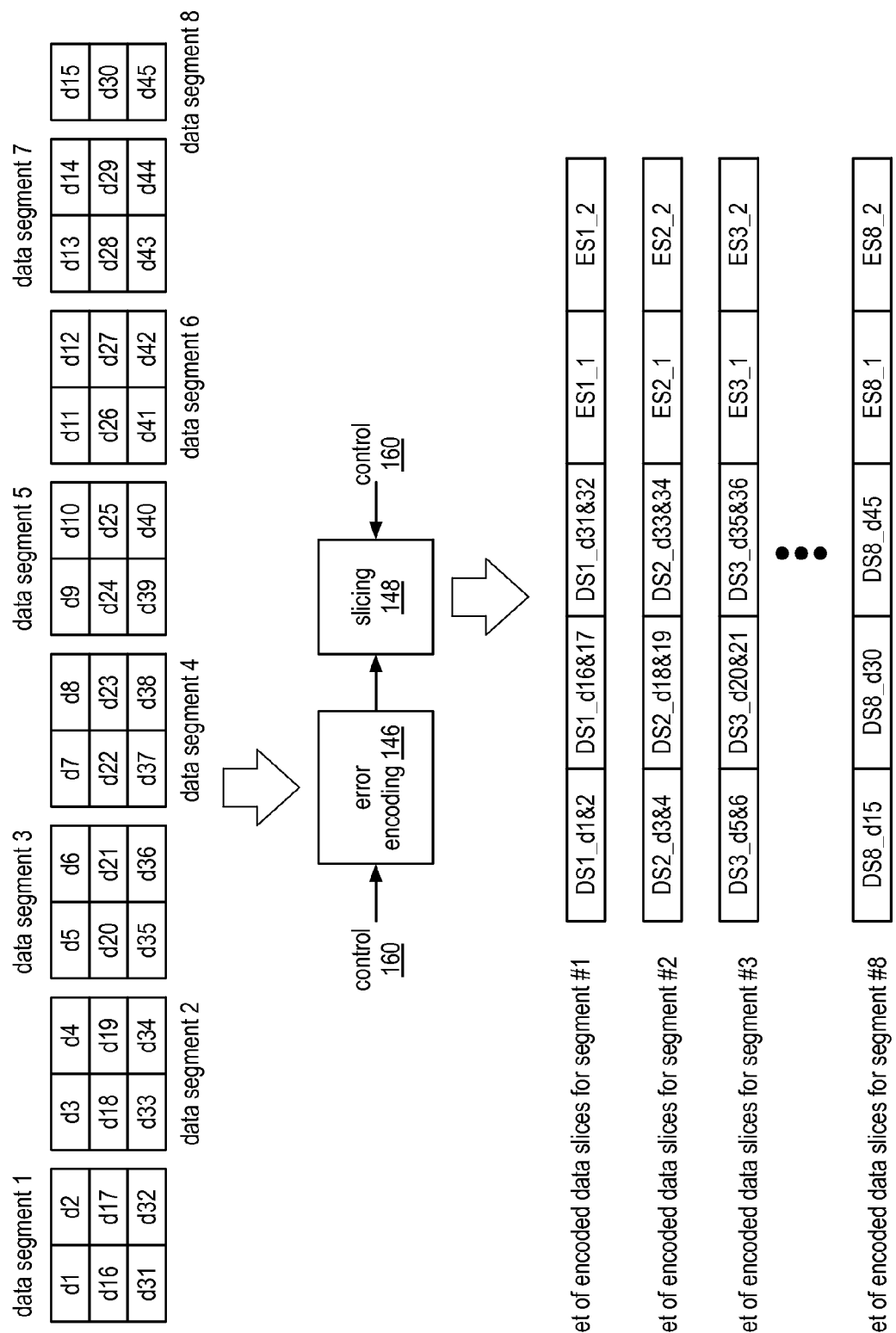
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slices of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices include error correction data based on the first-third words of the second data segment.

Figure 9:
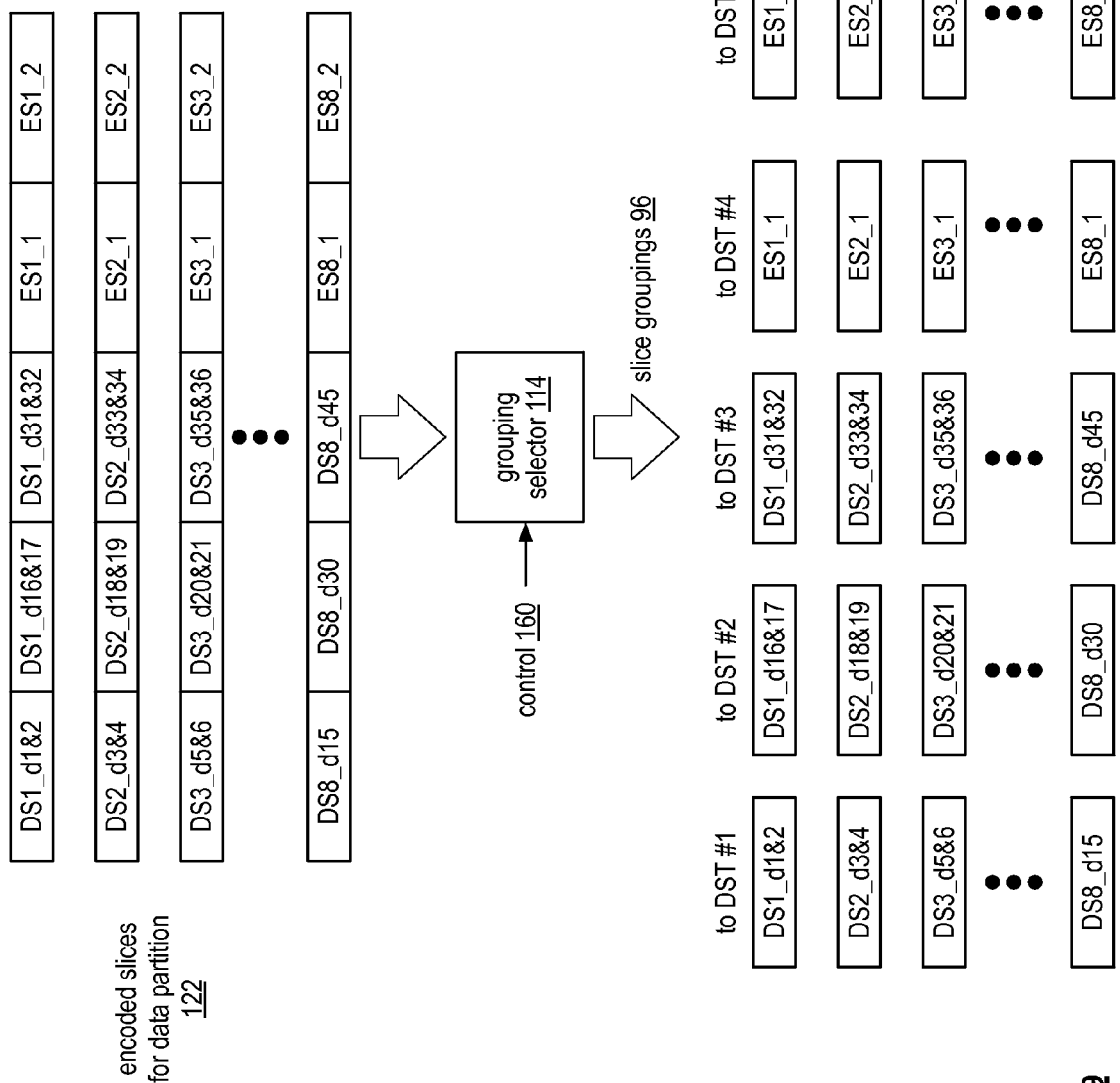
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. In this example, a grouping selection module 114 organizes the encoded data slices into five slice groupings (e.g., one for each DST execution unit of a distributed storage and task network (DSTN) module). As a specific example, the grouping selection module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selection module 114 also creates a second slice grouping for a DST execution unit #2, which includes second encoded slices of each of the sets of encoded slices. As such, the second DST execution unit receives encoded data slices corresponding to data blocks 16-30. The grouping selection module 114 further creates a third slice grouping for DST execution unit #3, which includes third encoded slices of each of the sets of encoded slices. As such, the third DST execution unit receives encoded data slices corresponding to data blocks 31-45.

The grouping selection module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selection module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
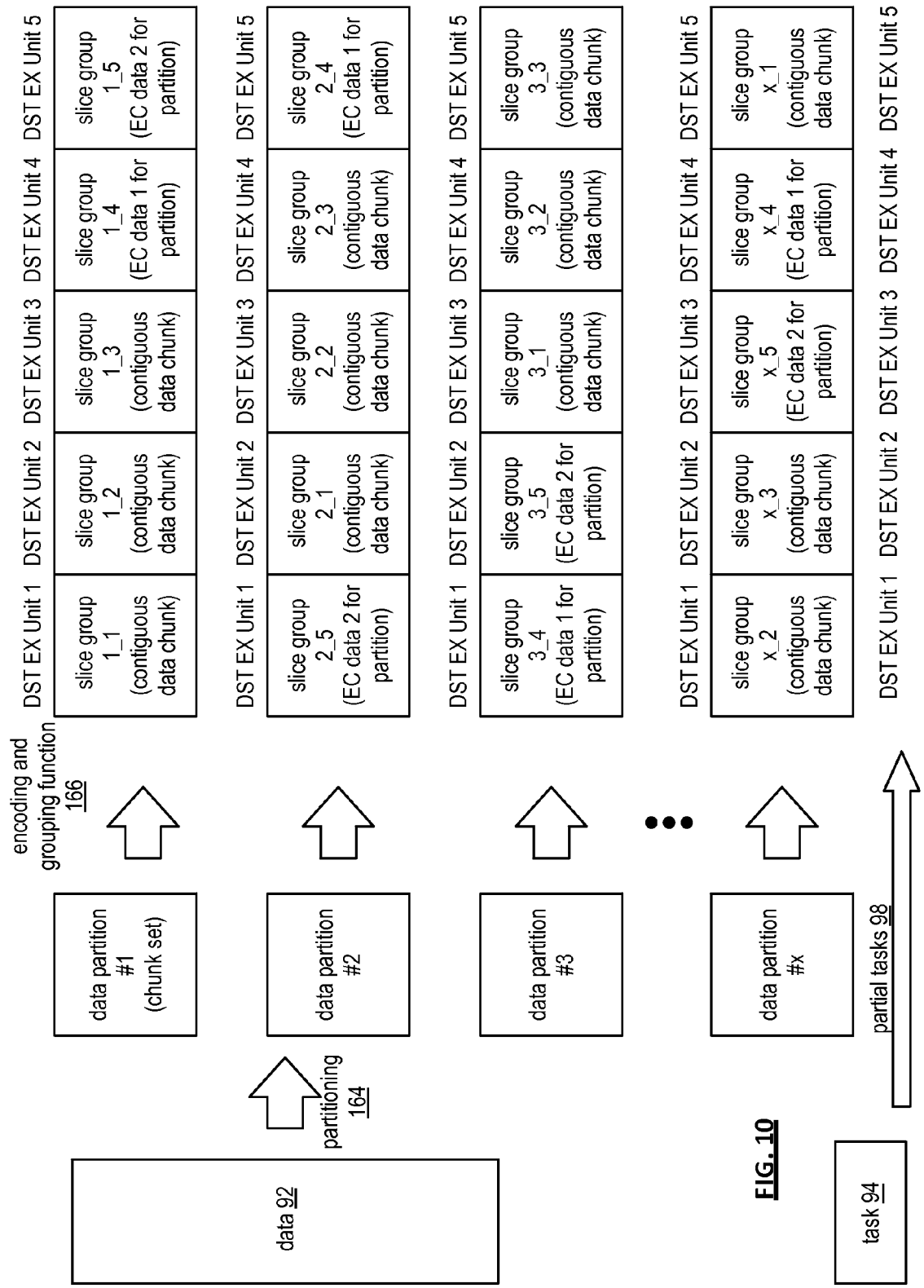
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
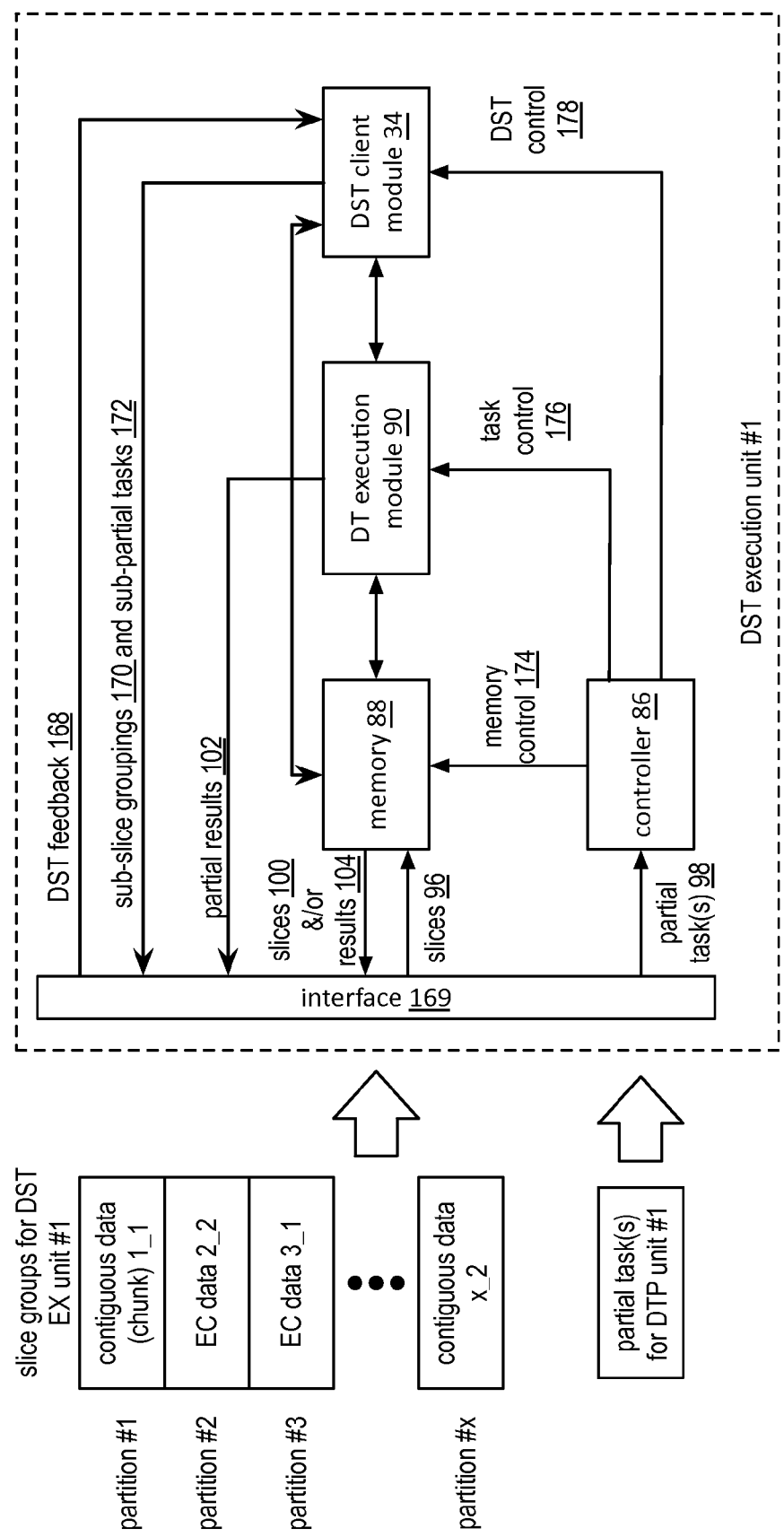
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify of other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
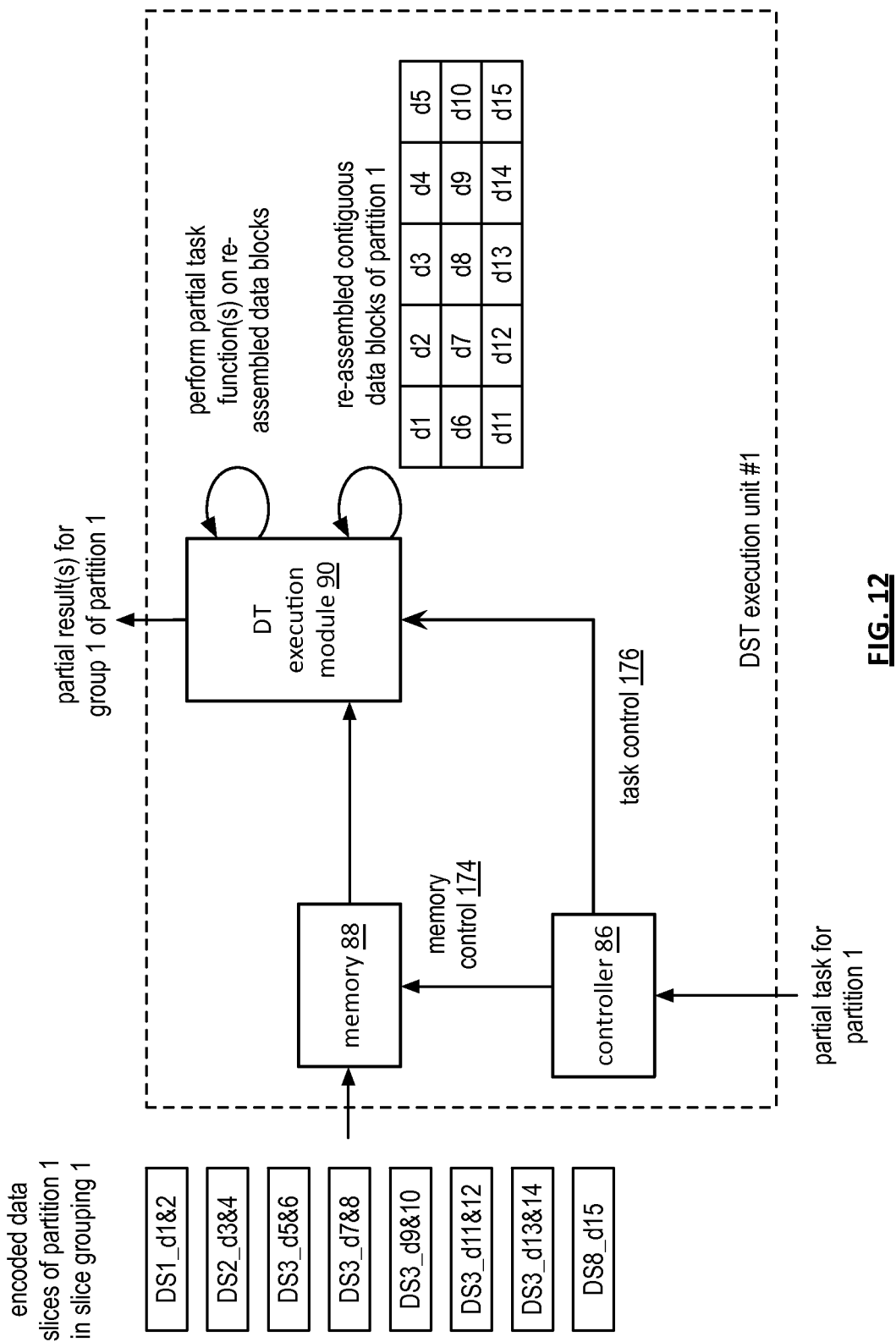
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon.

To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
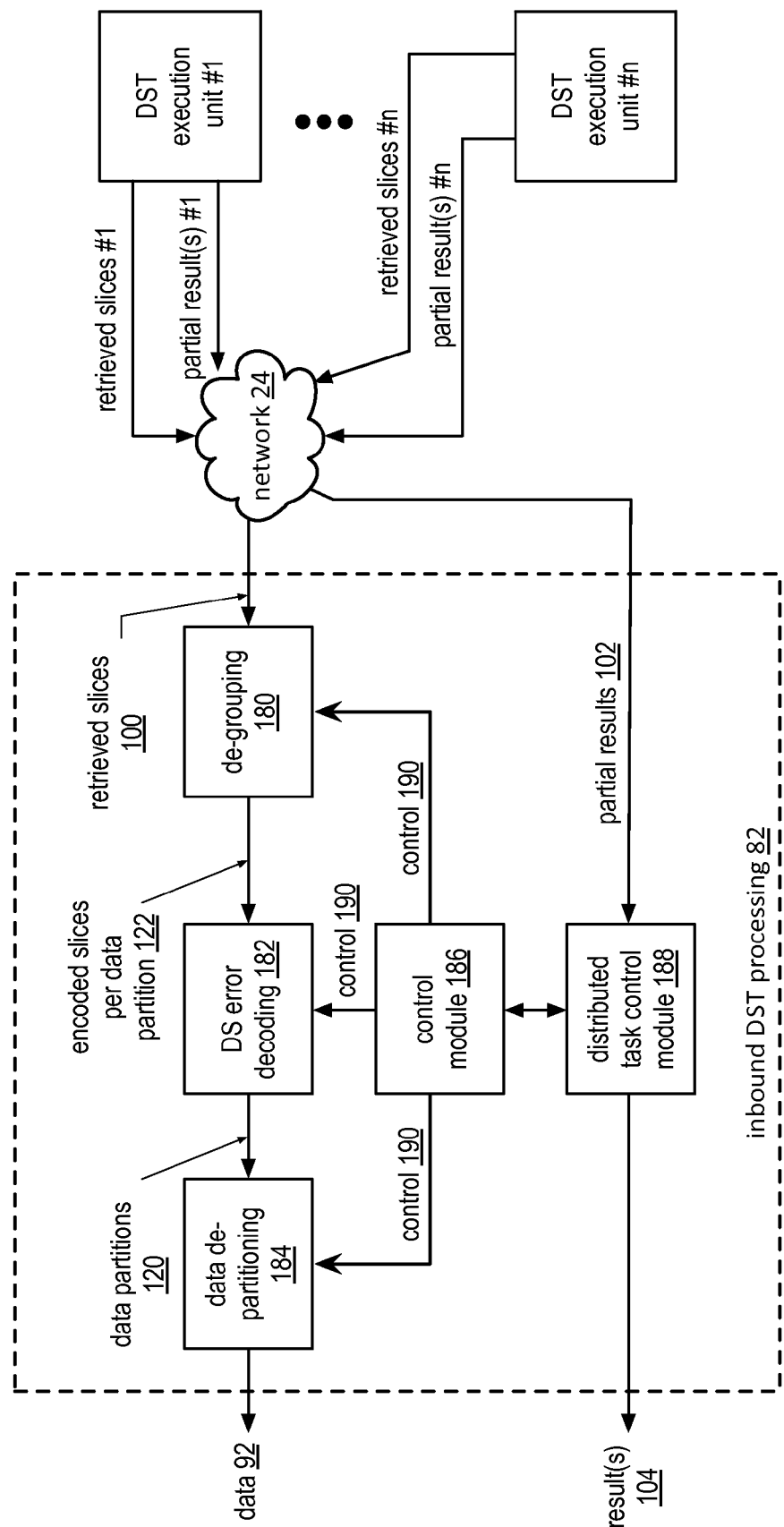
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180; provides the DS error encoding parameters to the DS error decoding module 182; and provides de-partitioning information to the data de-partitioning module 184.

Figure 14:
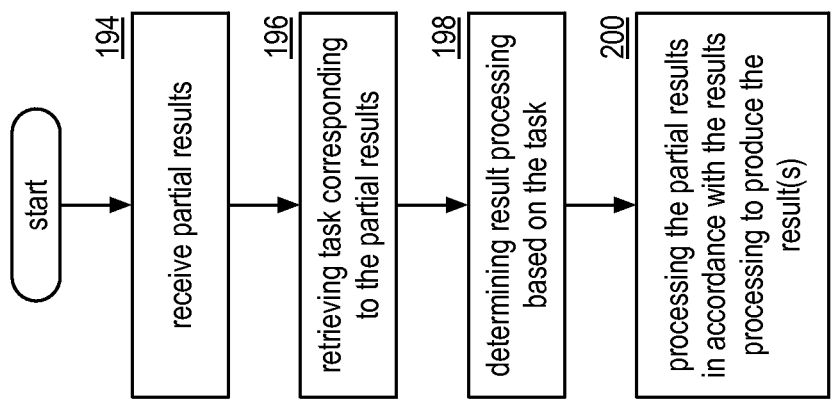
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, the results of processing information would indicate to add the partial results to produce the final results. The method continues at step 200 where the DST client module processes the partial results in accordance with the result processing information to produce the final result, or results.

Figure 15:
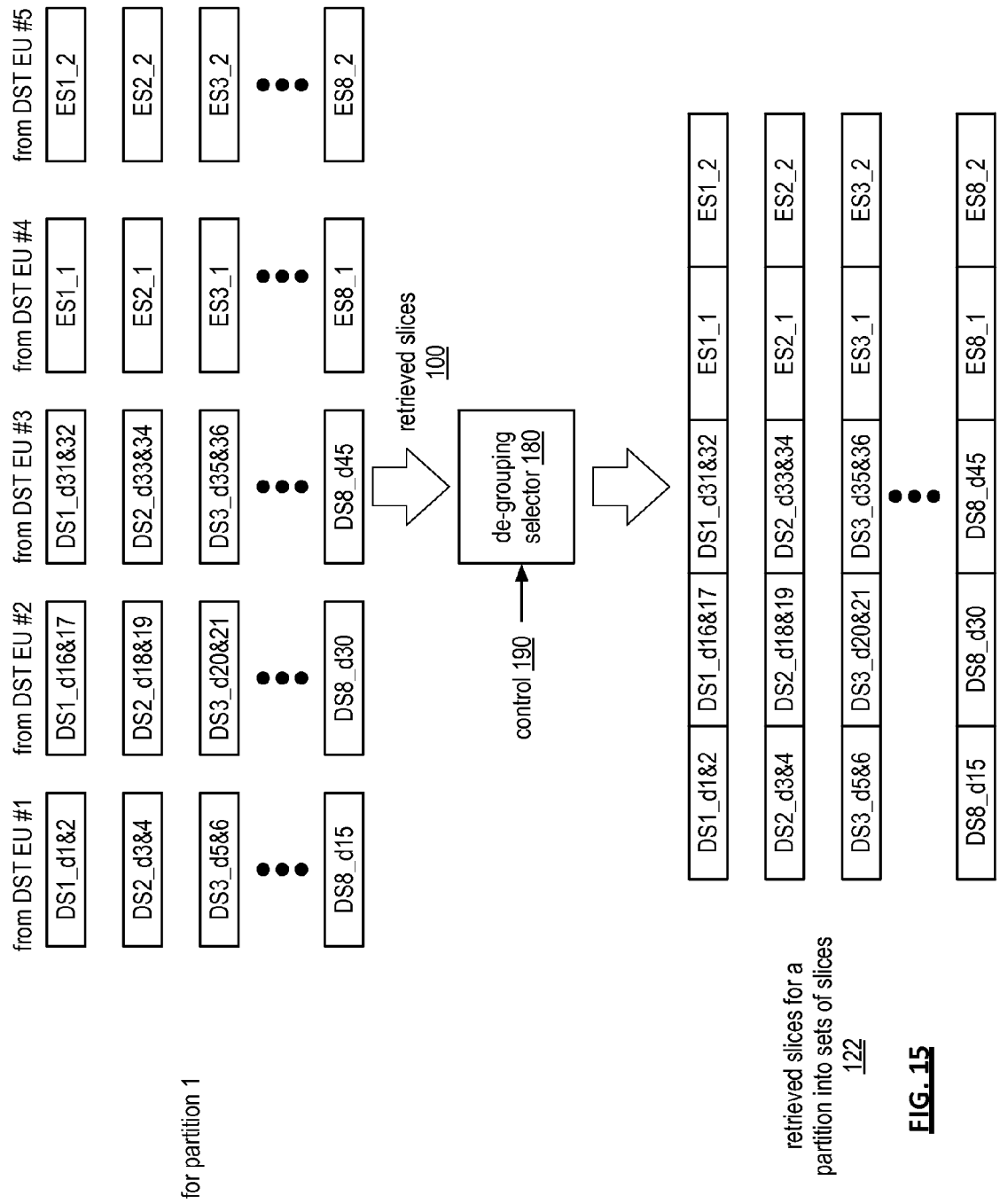
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
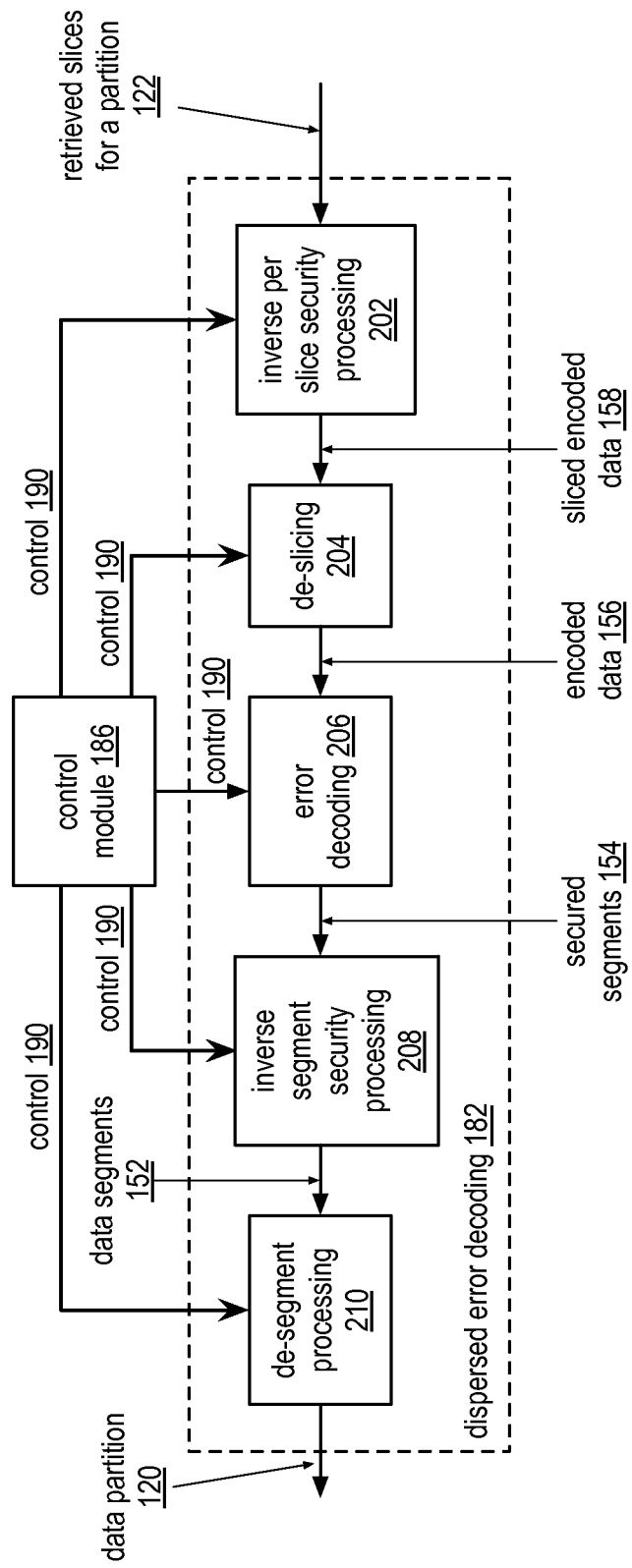
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC) verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
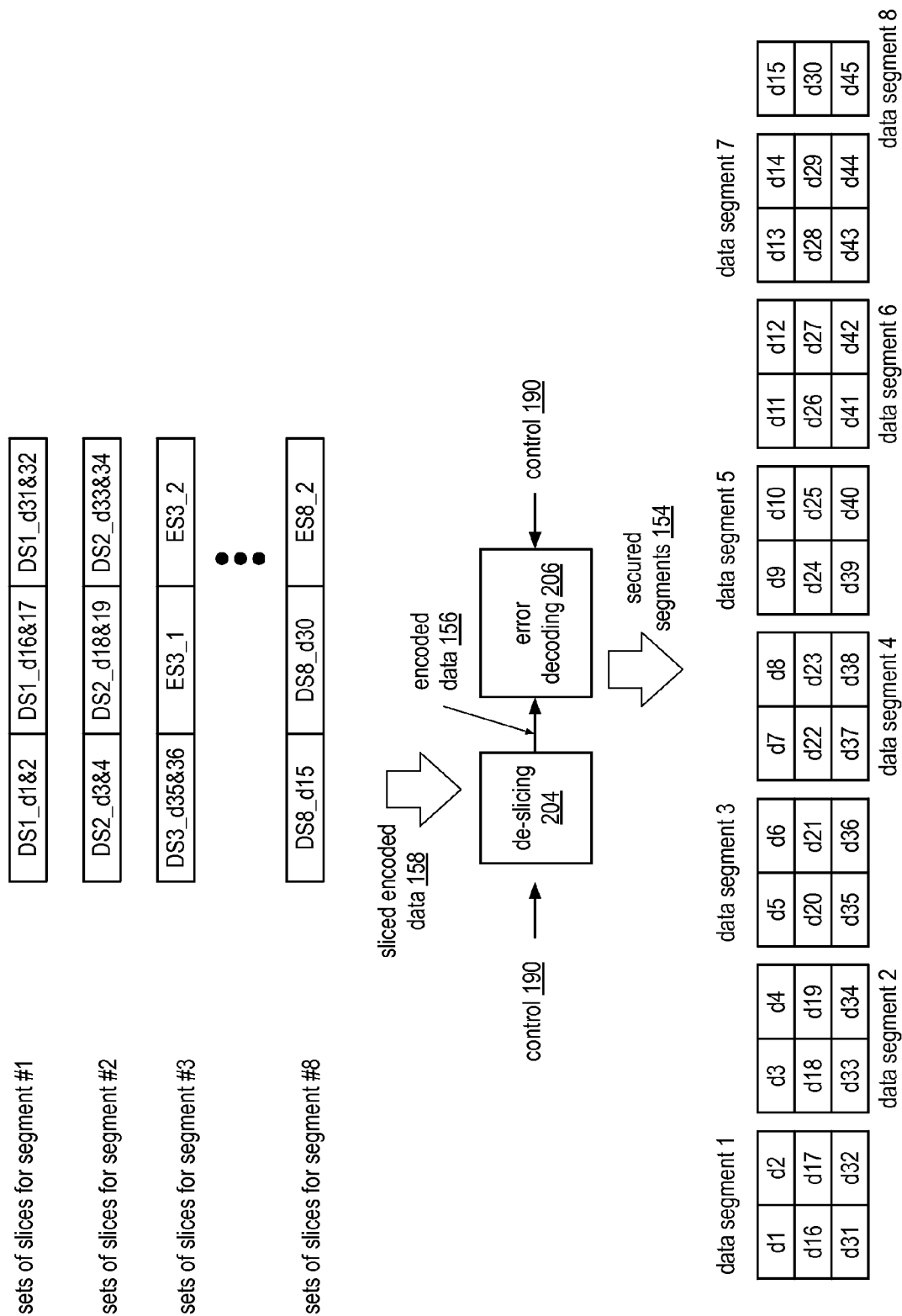
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 slice and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce data segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
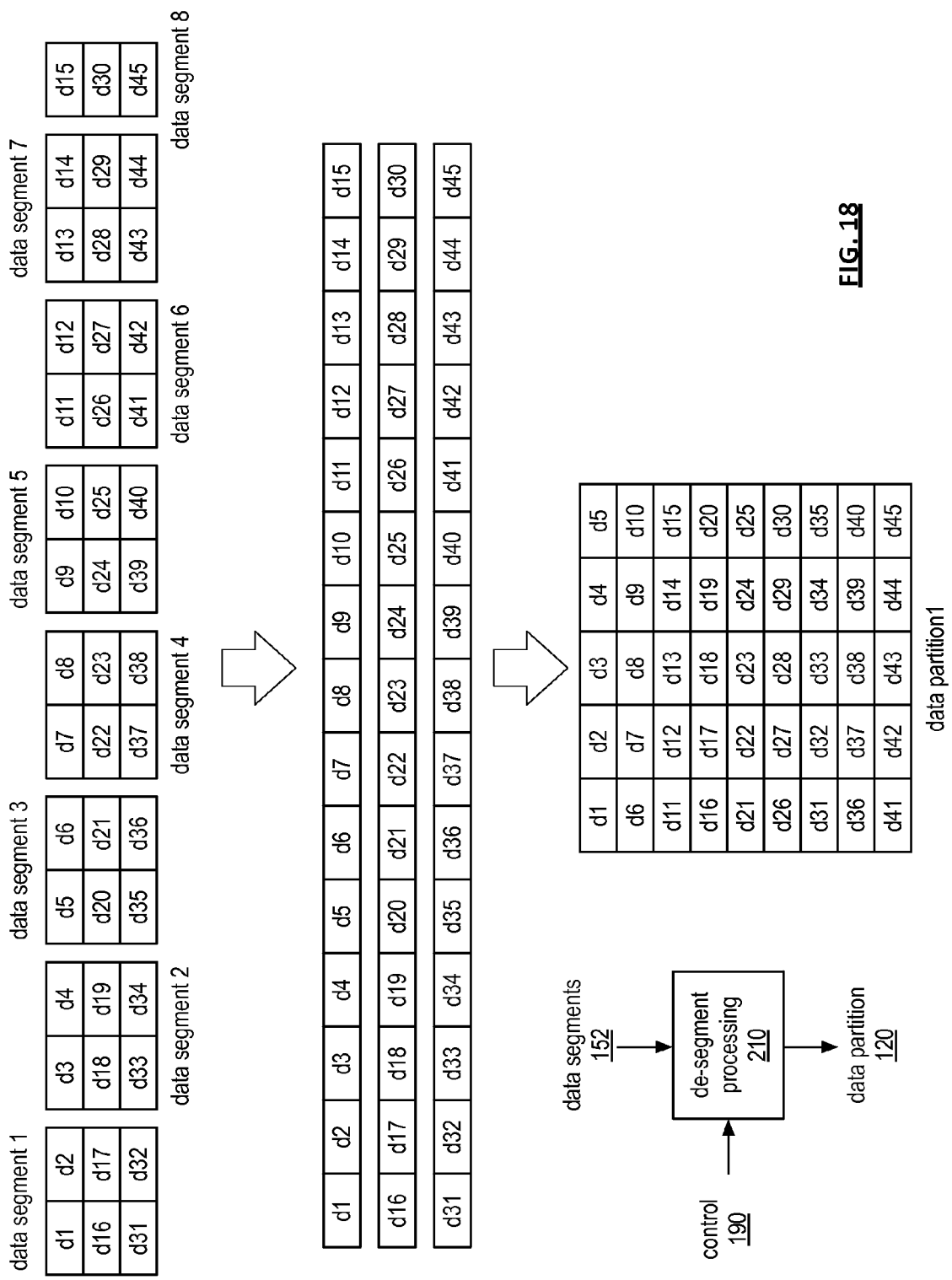
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
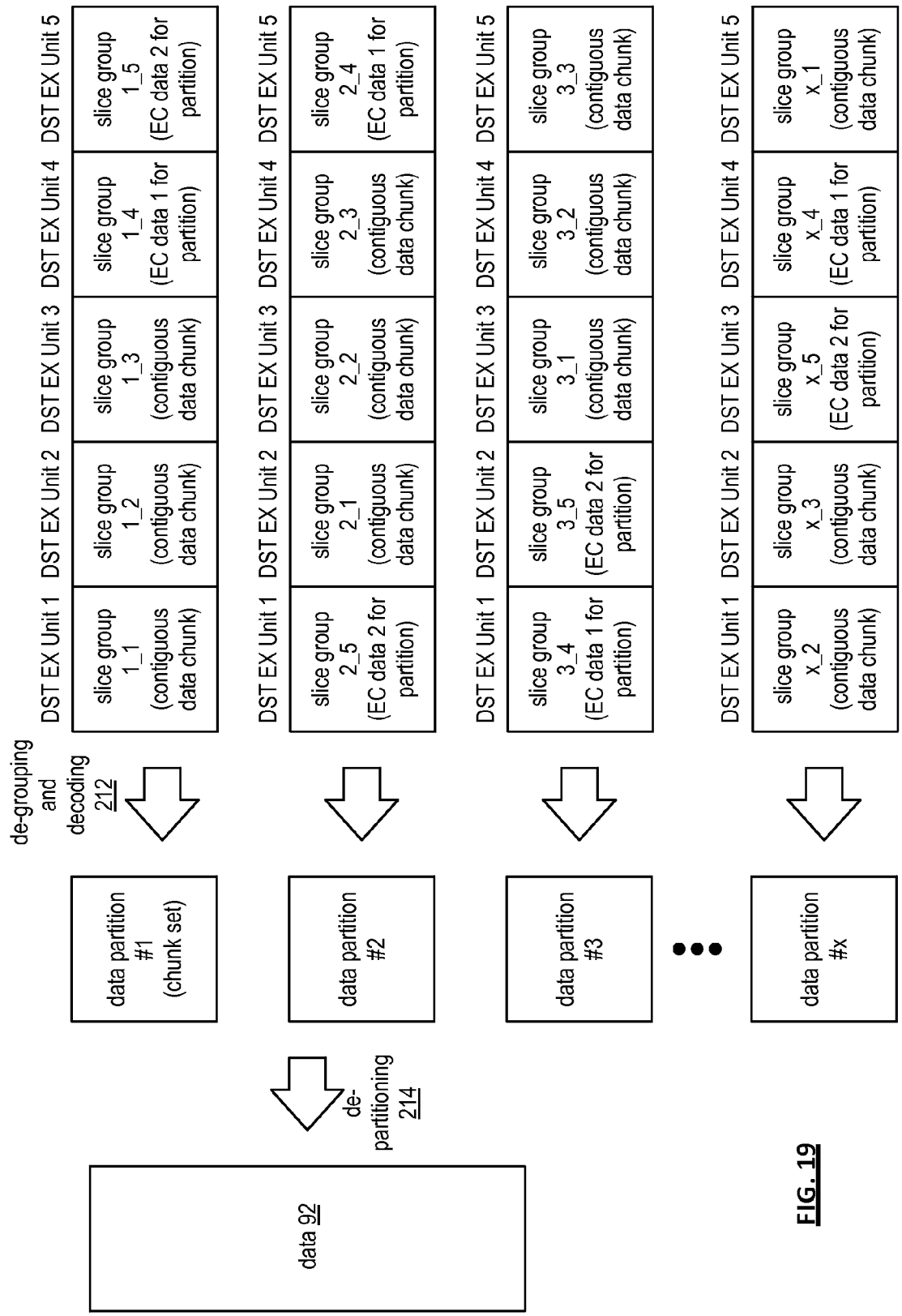
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
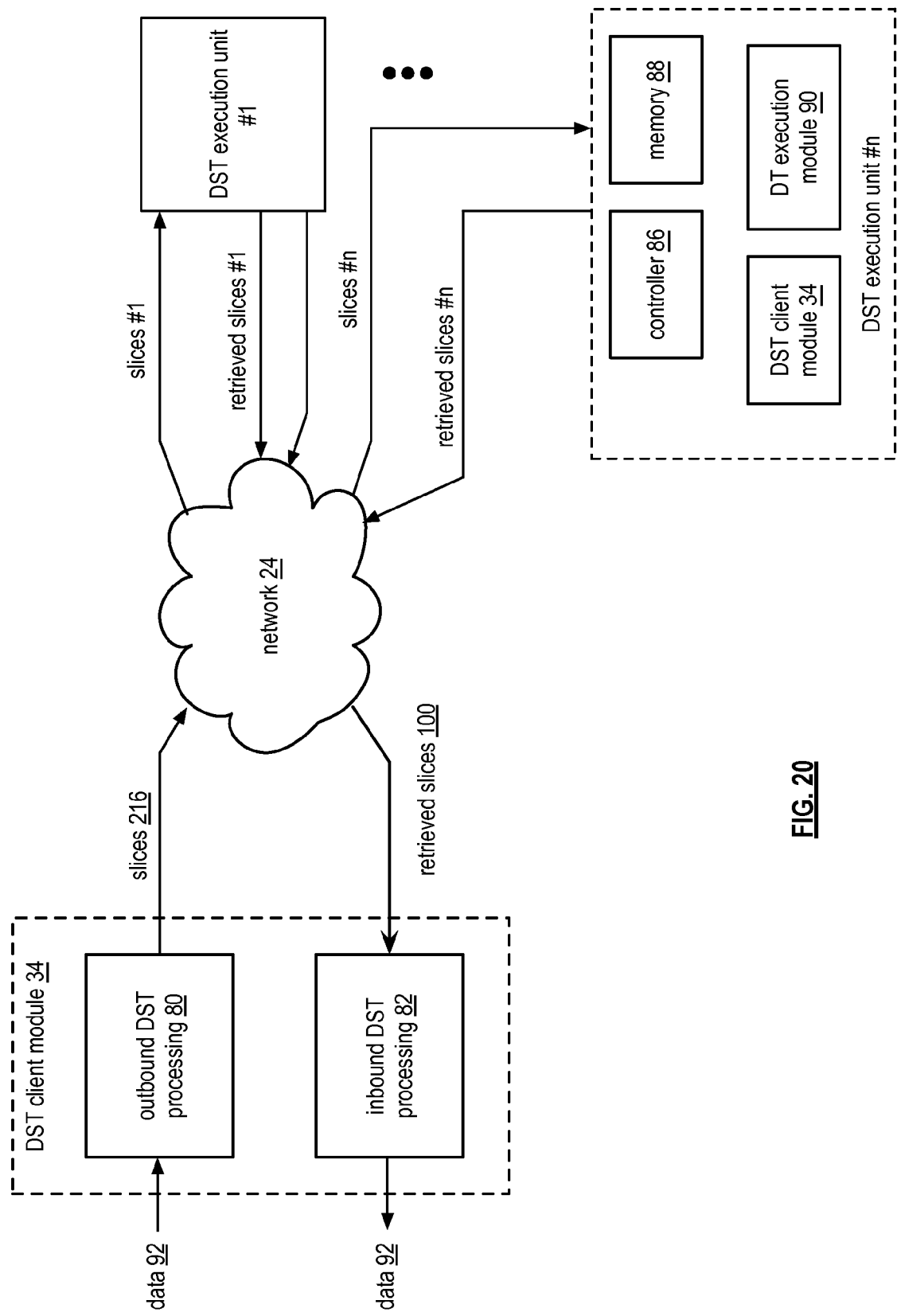
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to distributedly store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
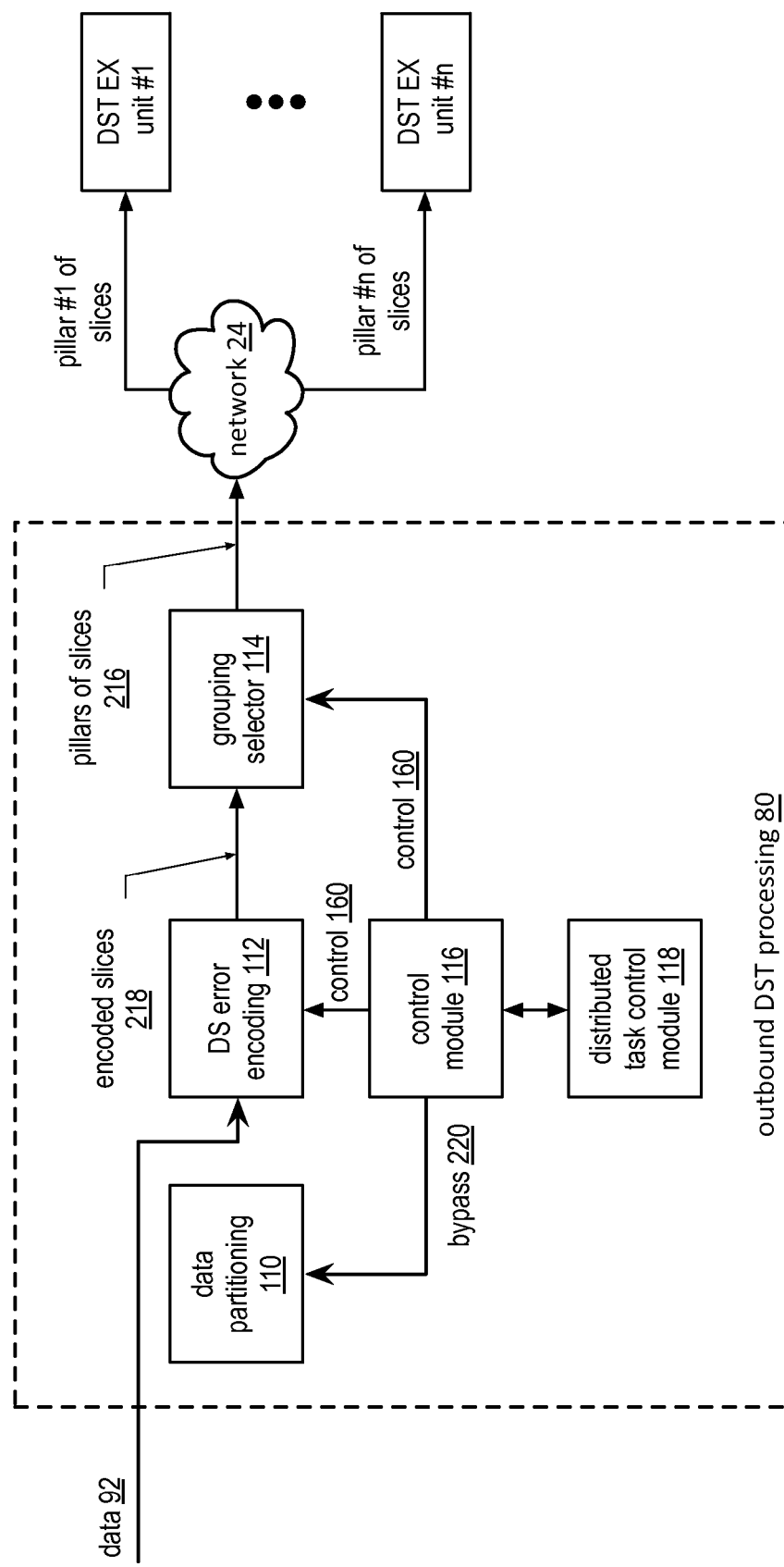
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
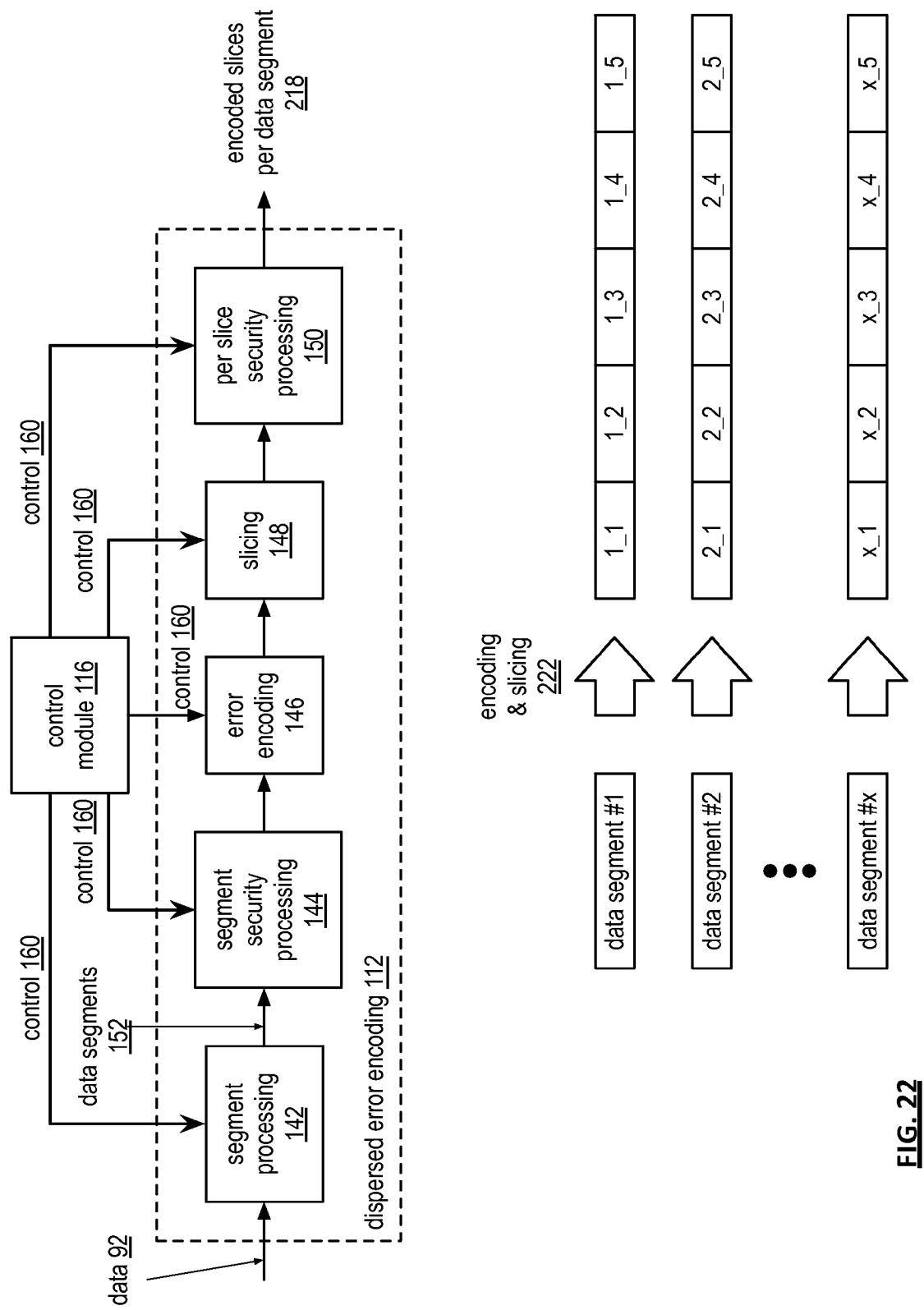
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
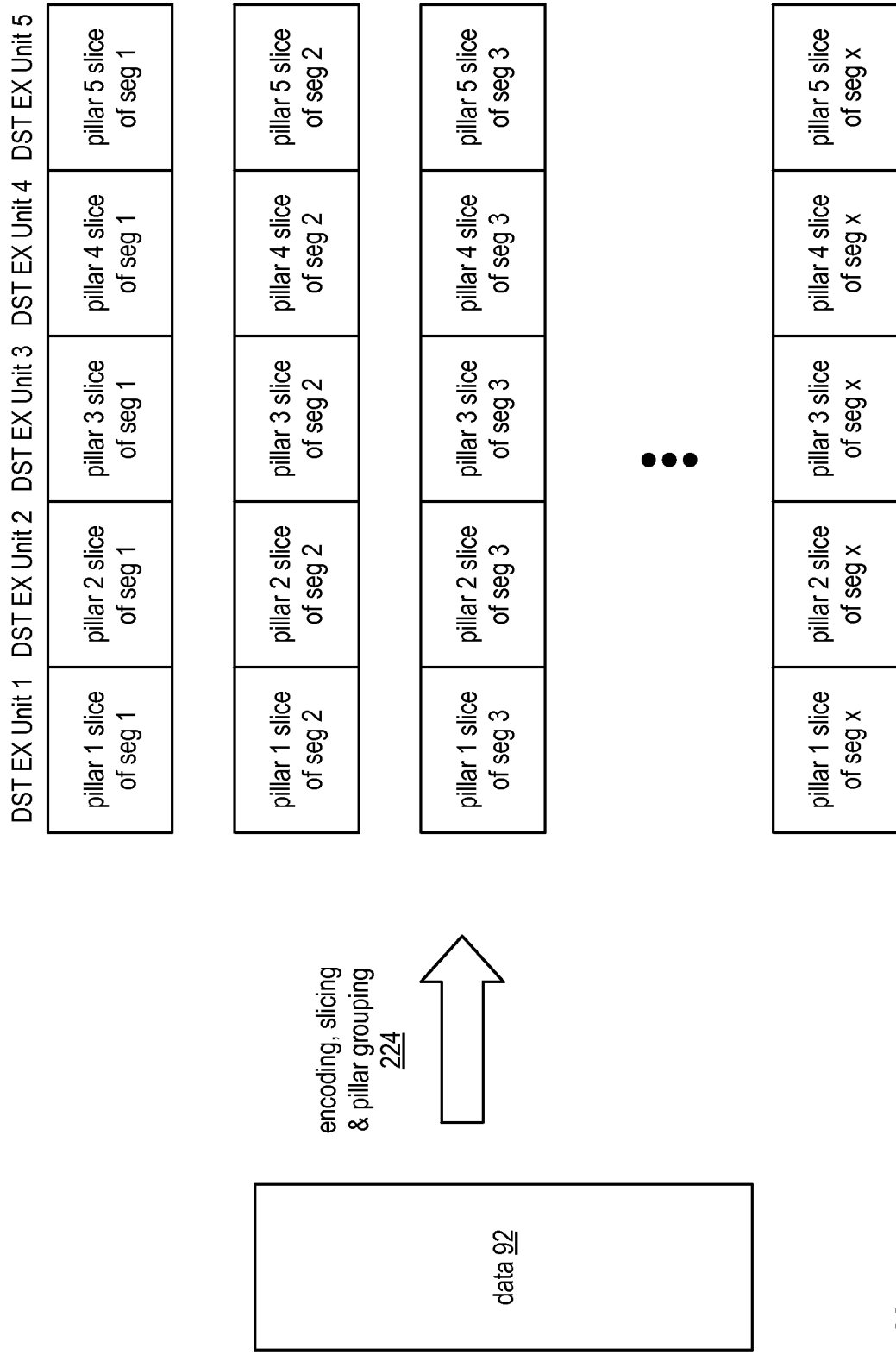
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selection module organizes the sets of encoded data slices into pillars of data slices. In this example, the DS error encoding parameters include a pillar width of 5 and a decode threshold of 3. As such, for each data segment, 5 encoded data slices are created.

The grouping selection module takes the first encoded data slice of each of the sets and forms a first pillar, which may be sent to the first DST execution unit. Similarly, the grouping selection module creates the second pillar from the second slices of the sets; the third pillar from the third slices of the sets; the fourth pillar from the fourth slices of the sets; and the fifth pillar from the fifth slices of the set.

Figure 24:
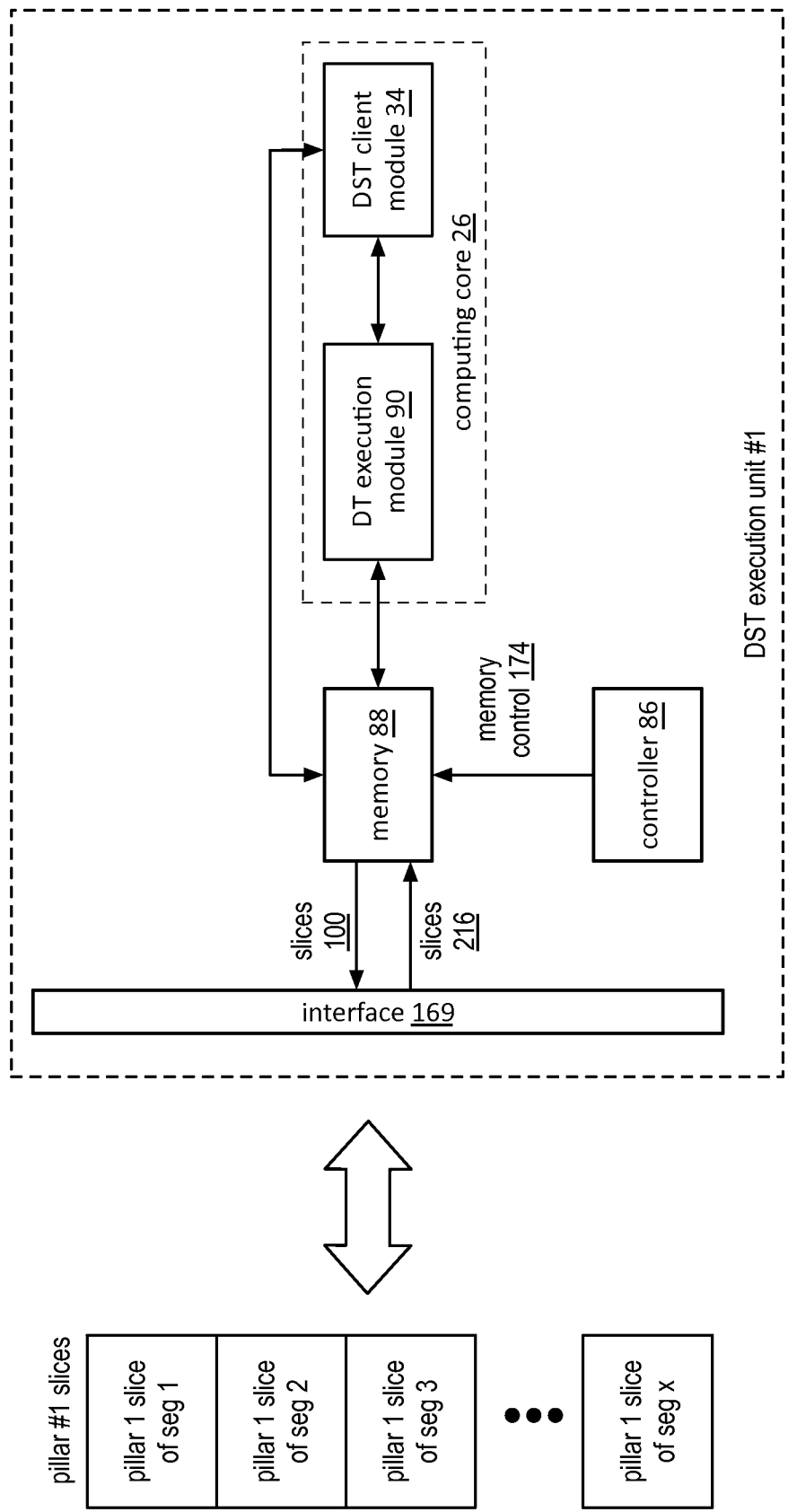
FIG. 24 is a schematic block diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
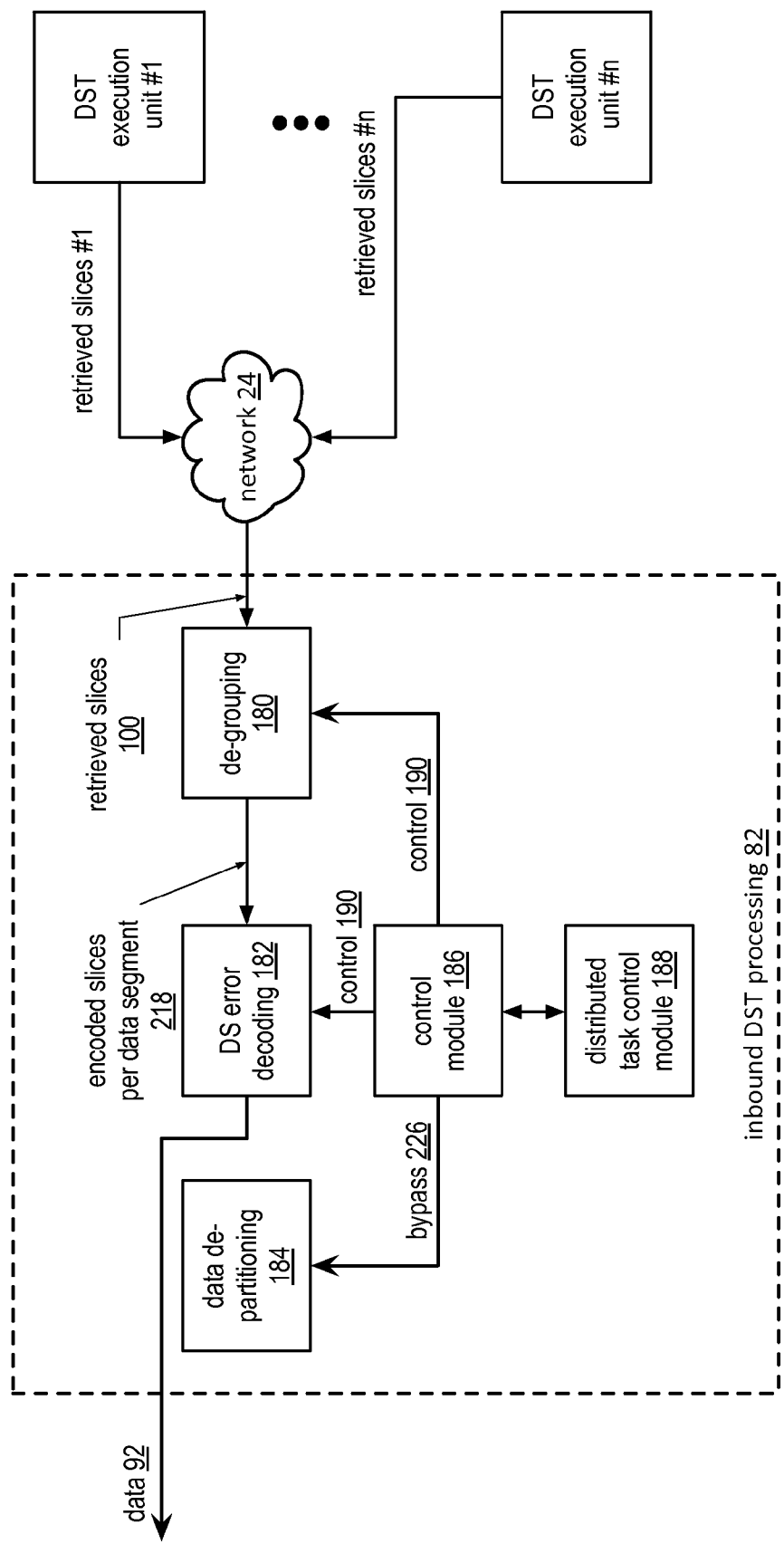
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
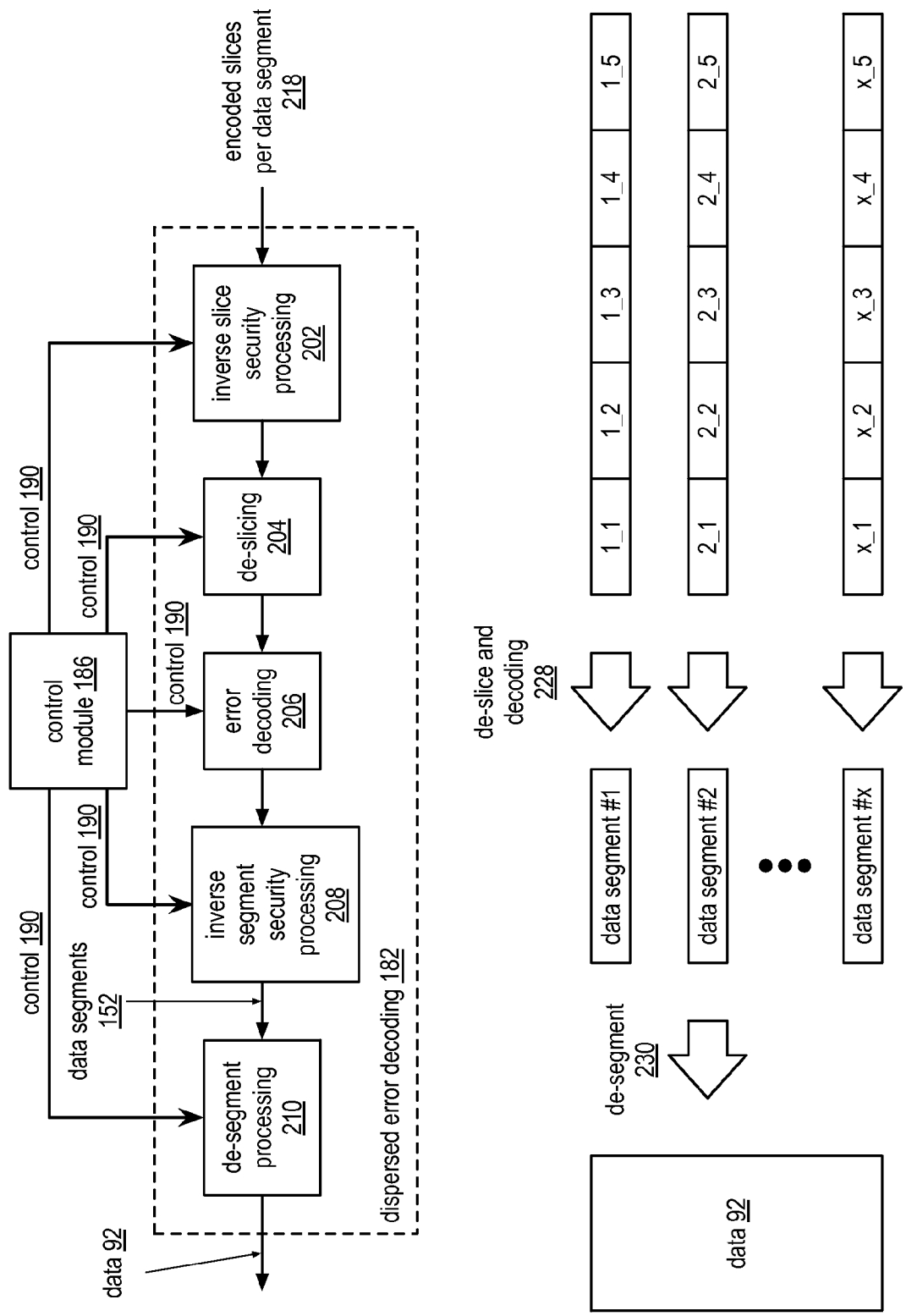
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC) verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from the control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
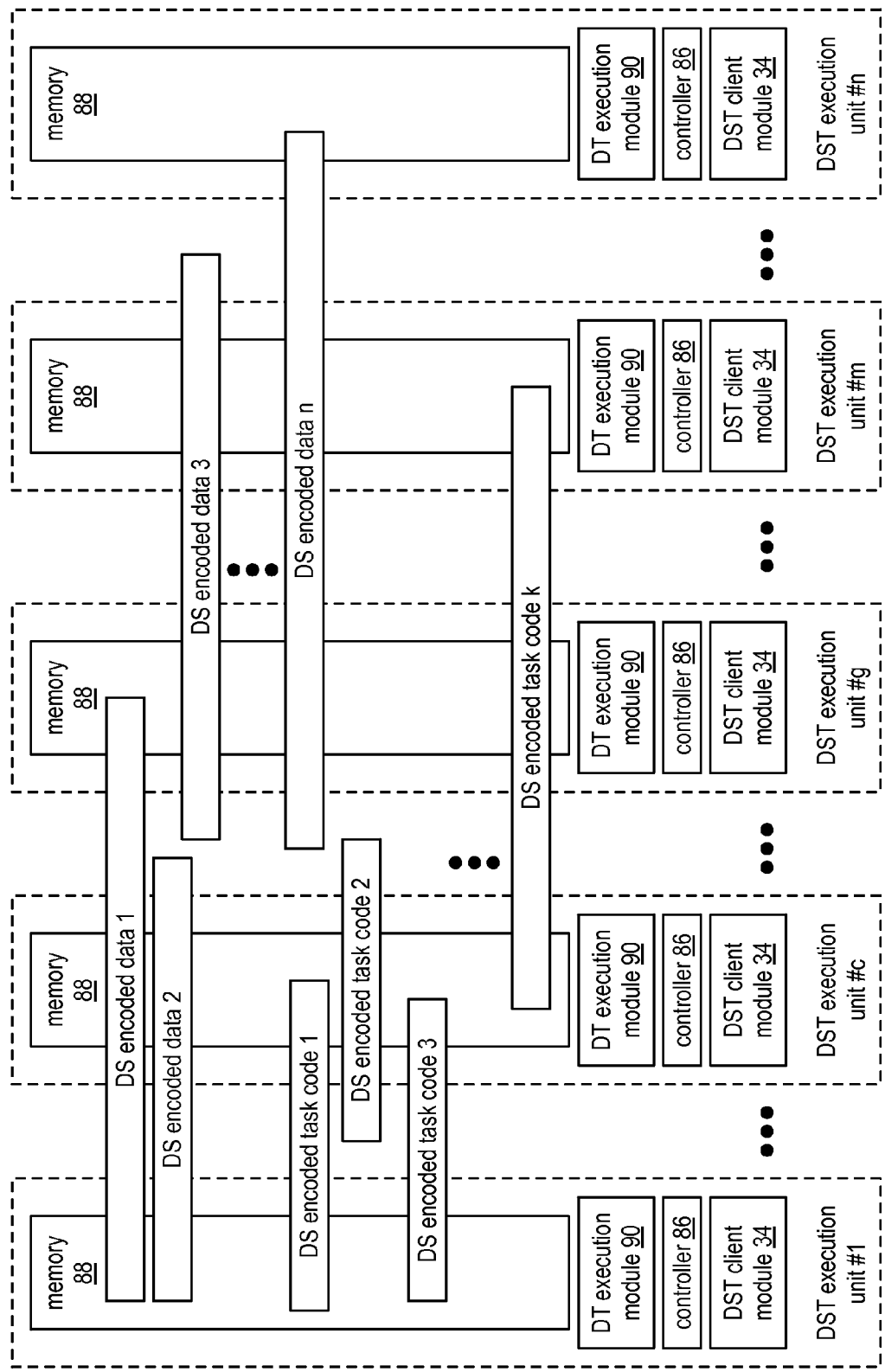
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
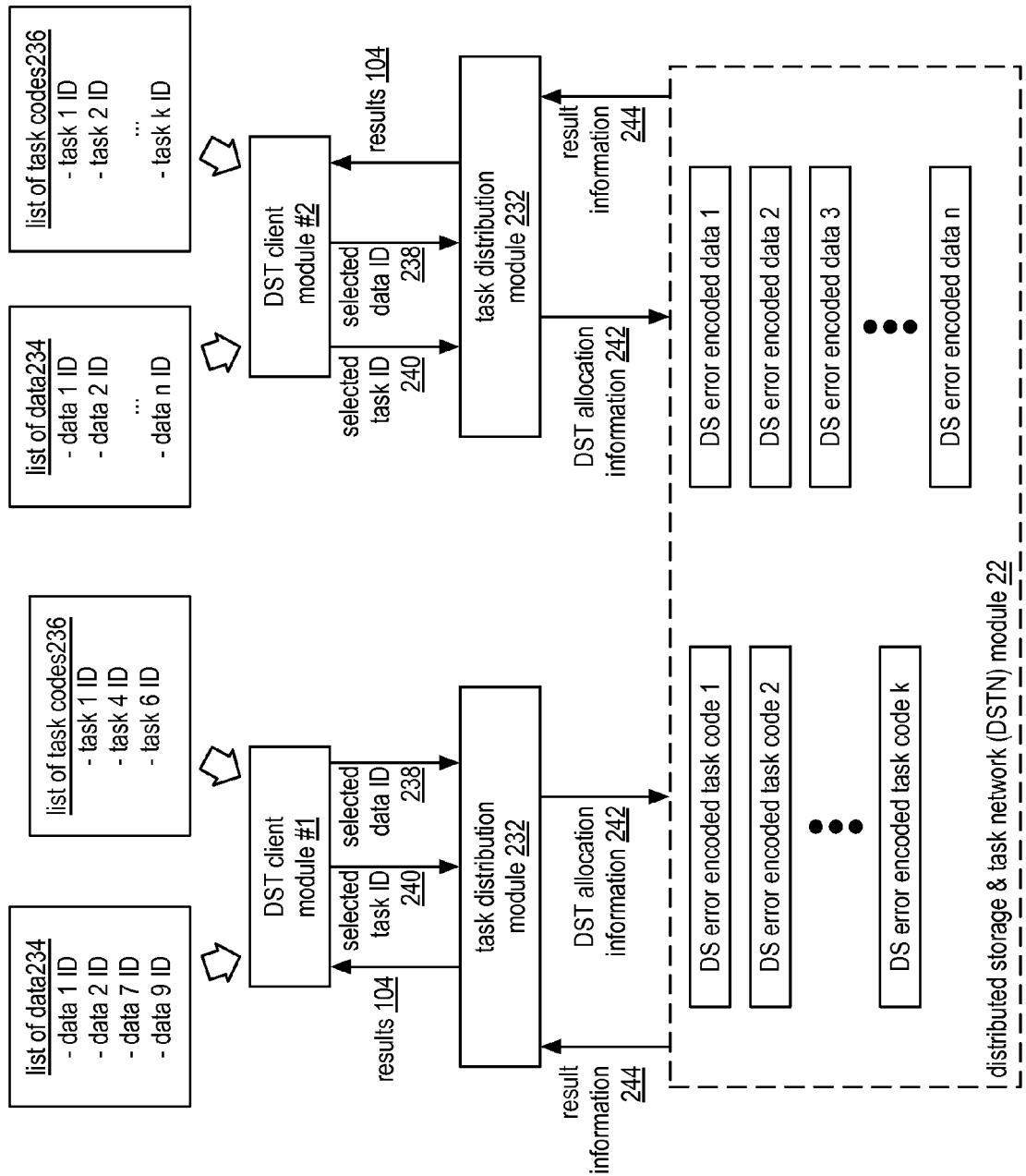
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
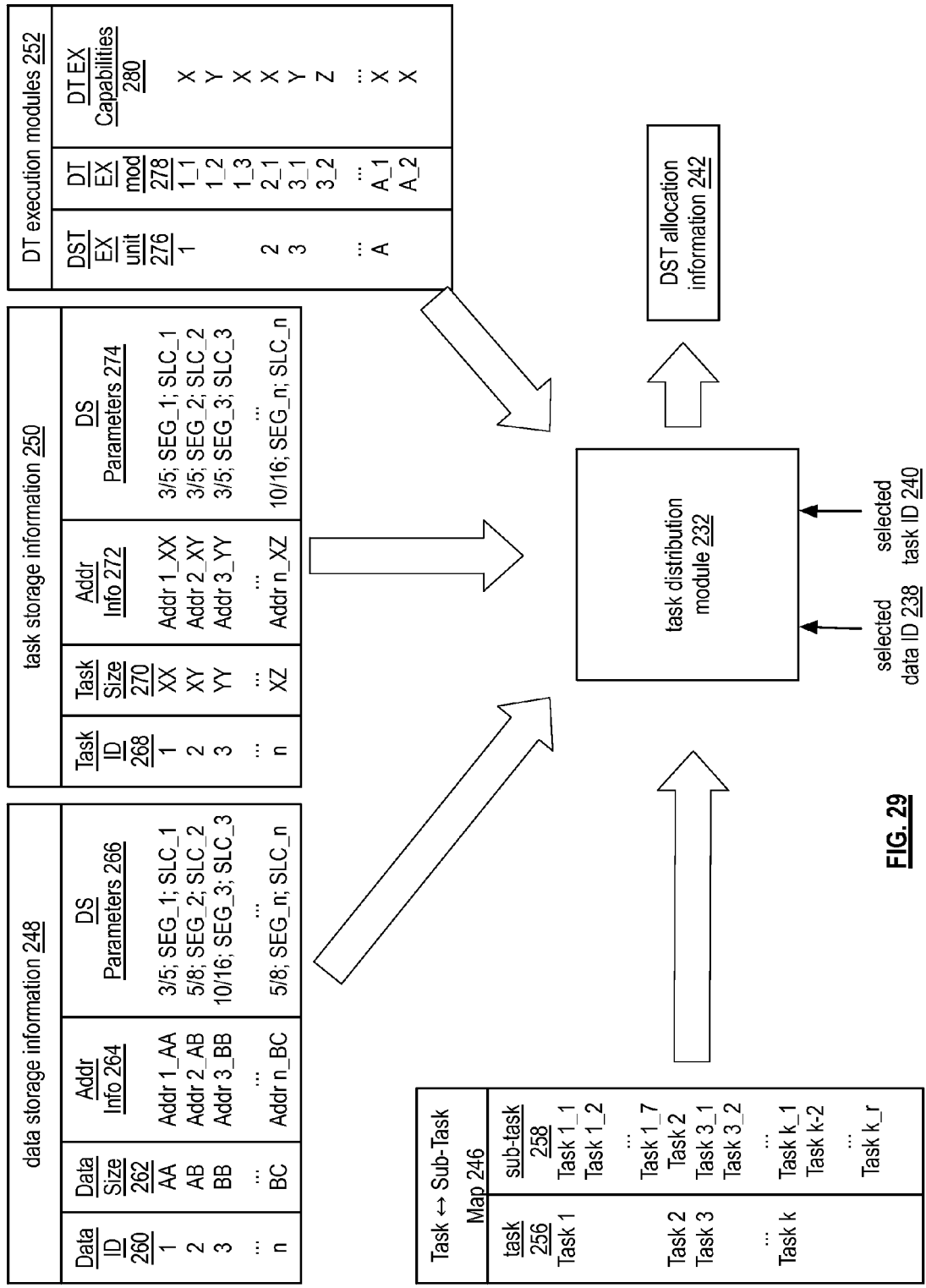
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few terra-bytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slices names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
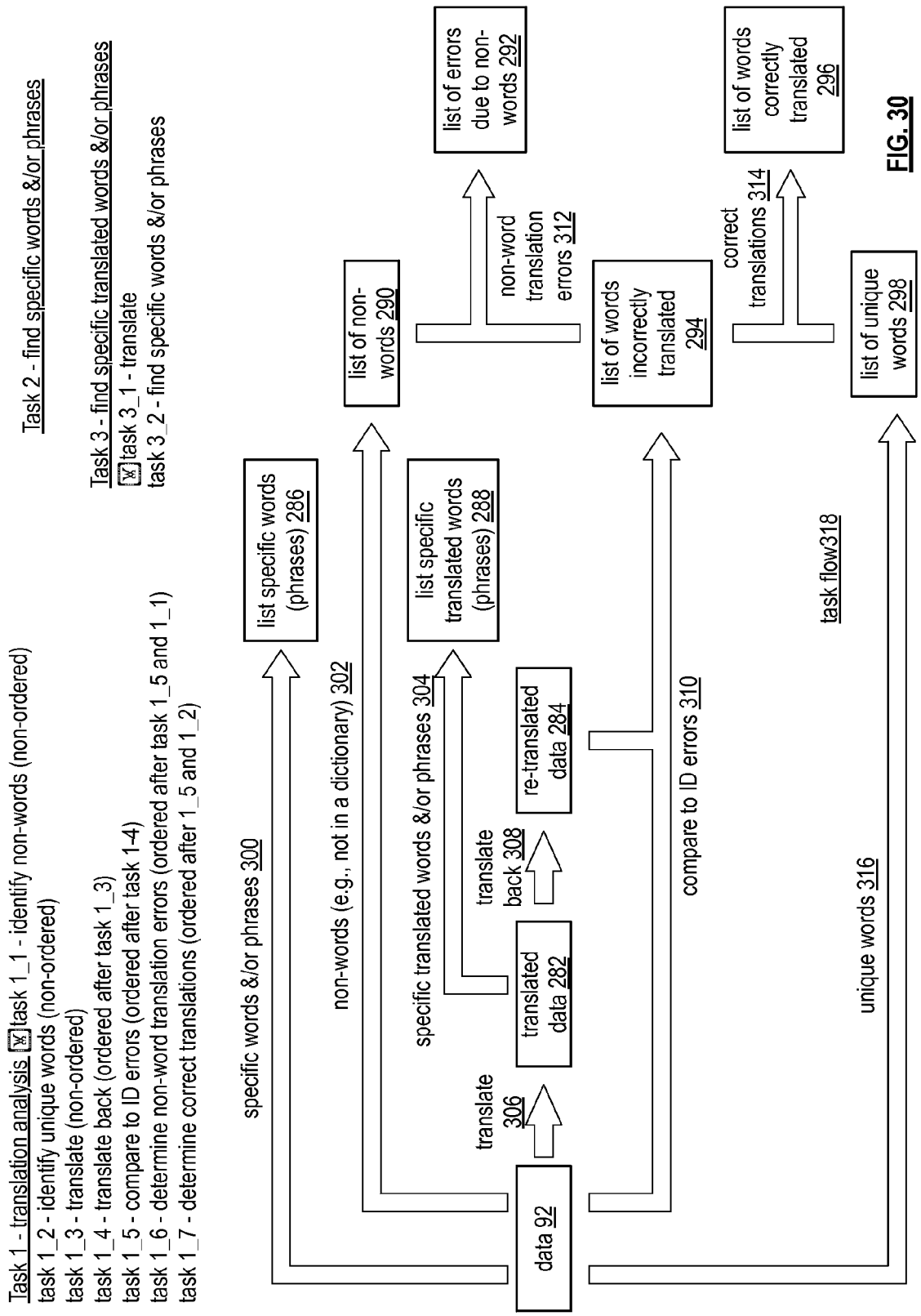
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
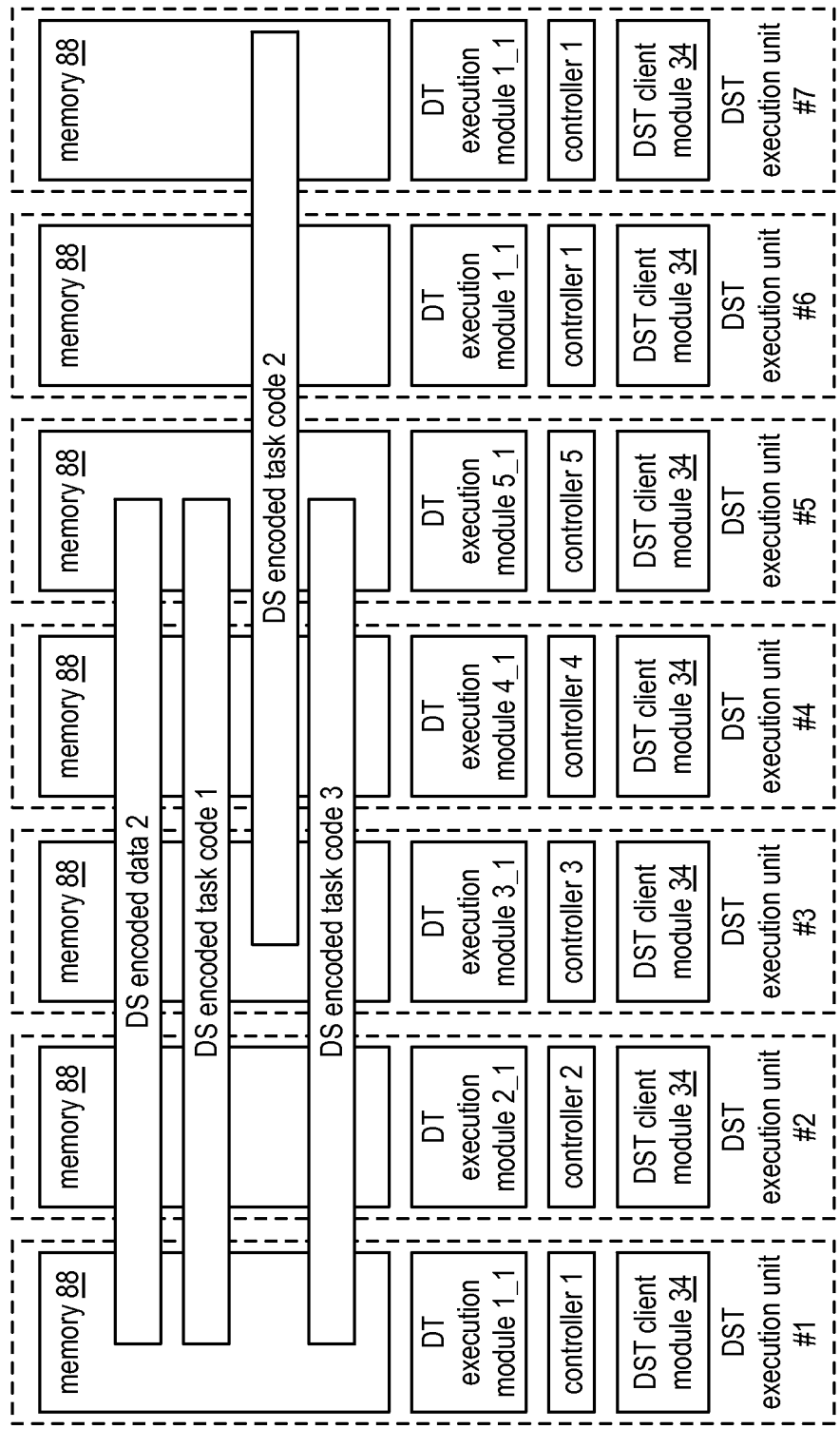
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the by DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terra-Byte). If yes, it partitions the first intermediate result (R1-1)

into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terra-Byte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1st through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
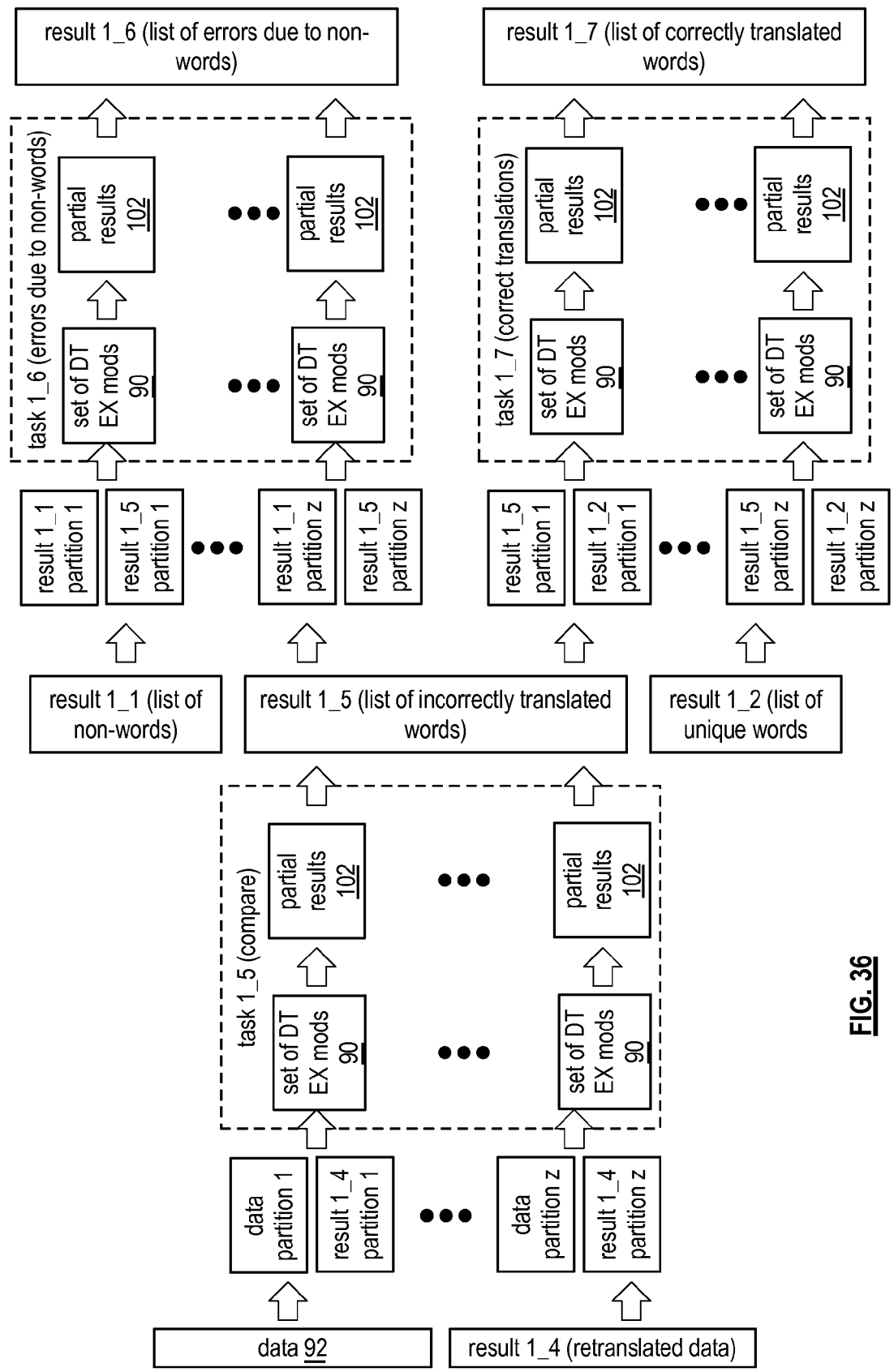

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1$^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1$^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., 1$^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., 1$^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terra-Byte). If yes, it partitions the task 2 intermediate result (R2) into a plurality of partitions (e.g., R2_1 through R2__*m*). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terra-Byte). If yes, it partitions the task 3 intermediate result (R3) into a plurality of partitions (e.g., R3_1 through R3__*m*). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40:
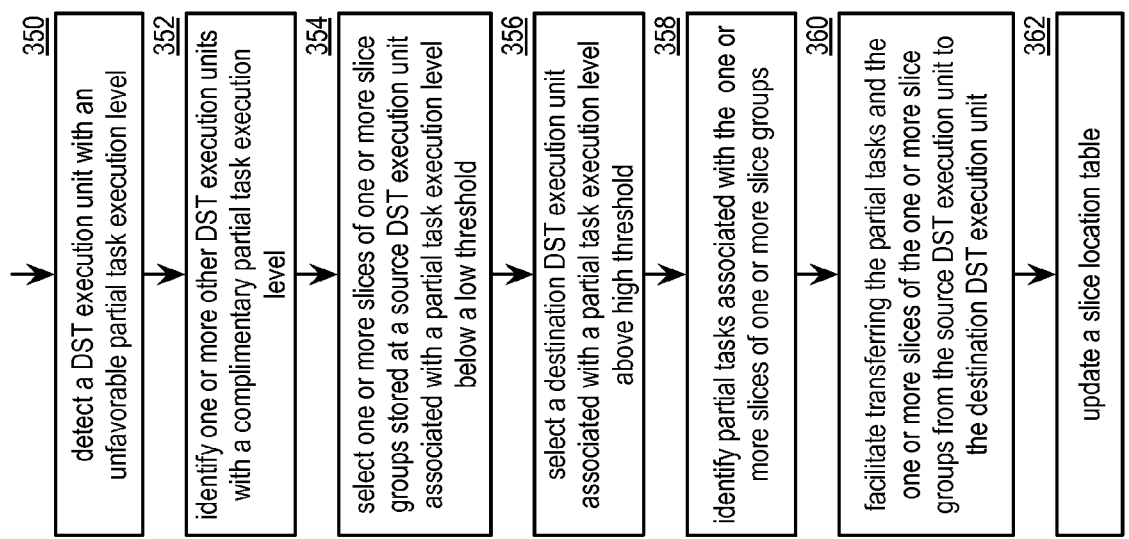
FIG. 40 is a flowchart illustrating an example of redistributing data and tasks in accordance with the present invention.

FIG. 40 is a flowchart illustrating an example of redistributing data and tasks. The method begins with step 350 where a processing module (e.g., of a distributed storage and task (DST) client module) detects a DST execution unit with an unfavorable partial task execution level. The detecting includes at least one of initiating a query, receiving a task response, receiving a message, obtaining a partial task execution level, and comparing the partial task execution level to an execution level threshold. The execution level threshold includes a too fast threshold and a too slow threshold. For example, the processing module detects the DST execution unit with the unfavorable partial task execution level when the partial task execution level is less than the too slow threshold. As another example, the processing module detects the DST execution unit with the unfavorable partial task execution level when the partial task execution level is greater than the too fast threshold.

The method continues at step 352 where the processing module identifies one or more other DST execution units with a complementary partial task execution level. A complementary partial task execution level includes an execution level that is too fast when the DST execution unit is too slow and an execution level that is too slow when the DST execution unit is too fast. The identifying includes at least one of initiating a query, receiving a task response, receiving a message, obtaining a partial task execution level corresponding to another DST execution unit, and comparing the partial task execution level corresponding to the other DST execution to the partial task execution level.

The method continues at step 354 where the processing module selects one or more slices of one or more slice groups stored at a source DST execution unit associated with a partial task execution level that is below a low threshold. For example, the processing module selects slices of the DST execution unit when the DST execution unit is too slow (e.g., the partial task execution level of the DST execution unit is less than the too slow threshold). As another example, the processing module selects slices of another DST execution unit when the DST execution unit is too fast (e.g., the partial task execution level of the DST execution unit is greater than the too fast threshold).

The method continues at step 356 where the processing module selects a destination DST execution unit associated with the partial task execution level above a high threshold. For example, the processing module selects the DST execution unit as the destination DST execution unit when the DST execution unit is too fast. As another example, the processing module selects the other DST execution unit as the destination DST execution unit when the DST execution unit is too slow.

The method continues at step 358 where the processing module identifies partial tasks associated with the one or more slices of one or more slice groups. The identifying includes retrieving DST allocation information from at least one of a source DST execution unit and a DST client module associated with partial task execution.

The method continues at step 360 where the processing module facilitates transferring the partial tasks and the one or more slices of the one or more slice groups from the source DST execution unit to the destination DST execution unit. The facilitating includes selecting the slices, identifying associated partial tasks, transferring the slices, and transferring the partial tasks. The selecting the slices includes selecting a number of slices to be transferred of the one more slices of the one or more slice groups based on a difference between the partial task execution level of the DST execution unit and the partial task execution level of the other DST execution unit such that an expected partial task execution level of the DST execution unit and an expected partial task execution level of the other DST execution unit are favorable (e.g., after transferring the partial tasks).

The transferring the slices includes at least one of sending a slice transfer request to the source DST execution unit with regards to slices to be transferred, retrieving the slices to be transferred from the source DST execution unit, and sending the slices to be transferred to the destination DST execution unit. The identifying the associated partial tasks includes at least one of accessing DST allocation information with regards to the slices to be transferred to identify the associated partial tasks, a look up, and receiving the partial tasks. The transferring the partial tasks includes at least one of sending a partial task transfer request to the source DST execution unit with regards to partial tasks associated with the slices to be transferred, retrieving the partial tasks from the source DST execution unit, retrieving the partial tasks from a DST client module, and sending the partial tasks to the destination DST execution unit.

The method continues at step 362 where the processing module updates a slice location table to indicate that transfer slices are now associated with the destination DST execution unit and are disassociated with the source DST execution unit. For example, the processing module modifies DST allocation information accordingly. In addition, the processing module may facilitate updating one more slice groupings of associated encoded data slices (e.g., that include error recovery information, i.e., error coded slices) when the transferring of the partial tasks and the one more slices of the one or more slice groups is complete.

Figure 41A:
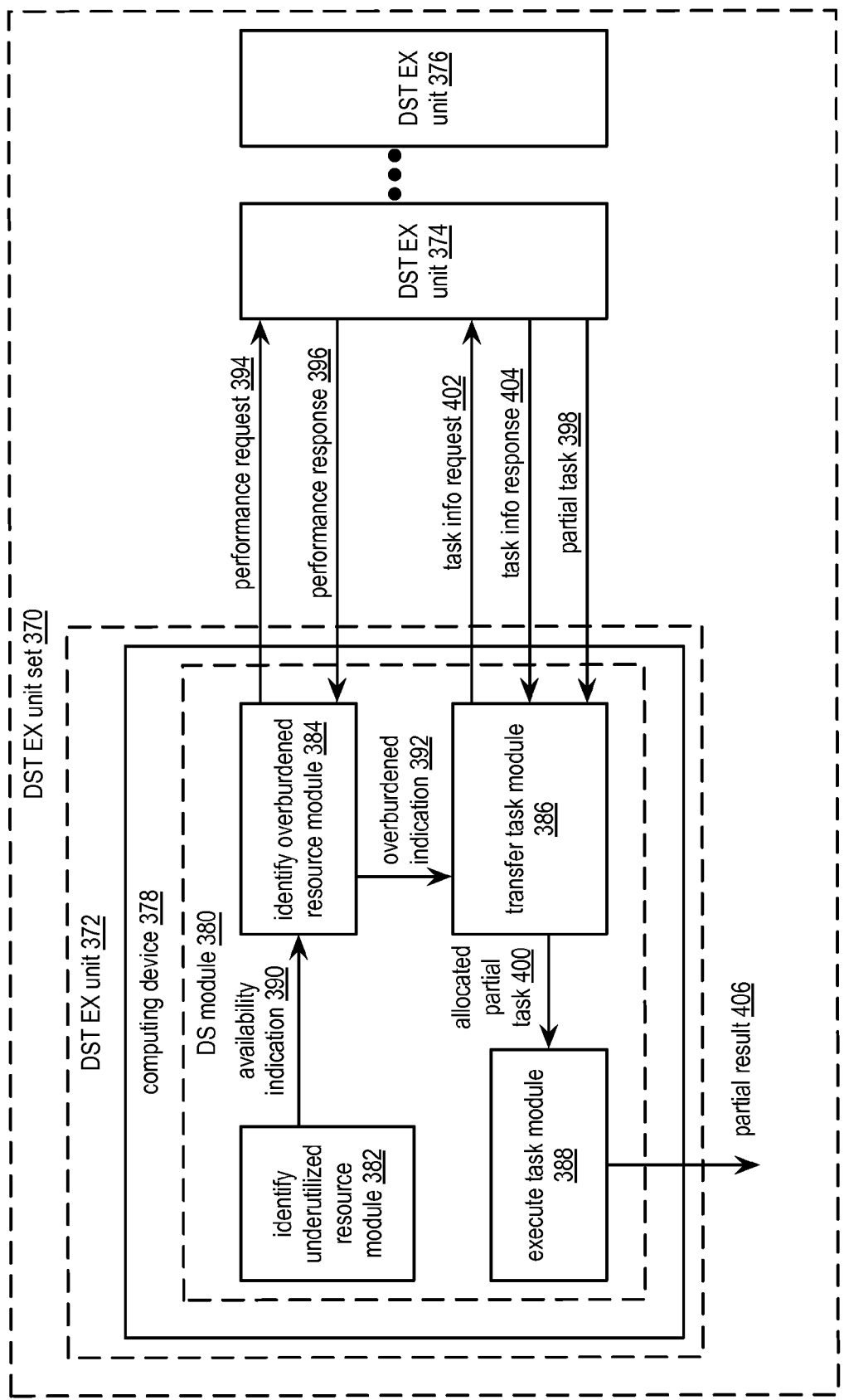
FIG. 41A is a schematic block diagram of another embodiment of a distributed computing system in accordance with the present invention.

FIG. 41A is a schematic block diagram of another embodiment of a distributed computing system that includes a distributed storage and task (DST) execution unit set 370. The DST execution unit set 370 includes a set of DST execution units 372, 374, through 376. A first DST execution unit 372 includes a computing device 378. The computing device 378 may be implemented utilizing at least one of a server, a storage unit, a storage server, a storage module, a dispersed storage (DS) processing unit, a DS unit, a DST execution unit, a user device, a DST processing unit, and a DST processing module. The computing device 378 includes a dispersed storage (DS) module 380. The DS module 380 may be implemented utilizing at least one of a processing module, one or more central processing unit cores, a software algorithm, a DST client module, and a DS processing module. The DS module 380 includes an identify underutilized resource module 382, an identify overburdened resource module 384, a transfer task module 386, and an execute task module 388.

The set of DST execution units 370 is assigned to perform tasks on large amounts of data. Each of the large amounts of data is partitioned into data partitions and each of the data partitions is further divided into data groups. Each of the tasks are divided into a set of partial tasks and various DST execution units of the set of DST execution units 370 are assigned various partial tasks of various ones of the sets of partial tasks to perform on various ones of the data groups of various ones of the data partitions of various ones of the large amounts of data. In such a system, a high degree of variance between expected task execution and actual task execution may occur when an abundance of variability exists with regards to at least one of the initial task assignment (e.g., randomness from externally assigned tasks) and task scheduling (e.g., having a central function). The system functions include identifying an underutilized resource, identifying an overburdened resource, facilitating transfer of a task from the overburdened resource to the underutilized resource, and facilitating execution of the task by the underutilized resource to provide a task execution efficiency improvement for the system.

With regards to identifying an underutilized resource, the identify underutilized resource module 382 determines that partial task processing resources of the first DST execution unit 372 are projected to be available based on a first local task queue, a first expected partial task performance factor, and a first expected partial task allocation factor. The identify underutilized resource module 382 determines that the partial task processing resources of the first DST execution unit are projected to be available by a series of determining steps. A first determining step includes the identify underutilized resource module 382 determining that a current snapshot of the first local task queue compares favorably to a current queue threshold. A second determining step includes the identify underutilized resource module 382 determining that a projected snapshot of the first local task queue compares favorably to a projected queue threshold that is based on at least one of the first expected partial task performance factor and the first expected partial task allocation factor. When the current snapshot of the first local task queue compares favorably to the current queue threshold and the projected snapshot of the first local task queue compares favorably to the projected queue threshold, a third determining step includes the identify underutilized resource module 382 indicating that the partial task processing resources of the first DST execution unit are projected to be available producing an availability indication 390.

With regards to identifying an overburdened resource, the identify overburdened resource module 384 ascertains that partial task processing resources of a second DST execution unit 374 of the set of DST execution units 370 are projected to be overburdened based on a second local task queue, a second expected partial task performance factor (e.g., when the unit will get to the task, how long will it take to perform the task, proficiency at performing the task, etc.), and a second expected partial task allocation factor (e.g., how much and what type of tasks). The identify overburdened resource module 384 identifies (e.g., via a query, a lookup) the second DST execution unit 374 based on a common task criteria with the first DST execution unit 372, wherein the common task criteria includes one or more of a common site, a common large amount of data, a common task allocation unit, and a common data partition. The identify overburdened resource module 384 ascertains by one or more of receiving an ascertaining indication (e.g., from the second DST execution unit 374) and determining based on obtaining one or more of the second local task queue, the second expected partial task performance factor, and the second expected partial task allocation factor (e.g., from the second DST execution unit 374). The identify overburdened resource module 384 issues a performance request 394 and receives a performance response 396 that includes one or more of the ascertaining indication, the second local task queue, the second expected partial task performance factor, and the second expected partial task allocation factor.

The identify overburdened resource module 384 ascertains that the partial task processing resources of the second DST execution unit 374 of the set of DST execution units 370 are projected to be overburdened by a series of ascertaining steps. A first ascertaining step includes the identify overburdened resource module 384 ascertaining (e.g., receive via performance response 396, initiating a test, determining) that a current snapshot of the second local task queue compares unfavorably to a current queue threshold. A second ascertaining step includes the identify overburdened resource module 384 ascertaining (e.g., receive via performance response 396, initiating a test, determining) that a projected snapshot of the second local task queue compares unfavorably to a projected queue threshold that is based on at least one of the second expected partial task performance factor and the second expected partial task allocation factor. When at least one of the current snapshot of the second local task queue compares unfavorably to the current queue threshold and the projected snapshot of the second local task queue compares unfavorably to the projected queue threshold, a third ascertaining step includes the identify overburdened resource module 384 indicating that the partial task processing resources of the second DST execution unit 374 are projected to be overburdened by producing an overburdened indication 392.

With regards to facilitating transfer of the task from the overburdened resource to the underutilized resource, the transfer task module 386 receives, from the second DST execution unit 374, a partial task 398 assigned to the second DST execution unit 374 in accordance with a partial task allocation transfer policy to produce an allocated partial task 400. The transfer task module 386 receives the partial task by a series of receiving steps. A first receiving step includes the transfer task module 386 determining unexecuted partial tasks assigned to the second DST execution unit 374. The determining includes issuing a task information request 402 to the second DST execution unit 374 and receiving a task information response 404 that includes a list of unexecuted partial tasks assigned to the second DST execution unit 374. A second receiving step includes the transfer task module 386 selecting one of the unexecuted partial tasks based on execution capabilities of the first DST execution unit and the second expected partial task performance factor. A third receiving step includes the transfer task module 386 receiving, from the second DST execution unit 374, the selected partial task 398 and a corresponding data group.

For example, the transfer task module 386 issues another task information request 402 to the second DST execution unit 374, where the other task information request 402 includes a request to transfer the selected partial task 398.

The transfer task module 386 further functions to perform a series of updating steps. In a first updating step, the transfer task module 386 updates the second local task queue by removing the partial task (e.g., issuing yet another task information request 402 to the second DST execution unit 374, where the request includes a task removal request). In a second updating step, the transfer task module 386 updates the second expected partial task performance factor based on removing the partial task. In a third updating step, the transfer task module 386 updates the second expected partial task allocation factor based on removing the partial task.

With regards to facilitating execution of the task by the underutilized resource, the execute task module 388 executes the allocated partial task 400 the execute task module 388 executes the allocated partial task 400 by a series of execution steps. A first execution step includes the execute task module 388 updating the first local task queue to include the allocated partial task 400. A second execution step includes the execute task module 388 updating the first expected partial task performance factor based on the allocated partial task 398. A third execution step includes the execute task module 388 updating the first expected partial task allocation factor based on the allocated partial task 400. A fourth execution step includes the execute task module 388 performing the allocated partial task 400 on the corresponding data group to produce a partial result 406.

Figure 41B:
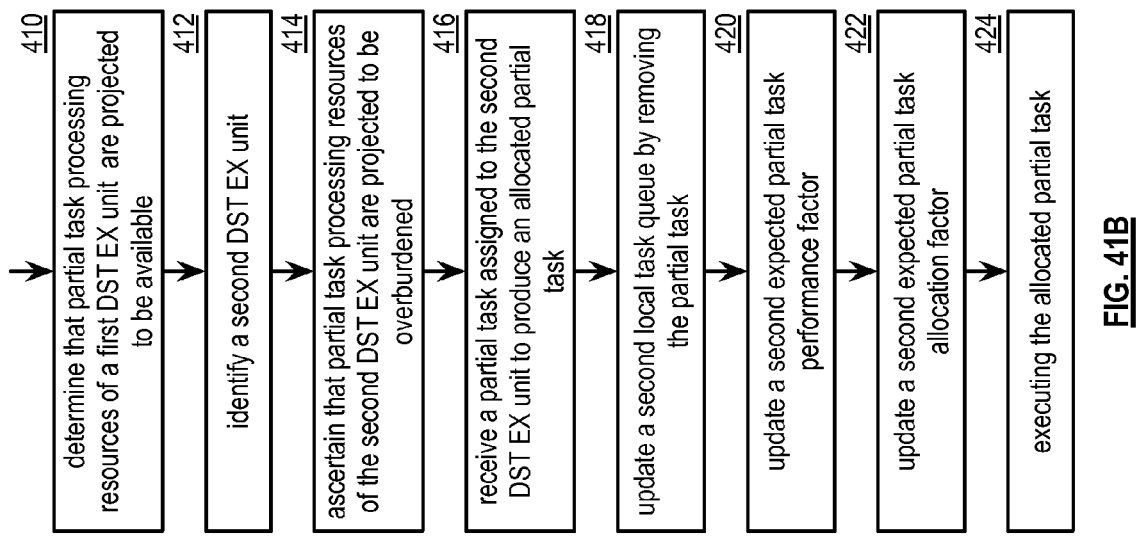
FIG. 41B is a flowchart illustrating an example of transferring a partial task in accordance with the present invention.

FIG. 41B is a flowchart illustrating an example of transferring a partial task. The method begins at step 410 where a processing module (e.g., of a distributed storage and task (DST) client module of a first DST execution unit of a distributed computing system) determines that partial task processing resources of the first DST execution unit are projected to be available based on a first local task queue, a first expected partial task performance factor, and a first expected partial task allocation factor. The first DST execution unit is one of a set of DST execution units, where the set of DST execution units is assigned to perform tasks on large amounts of data. Each of the large amounts of data is partitioned into data partitions, where each of the data partitions is further divided into data groups. Each of the tasks is divided into a set of partial tasks, and various DST execution units of the set of DST execution units are assigned various partial tasks of various ones of the sets of partial tasks to perform on various ones of the data groups of various ones of the data partitions of various ones of the large amounts of data.

The determining that the partial task processing resources of the first DST execution unit are projected to be available includes a series of determining steps. A first determining step includes determining that a current snapshot of the first local task queue compares favorably to a current queue threshold. A second determining step includes determining that a projected snapshot of the first local task queue compares favorably to a projected queue threshold that is based on at least one of the first expected partial task performance factor and the first expected partial task allocation factor. When the current snapshot of the first local task queue compares favorably to the current queue threshold and the projected snapshot of the first local task queue compares favorably to the projected queue threshold, a third determining step includes indicating that the partial task processing resources of the first DST execution unit are projected to be available.

The method continues at step 412 where the processing module identifies a second DST execution unit of the set of DST execution units based on a common task criteria with the first DST execution unit, where the common task criteria includes one or more of a common site, a common large amount of data, a common task allocation unit, and a common data partition. For example, the processing module identifies another DST execution unit at common site with the first DST execution unit as the second DST execution unit.

The method continues at step 414 where the processing module ascertains that partial task processing resources of the second DST execution unit of the set of DST execution units are projected to be overburdened based on a second local task queue, a second expected partial task performance factor, and a second expected partial task allocation factor. The ascertaining that the partial task processing resources of the second DST execution unit of the set of DST execution units are projected to be overburdened includes a series of ascertaining steps. A first ascertaining step includes ascertaining that a current snapshot of the second local task queue compares unfavorably to a current queue threshold. A second ascertaining step includes ascertaining that a projected snapshot of the second local task queue compares unfavorably to a projected queue threshold that is based on at least one of the second expected partial task performance factor and the second expected partial task allocation factor. When at least one of the current snapshot of the second local task queue compares unfavorably to the current queue threshold and the projected snapshot of the second local task queue compares unfavorably to the projected queue threshold, a third ascertaining step includes indicating that the partial task processing resources of the second DST execution unit are projected to be overburdened.

The method continues at step 416 where the processing module receives, from the second DST execution unit, a partial task assigned to the second DST execution unit in accordance with a partial task allocation transfer policy to produce an allocated partial task. The receiving the partial task includes a series of receiving steps. A first receiving step includes determining unexecuted partial tasks assigned to the second DST execution unit. A second receiving step includes selecting one of the unexecuted partial tasks based on execution capabilities of the first DST execution unit and the second expected partial task performance factor. A third receiving step includes receiving, from the second DST execution unit, the selected partial task and a corresponding data group.

The method continues at step 418 where the processing module updates the second local task queue by removing the partial task from the second local task queue (e.g., by issuing a removal request to the second DST execution unit). The method continues at step 420 where the processing module updates the second expected partial task performance factor based on removing the partial task. For example, the processing module issues an update request to the second DST execution unit. As another example, the processing module updates the second expected partial task performance factor in a local memory of the first DST execution unit. The method continues at step 422 where the processing module updates (e.g., at least one of the first DST execution unit and the second DST execution unit) the second expected partial task allocation factor based on removing the partial task.

The method continues at step 424 where the processing module executes the allocated partial task. The executing the partial task includes a series of executing steps. A first executing step includes updating the first local task queue to include the allocated partial task. A second executing step includes updating the first expected partial task performance factor based on the allocated partial task. A third executing step includes updating the first expected partial task allocation factor based on the allocated partial task. A fourth executing step includes performing the allocated partial task on the corresponding data group to produce a partial result.

Figure 41C:
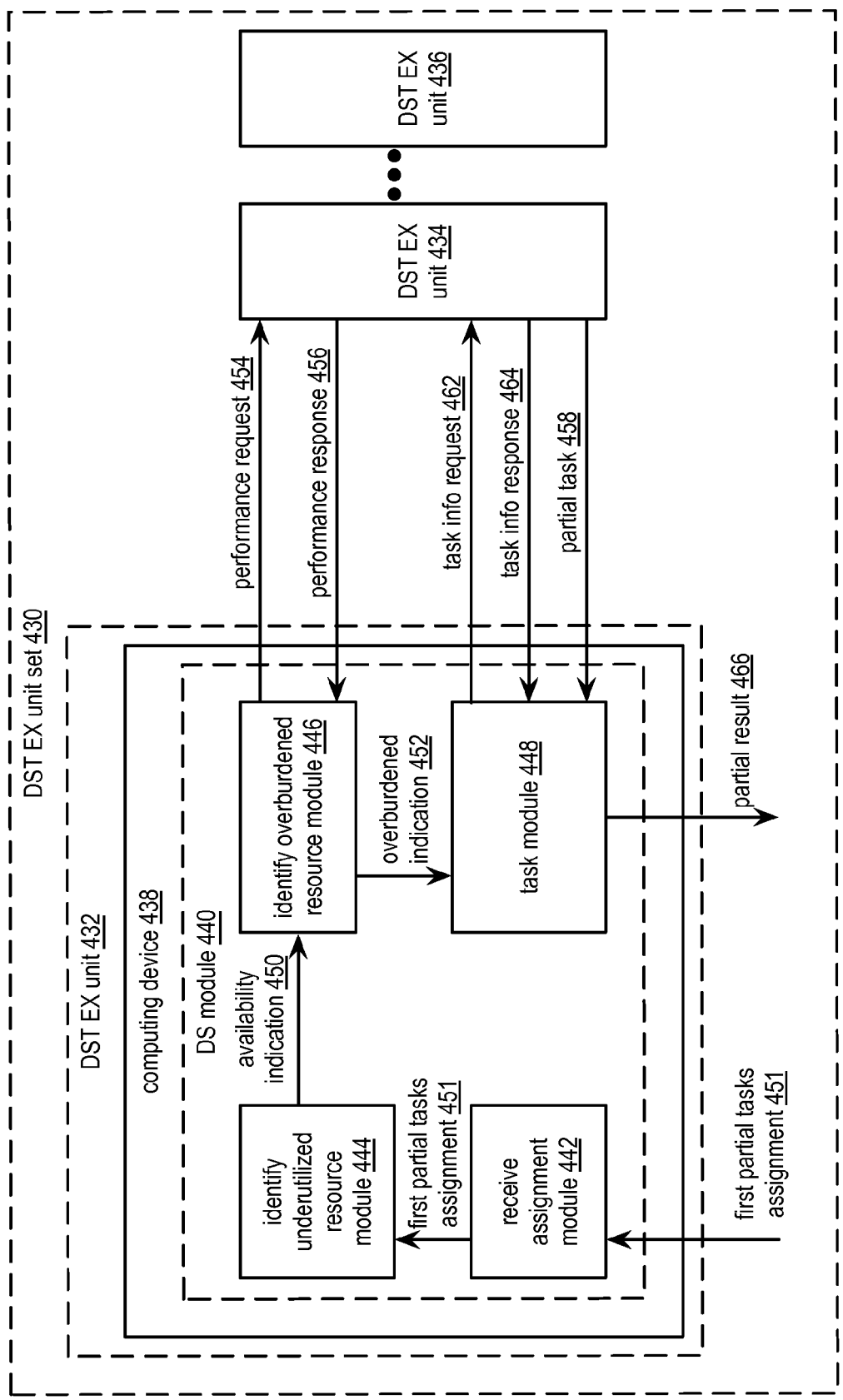
FIG. 41C is a schematic block diagram of another embodiment of a distributed computing system in accordance with the present invention.

FIG. 41C is a schematic block diagram of another embodiment of a distributed computing system that includes a distributed storage and task (DST) execution unit set 430. The DST execution unit set 430 includes a set of DST execution units 432, 434, through 436. A first DST execution unit 432 includes a computing device 438. The computing device 438 may be implemented utilizing at least one of a server, a storage unit, a storage server, a storage module, a dispersed storage (DS) processing unit, a DS unit, a DST execution unit, a user device, a DST processing unit, and a DST processing module. The computing device 438 includes a DS module 440. The DS module 440 may be implemented utilizing at least one of a processing module, one or more central processing unit cores, a software algorithm, a DST client module, and a DS processing module. The DS module 440 includes a receive assignment module 442, an identify underutilized resource module 444, an identify overburdened resource module 446, and a task module 448.

The set of DST execution units 370 is assigned to perform tasks on large amounts of data. The large amount of data is divided into a plurality of data partitions. Each data partition is dispersed storage error encoded to produce a set of data slice groups. A first sub-set of the set of data slice groups includes contiguous data slice groups and a second sub-set of the set of data slice groups includes error coded data slice groups. In such a system, a high degree of variance between expected task execution and actual task execution may occur when an abundance of variability exists with regards to at least one of the initial task assignment (e.g., randomness from externally assigned tasks) and task scheduling (e.g., having a central function). The system functions include receiving assignment of partial tasks, identifying an underutilized resource, identifying an overburdened resource, and facilitating transfer of a task from the overburdened resource to the underutilized resource for execution to provide a task execution efficiency improvement for the system.

With regards to receiving assignment of partial tasks, the receive assignment module 442 receives assignment 451 of executing first partial tasks on first contiguous data slice groups of the first partition of the plurality of data partitions. With regards to identifying the underutilized resource, the identify underutilized resource module 444 performs a series of identifying steps. In a first identifying step, the identify underutilized resource module 444 determines a first expected partial task performance factor based on a comparison of the first partition of the plurality of data partitions to the plurality of data partitions. For example, the identify underutilized resource module 444 determines a percentage of contiguous data slice groups assigned the first DST execution unit 432. As such, the partial task processing resources of the first DST execution unit 432 are projected to be more available when the determined percentage is lower than average and/or lower than a percentage threshold. In a second identifying step, the identify underutilized resource module 444 determines that partial task processing resources of the first DST execution unit 432 are projected to be available based on the assignment of the first contiguous data slice groups, the first expected partial task performance factor, and a first expected partial task allocation factor (e.g., a projection based on historical assignments) to produce an availability indication 450.

With regards to identifying the overburdened resource, the identify overburdened resource module 446 ascertains that partial task processing resources of a second DST execution unit 434 of the set of DST execution units 430 are projected to be overburdened based on assignment of second contiguous data slice groups assigned to the second DST unit 434, a second expected partial task performance factor, and a second expected partial task allocation factor to produce an overburdened indication 452. The second DST execution unit 434 is assigned to execute second partial tasks on second contiguous data slice groups of the second partition of the plurality of data partitions. The ascertaining includes issuing a performance request 454 to the second DST execution unit 434 and receiving a performance response 456 from the second DST execution unit 434. The performance response 456 includes one or more of assignment of second contiguous data slice groups assigned to the second DST unit 434, the second expected partial task performance factor, and the second expected partial task allocation factor. The identify overburdened resource module 446 determines the second expected partial task performance factor based on a comparison of a second partition of the plurality of data partitions to the plurality of data partitions. Alternatively, the identify overburdened resource module 446 receives the second expected partial task performance factor from the second DST execution unit 434.

With regards to facilitating transfer of the task from the overburdened resource to the underutilized resource for execution, the task module 448 receives, from the second DST execution unit 434, a partial task 458 and a corresponding one of the second contiguous data slice groups in accordance with a partial task allocation transfer policy and executes the partial task on the corresponding one of the second contiguous data slice groups to produce a partial result 466. The task module 448 receive receives the partial task by determining that the partial task regarding the corresponding one of the second contiguous data slice groups is pending execution by the second DST execution unit and requesting the partial task 458 and the corresponding one of the second contiguous data slice groups. The requesting includes issuing a task information request 462 to the second DST execution unit 434, receiving a task information response 464 that includes a list of partial tasks pending execution by the second DST execution unit 434, selecting the partial task 458, and issuing another task information request 462 that includes a request for the partial task 458

Figure 41D:
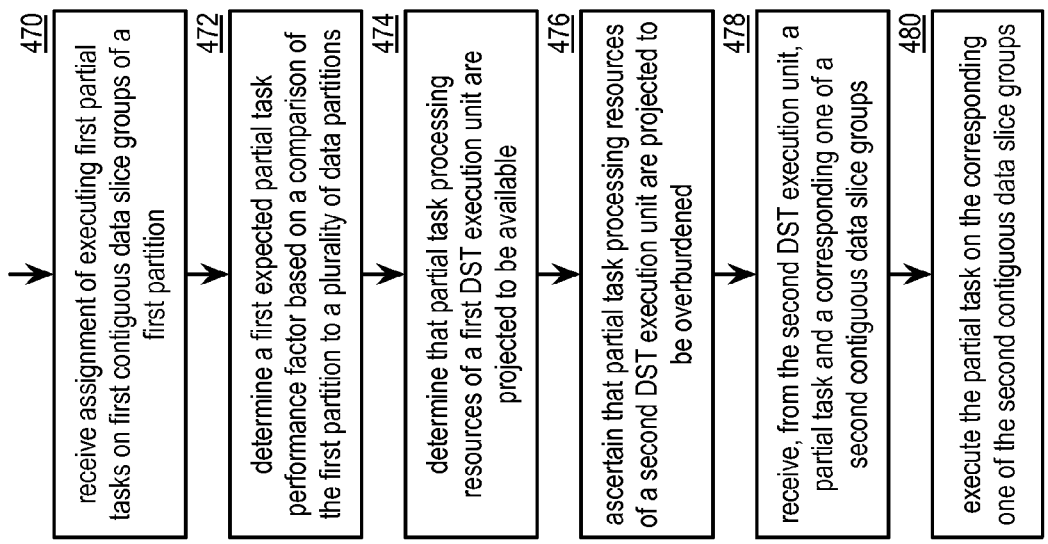
FIG. 41D is a flowchart illustrating another example of transferring a partial task in accordance with the present invention.

FIG. 41D is a flowchart illustrating another example of transferring a partial task. The method begins at step 470 where a processing module (e.g., of a distributed storage and task (DST) client module of a first DST execution unit of a distributed computing system) receives assignment of executing first partial tasks on first contiguous data slice groups of a first partition of a plurality of data partitions. The first DST execution unit is one of a set of DST execution units. A large amount of data is divided into the plurality of data partitions and each data partition is dispersed storage error encoded to produce a set of data slice groups. A first sub-set of the set of data slice groups includes contiguous data slice groups and a second sub-set of the set of data slice groups includes error coded data slice groups.

The method continues at step 472 where the processing module determines a first expected partial task performance factor based on a comparison of the first partition of the plurality of data partitions to the plurality of data partitions (e.g., percentage of contiguous data slice groups assigned to DST unit, more availability to help execute tasks from an overburdened DST execution unit when smaller). The method continues at step 474 where the processing module determines that partial task processing resources of the first DST execution unit are projected to be available based on the assignment of the first contiguous data slice groups, the first expected partial task performance factor, and a first expected partial task allocation factor.

The method continues at step 476 where the processing module ascertains that partial task processing resources of a second DST execution unit of the set of DST execution units are projected to be overburdened based on assignment of second contiguous data slice groups assigned to the second DST unit, a second expected partial task performance factor, and a second expected partial task allocation factor. The processing module determines the second expected partial task performance factor based on a comparison of a second partition of the plurality of data partitions to the plurality of data partitions (e.g., more overburdened when percentage is higher), where the second DST execution unit is assigned to execute second partial tasks on second contiguous data slice groups of the second partition of the plurality of data partitions.

The method continues at step 478 where the processing module receives, from the second DST execution unit, a partial task and a corresponding one of the second contiguous data slice groups in accordance with a partial task allocation transfer policy. The receiving the partial task includes determining that the partial task regarding the corresponding one of the second contiguous data slice groups is pending execution by the second DST execution unit and requesting the partial task and the corresponding one of the second contiguous data slice groups. The method continues at step 480 where the processing module executes the partial task on the corresponding one of the second contiguous data slice groups.

Figure 42:
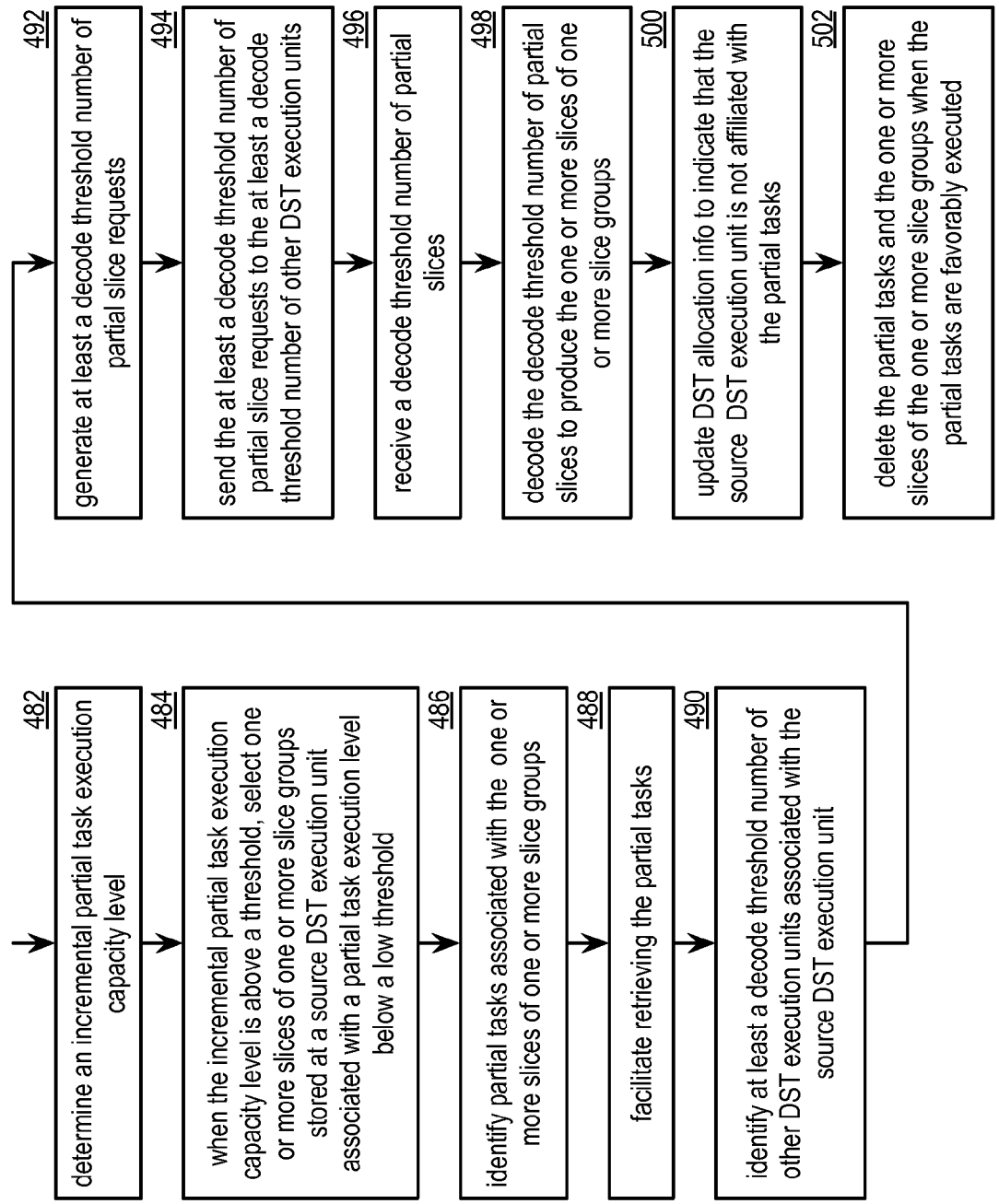
FIG. 42 is a flowchart illustrating another example of acquiring a task in accordance with the present invention.

FIG. 42 is a flowchart illustrating another example of acquiring a task. The method begins with step 482 where a processing module (e.g., of a distributed storage and task (DST) execution unit) determines an incremental partial task execution capacity level (e.g., based on one or more of currently scheduled tasks, performance history, an estimate of future task assignments). When the incremental partial task execution capacity level is above a threshold, the method continues at step 484 where the processing module selects one or more slices of one or more slice groups stored at a source DST execution unit associated with a partial task execution level below a low threshold. The method continues at step 486 where the processing module identifies partial tasks associated with the one or more slices of one or more slice groups. The method continues at step 488 where the processing module facilitates retrieving the partial tasks. The facilitating includes at least one of sending a partial task retrieval request to the source DST execution unit, retrieving the partial tasks from a DST client module, and obtaining DST allocation information.

The method continues at step 490 where the processing module identifies at least a decode threshold number of other DST execution units associated with the source DST execution unit (e.g., other pillars of a pillar width number of DST execution units). The identifying includes at least one of retrieving DST allocation information, a storage location table lookup, and retrieving slice grouping information. The method continues at step 492 where the processing module generates at least a decode threshold number of partial slice requests. Each request includes one or more of a partial slice identifier (ID), a locally stored slice ID, an encoding matrix, a square matrix, and pillar numbers associated with the decode threshold number of DST execution units.

The method continues at step 494 where the processing module sends the at least a decode threshold number of partial slice requests to the at least a decode threshold number of other DST execution units. Each DST execution unit produces a partial slice by obtaining an encoding matrix utilized to generate a desired slice (e.g., extract from the partial request, retrieve from a memory), reducing the encoding matrix to produce a square matrix that exclusively includes rows identified in the partial request (e.g., slice pillars associated with participating units of a decode threshold number of units), inverting the square matrix to produce an inverted matrix (e.g. alternatively, may extract the inverted matrix from the partial request), matrix multiplying the inverted matrix by a corresponding locally stored slice to produce a vector, and matrix multiplying the vector by a row of the encoding matrix corresponding to the desired slice to be partial encoded (e.g. alternatively, may extract the row from the partial request), to produce the partial slice (e.g., desired slice to be built as identified in the partial request).

The method continues at step 496 where the processing module receives a decode threshold number of partial slices. The method continues at step 498 where the processing module decodes the decode threshold number of partial slices to produce the one or more slices of one or more slice groups. For example, the processing module decodes the decode threshold number of partial slices by performing a logical exclusive OR (XOR) on each of the partial slices to produce the one more slices. The method continues at step 500 where the processing module updates DST allocation information to indicate that the source DST execution unit is not affiliated with the partial tasks. The method continues at step 502 where the processing module deletes the partial tasks and the one or more slices of the one or more slice groups when the partial tasks are favorably executed.

Figure 43:
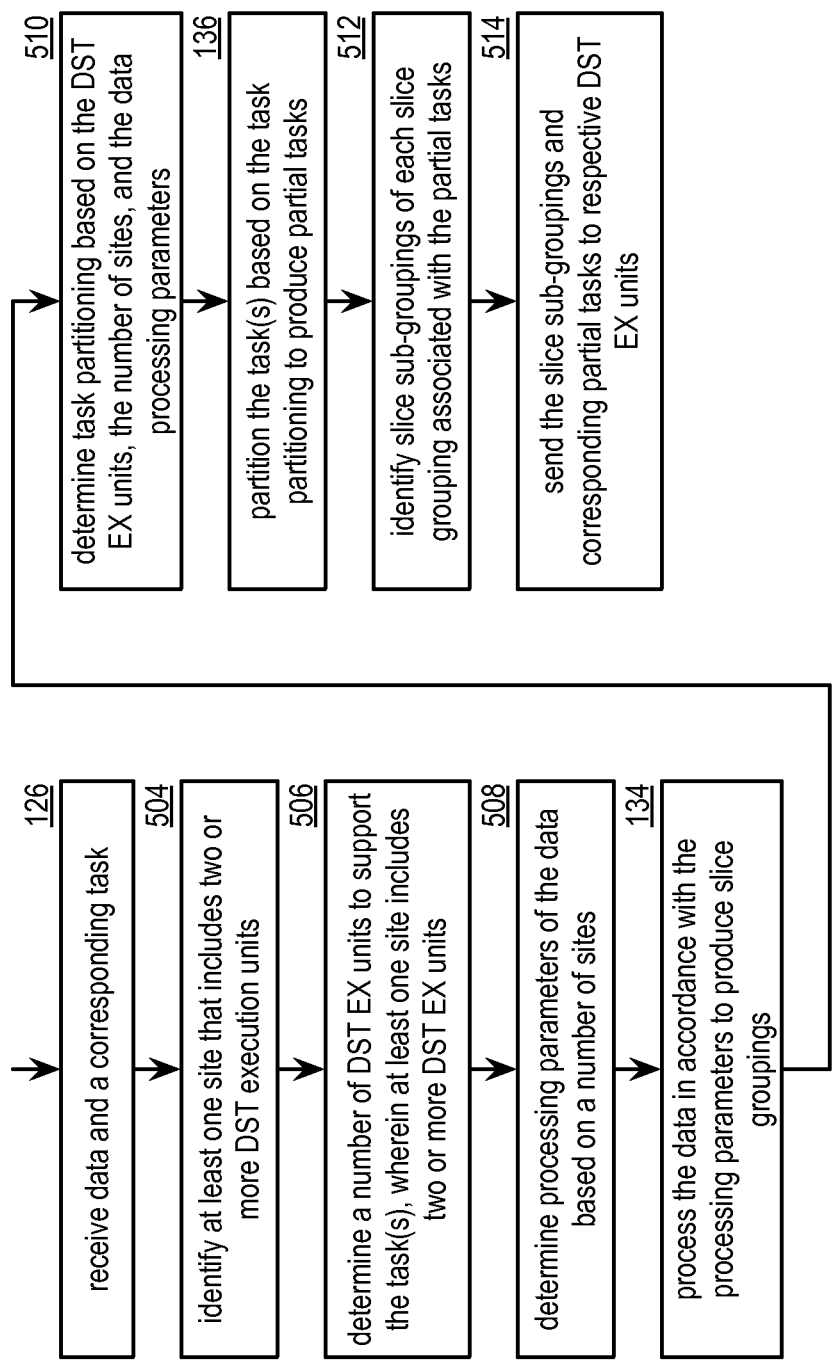
FIG. 43 is a flowchart illustrating an example of balancing tasks in accordance with the present invention.

FIG. 43 is a flowchart illustrating an example of balancing tasks, which includes similar steps to FIG. 5. The method begins with step 126 of FIG. 5 where a processing module (e.g., of a distributed storage and task (DST) client module) receives data and a corresponding task. The method continues at step 504 where the processing module identifies at least one site that includes two or more DST execution units. The identifying include one or more of accessing a system registry, accessing system topology information, accessing DST allocation information, and accessing a DST network address to physical location table.

The method continues at step 506 where the processing module determines a number of DST execution units to support the task, where at least one site includes two or more DST execution units. For example, the processing module matches a number of expected partial tasks of the task to the two or more DST execution units of the at least one site (e.g., a favorable total execution capacity level to support execution of the expected partial tasks). The method continues at step 508 where the processing module determines processing parameters of the data based on a number of sites. For example, processing module selects a common pillar for the two or more DST execution units of the at least one site. The method continues with step 134 of FIG. 5 where the processing module processes the data in accordance with the processing parameters to produce slice groupings.

The method continues at step 510 where the processing module determines task partitioning based on the DST execution units, the number of sites, and the data processing parameters. For example, the processing module partitions the tasks in accordance with task execution capacity levels of the two or more DST execution units. As another example, the processing module partitions the tasks such that a common task is assigned to each of the two or more DST execution units per site (e.g., executing partial tasks on slices of a common pillar). The method continues with step 136 of FIG. 5 where the processing module partitions the task based on the task partitioning to produce partial tasks.

The method continues at step 512 where the processing module identifies slice sub-groupings of each slice grouping associated with the partial tasks. For example, the processing module partitions a slice grouping into some groupings, wherein a sub-grouping is assigned to DST execution units at a same site as other sub groupings. The method continues at step 514 where the processing module sends the slice sub-groupings and corresponding partial tasks to respective DST execution units. For example, the processing module sends slices of a common pillar to the two or more DST execution units of the common site.

Figure 44:
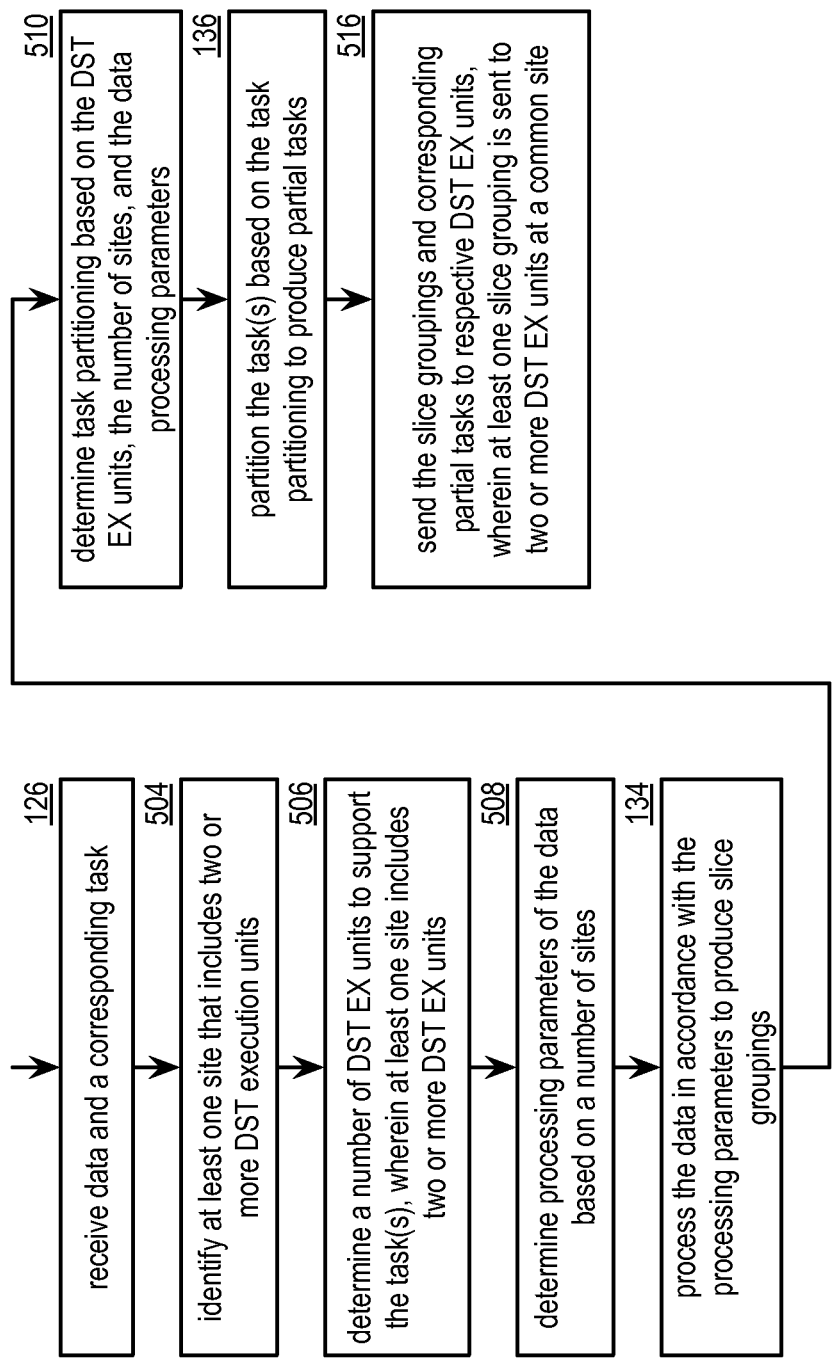
FIG. 44 is a flowchart illustrating another example of balancing tasks in accordance with the present invention.

FIG. 44 is a flowchart illustrating another example of balancing tasks, which includes similar steps of FIGS. 5 and 43. The method begins with step 126 of FIG. 5 where a processing module (e.g., of a distributed storage and task (DST) client module) receives data and a corresponding task. The method continues with steps 504, 506, and 508 of FIG. 43 where the processing module identifies at least one site that includes two or more DST execution units, determines a number of DST execution units to support the task, where at least one site includes two or more DST execution units, and determines processing parameters of the data based on a number of sites. The method continues with step 134 of FIG. 5 where the processing module processes the data in accordance with the processing parameters to produce slice groupings. The method continues with step 510 of FIG. 43 where the processing module determines task partitioning based on the DST execution units, the number of sites, and the data processing parameters. The method continues with step 136 of FIG. 5 where the processing module partitions the task based on the task partitioning to produce partial tasks.

The method continues at step 516 where the processing module sends the slice groupings and corresponding partial tasks to respective DST execution units, where at least one slice grouping is sent to two or more DST execution units a common site. The sending includes selecting a slice grouping and sending the slice grouping to the respective two or more DST execution units at the common site. The selecting includes identifying slices of a common pillar. The sending includes sending the slice grouping to a first DST execution unit at the common site, sending the slice grouping to a second DST execution unit at the common site, and sending the slice grouping to the first DST execution unit and the second DST execution unit at the common site. The first DST execution unit forwards the slice grouping to other DST execution units of the two or more DST execution units at the common site when the processing module sends the slice grouping to the first DST execution unit. As a result, the two or more DST execution units receive an identical slice grouping.

Figure 45:
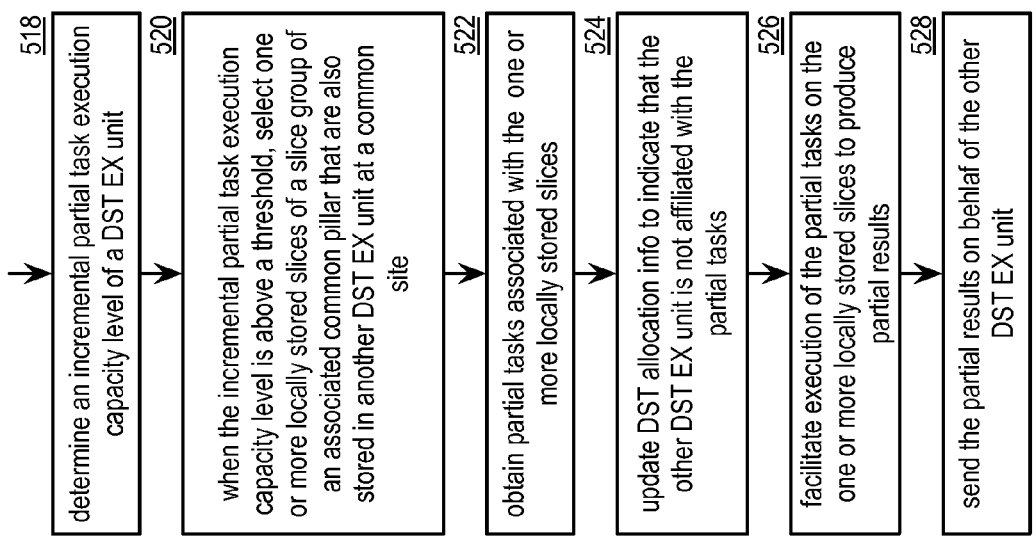
FIG. 45 is a flowchart illustrating another example of balancing tasks in accordance with the present invention.

FIG. 45 is a flowchart illustrating another example of balancing tasks. The method begins at step 518 where a processing module (e.g., of a distributed storage and task (DST) execution unit) determines an incremental partial task execution capacity level of a DST execution unit. When the incremental partial task execution capacity level is above a threshold, the method continues at step 520 where the processing module selects one or more locally stored slices only slice group of an associated common pillar that are also stored in another DST execution unit at a common site. The selecting includes obtaining a partial task to slice identifier (ID) list (e.g., of DST allocation information) and identifying the one or more locally stored slices of a slice group of an associated common pillar based on the list. Alternatively, the processing module may generate and send a partial task execution request to execute more partial tasks of more slices that are already stored in the DST execution unit.

The method continues at step 522 where the processing module obtains partial tasks associated with the one or more locally stored slices. The obtaining includes at least one of sending a partial task retrieval request to the other DST execution unit, retrieving the partial tasks from a DST client module, and retrieving DST allocation information to identify the partial tasks. The method continues at step 524 where the processing module updates DST allocation information to indicate that the other DST execution unit is not affiliated with the partial tasks. The method continues at step 526 where the processing module facilitates execution of the partial tasks on the one or more locally stored slices to produce partial results. The facilitating includes retrieving the one or more locally stored slices and performing the partial tasks to produce the partial results. The method continues at step 528 where the processing module sends the partial results on behalf of the other DST execution unit. For example, the processing module sends the partial results to a corresponding DST client module. As another example, the processing module sends the partial results to the other DST execution unit.

FIG. 46A is a flowchart illustrating an example of determining, which includes similar steps to FIG. 5. The method begins with steps 126 and 128 of FIG. 5 where a processing module (e.g., of a distributed storage and task (DST) client module) receives data and a corresponding task and determines a number of DST execution units to support the task. The method continues at step 530 where the processing module determines a slice grouping approach such that each DST execution unit is associated with no more than two pillars of slices. For example, the processing module determines the slice grouping approach such that a first DST execution unit is assigned to store slice groupings associated with a first pillar and a fourth pillar, a second DST execution unit is assigned to store slice groupings associated with a second pillar and a fifth pillar, a third DST execution unit is assigned to store slice groupings associated with a third pillar and a sixth pillar, a fourth DST execution unit is assigned to store slice groupings associated with the fourth pillar and the first pillar, a fifth DST execution unit is assigned to store slice groupings associated with the fifth pillar and the second pillar, and a sixth DST execution unit is assigned to store slice groupings associated with the sixth pillar and the third pillar. The method continues at step 532 where the processing module determines processing parameters of the data based on the number of DST execution units and the slice grouping approach, where the parameters include a pillar width that is twice a decode threshold number. For example, the processing module determines the decode threshold number as three and the pillar width at six. As such, each decode threshold number of non-encoded slices is paired with a corresponding encoded slices of remaining slices of a pillar width number of a set of slices. For instance, each of three non-encoded slices are paired with each of three corresponding encoded slices such that slices of pairs of pillars are stored by a pair of DST execution units (e.g., each DST execution unit stores slices associated with two pillars).

The method continues at step 534 where the processing module processes the data in accordance with the processing parameters to produce slice groupings in accordance with the slice grouping approach. The method continues with steps 132 and 136 of FIG. 5 where the processing module determines task partitioning based on the DST execution units and the data processing parameters and partitions the task based on the task partitioning to produce partial tasks. The method continues at step 536 where the processing module sends the slice groupings and corresponding partial tasks to respective DST execution units in accordance with the slice grouping approach.

FIG. 46B is a diagram illustrating an example of a dispersed storage and task execution unit to pillar mapping. The mapping may be utilized to produce a slice grouping approach. The mapping includes a distributed storage and task (DST) execution unit to pillar mapping field 540 and an associated chunk set field 538. The DST execution unit to pillar mapping field 540 includes a pillar entry for each DST execution unit of a set of DST execution units. The pillar entry includes an indication of a pillar identifier (ID) associated with each DST execution unit of a set of DST execution units based on a corresponding chunkset ID. For example, a first DST execution unit is assigned to store slice groupings associated with a first pillar for chunksets 1, 3, and 4, and a fourth pillar for chunkset 2; a second DST execution unit is assigned to store slice groupings associated with a second pillar for chunksets 1, 2, and 4, and a fifth pillar for chunkset 3; a third DST execution unit is assigned to store slice groupings associated with a third pillar for chunksets 1-3, and a sixth pillar for chunkset 4; a fourth DST execution unit is assigned to store slice groupings associated with the fourth pillar for chunksets 1, 3, and 4, and the first pillar for chunkset 2; a fifth DST execution unit is assigned to store slice groupings associated with the fifth pillar for chunksets 1, 2, and 4, and the second pillar for chunkset 3; and a sixth DST execution unit is assigned to store slice groupings associated with the sixth pillar for chunksets 1-3, and the third pillar for chunkset 4.

Figure 47A:
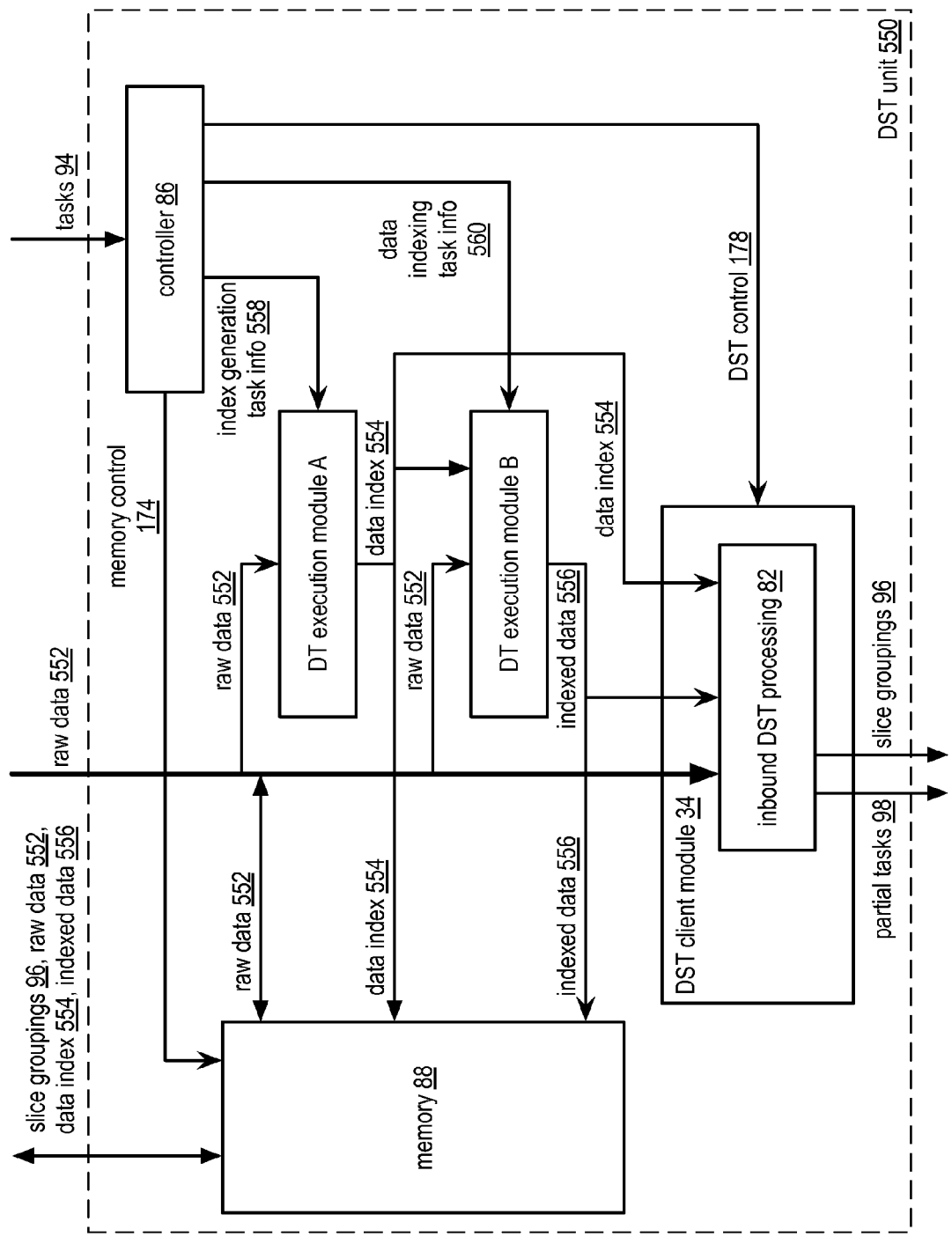
FIG. 47A is a schematic block diagram of another example of a dispersed storage and task execution unit in accordance with the present invention.

FIG. 47A is a diagram of an example embodiment of a distributed storage and task (DST) unit 550 that includes a controller 86, a memory 88, a distributed task (DT) execution module A, a DT execution module B, and a DST client module 34. The DT execution module A and DT execution module B may be implemented utilizing one or more modules. The DST client module 34 includes at least one of an inbound DST processing 82 and an outbound DST processing. The DST unit 550 ingests raw data 552 of large amounts of data for storage and processing in accordance with a received task 94. The task 94 includes one or more of a raw data search task and a partial task for execution on slices sent to the DST unit 550 (e.g., storage and/or processing).

The controller 86 produces control information based on the task 94 to control one or more of the memory 88, DT execution module A, DT execution module B, and the DST client module 34. For example, the controller 86 produces a memory control 174 such that the memory 88 caches the raw data 552 and generates index generation task information 558 such that DT execution module A processes the raw data 552 in accordance with the index generation task information 558 to produce a data index 554. The index generation task information 558 includes one or more of a search parameter, a keyword, pattern recognition information, and timing information. The data index 554 includes metadata of the raw data 552 including one or more of keywords, dates, internet protocol addresses, partial content, word counts, statistics, a summary, a distributed storage and task network (DSTN) address corresponding to raw data storage, a DSTN address corresponding to data index storage, and a DSTN address corresponding to index data storage.

The controller 86 may also generate data indexing task information 560 with regards to indexing of the data index 554. The data indexing task information 560 includes one or more of data reduction instructions, a keyword filter, a data index reference, and an indexed data format. The DT execution module B processes the raw data of 552 in accordance with the data indexing task information 560 to produce indexed data 556. The indexed data 556 includes a subset of the raw data 552 organized in accordance with the data index 554.

The controller 86 controls the memory 88 with the memory control 174 to facilitate caching one or more of the raw data 552, the data index 554, and the indexed data 556. The memory control 174 may also facilitate the memory 88 outputting one or more of the raw data 552, the data index 554, and the indexed data 556. The memory control 174 may also facilitate the memory 88 inputting slice groupings 96 for caching in the memory 88 to facilitate further processing by DT execution module A and/or B.

The controller 86 generates and outputs a DST control 178 to the DST client module 34 to facilitate the generation and outputting of one or more of slice groupings 96 of the raw data 552, of the data index 554, of the indexed data 556, one or more partial tasks 98, and slice groupings that includes partial redundancy data with respect to raw data 552 that is stored as data block groupings in memory 88. For example, the DST client module 34 sends a portion of the slice groupings 96 of the raw data 552 to the memory 88 for storage and sends other portions of the slice groupings 96 to other DST units for storage therein. As another example, the DST client module 34 generates slice groupings 96 of the indexed data 556 and sends the slice groupings 96 of indexed data 556 to at least one other DST unit for further processing (e.g., a pattern search). As yet another example, the DST client module 34 generates slice groupings 96 to include partial redundancy data for each respective redundancy DST unit and outputs corresponding partial redundancy data to each respective redundancy DST unit. The generating of the partial redundancy data is discussed in greater detail with reference to FIGS. 47B-47F.

Figure 47C:
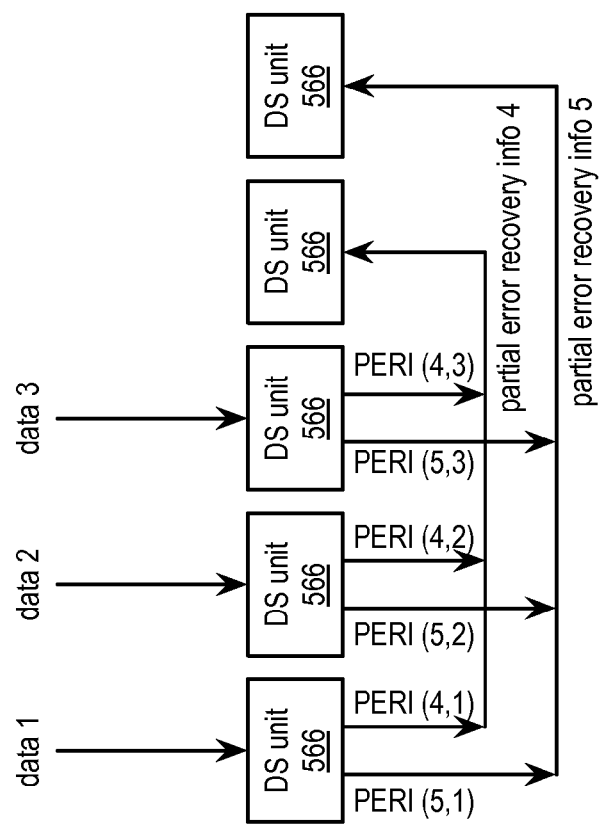
FIG. 47C is a schematic block diagram of another example of a dispersed storage network in accordance with the present invention.
Figure 47B:
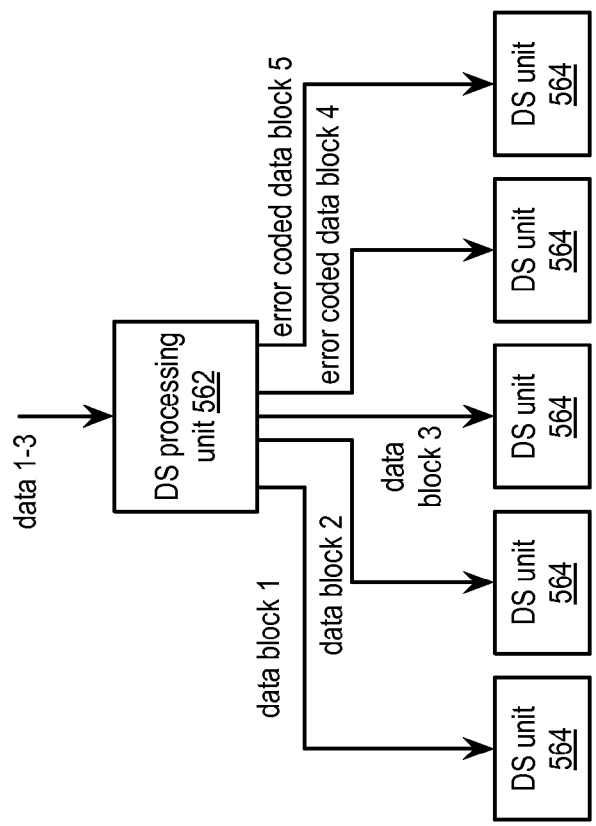
FIG. 47B is a schematic block diagram of an example of a dispersed storage network in accordance with the present invention.

FIG. 47B is a schematic block diagram of an example of a dispersed storage network that includes a dispersed storage (DS) processing unit 562 and a set of DS units 564. Alternatively, the DS processing unit 562 may include a distribute storage and task (DST) processing unit and each DS unit 564 may include a DST execution unit. The network functions to ingest large amounts of data 1-3 for storage in the set of DS units 564. The DS processing unit 562 encodes data 1-3 using a dispersed storage error coding function to produce a plurality of sets of encoded data slices, groups the encoded data slices of the plurality of sets of encoded data slices to produce data block 1-3 slice groupings and error encoded data block 4-5 slice groupings, outputs the data block 1-3 slice groupings to DS units 564 that are associated with storing data, and outputs error encoded data block 4-5 slice groupings to the other DS units 564 that are associated with storing redundancy data (e.g., error coded slices). The network utilizes a centralized data ingestion approach by utilizing the DS processing unit 562 to ingest large amounts of data, enables execution of partial tasks by the DS units 564 is that are associated with storing the data, and enables improved storage reliability via utilization of the DS units 564 that are associated with storing redundancy data.

FIG. 47C is a schematic block diagram of another example of a dispersed storage network that includes a set of dispersed storage (DS) units 566. Alternatively, each DS unit 566 may be implemented utilizing a distributed storage and task (DST) execution unit. A decode threshold number of DS units 566 of the set of DS units 566 are associated with storing data and a difference number between a pillar width and the decode threshold number of remaining DS units 566 are associated with storing redundancy data. As contrasted to the network depicted in FIG. 47B, the network depicted in FIG. 47C utilizes a decentralized data ingestion approach by utilizing a decode threshold number of DS units 566 of the set of DS units 566 to ingest large amounts of data (e.g., data 1-3). The network enables execution of partial tasks by the DS units 566 that are associated with storing the data and enables improved storage reliability via utilization of the DS units 566 that are associated with storing redundancy data.

Each DS unit 566 of the decode threshold number of DS units 566 associated with storing data receives a portion of the large amounts of data for local storage and further processing. For example, a first DS unit 566 of the decode threshold number of DS units 566 receives data 1, etc. The further processing includes partitioning the portion of the large amount of data to produce a plurality of data partitions, storing a data block slice grouping for each of the data partitions where the data block slice grouping corresponds to the DS unit 566 of the decode threshold number of DS units 566, generating partial error recovery information based on a corresponding data block slice grouping for each DS unit 566 of the DS units 566 that are associated with storing redundancy data, and outputting corresponding partial error recovery information to each DS unit 566 of the DS units 566 that associated with storing redundancy data.

Each DS unit 566 of the decode threshold number of DS units 566 generates the partial error recovery information (PERI) for each DS unit 566 of the remaining DS units 566 associated with storing redundancy data by a series of steps. For example, in a first step, the first DS unit 566 generates partial error recovery information for a fourth DS unit 566 that is associated with storing redundancy data with respect to the first DS unit 566 as PERI (4,1); and, in a second step, the first DS unit 566 generates partial error recovery information for a fifth DS unit 566 that is associated with storing redundancy data with respect to the first DS unit 566 as PERI (5,1) etc. when a decode threshold is three and a pillar width is five.

Each DS unit 566 of the DS units 566 associated with storing redundancy data receives partial error recovery information from each DS unit 566 of the decode threshold number of DS units 566 associated with storing data and generates corresponding respective redundancy data for storage within the DS unit 566. In an example of operation, a first step includes the fourth DS unit 566 receiving the PERI (4, 1) from the first DS unit 566 and locally storing the PERI (4, 1). A second step includes the fourth DS unit 566 receiving a PERI (4, 2) from a second DS unit 566. A third step includes the fourth DS unit 566 performing an updating function (e.g., exclusive OR) on the PERI (4, 1) and utilizing the PERI (4, 2) to produce a temporary error coded data slice grouping. A fourth step includes the fourth DS unit 566 receiving a PERI (4, 3) from a third DS unit 566. A fifth step includes performing the updating function on the temporary error coded data slice grouping utilizing the PERI (4, 3) to produce the respective redundancy data that includes a completed error coded data slice grouping. A sixth step includes storing the completed error coded data slice grouping. The method of operation of the network is discussed in greater detail with reference to FIGS. 47D-47F.

Figure 47D:
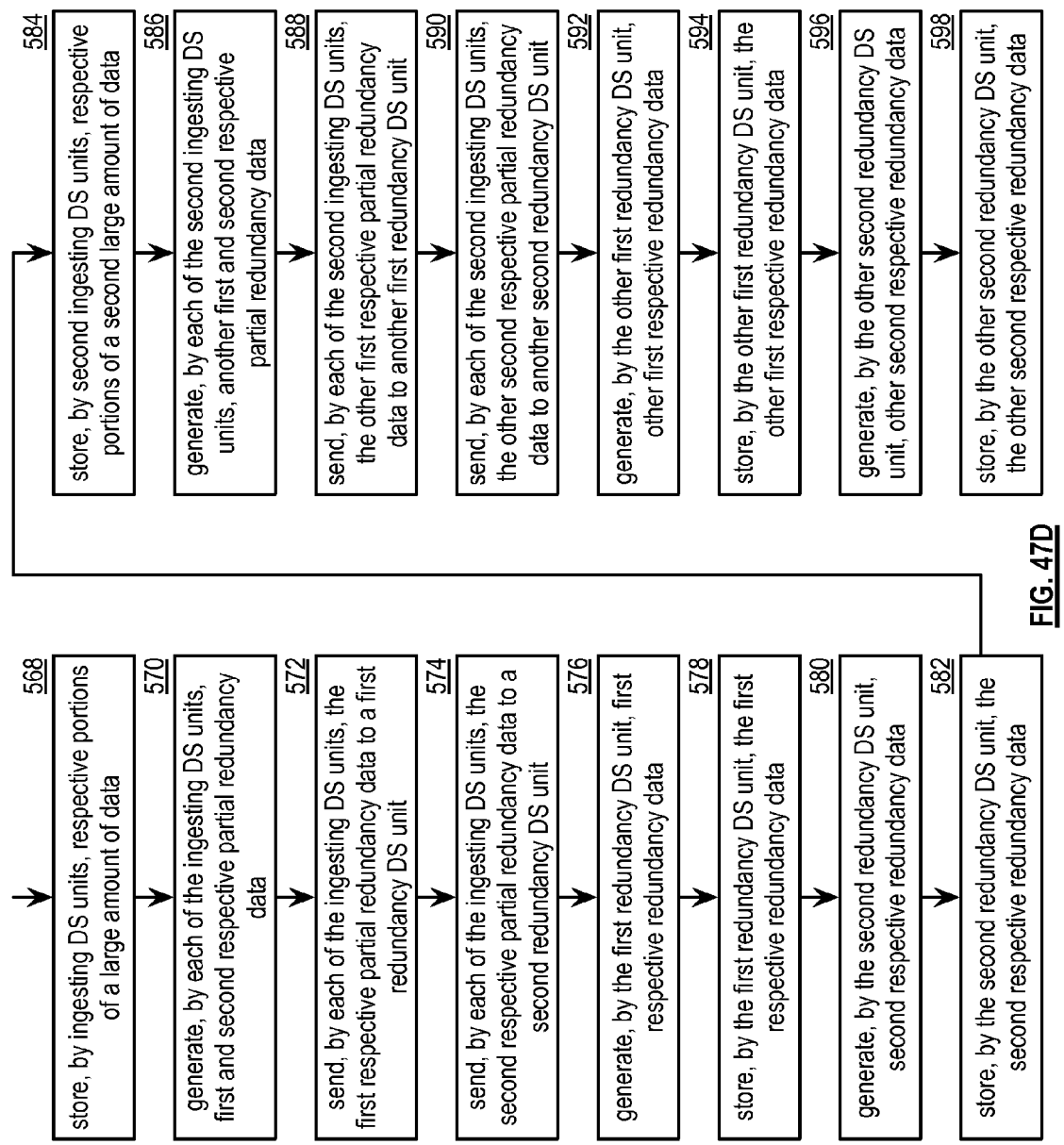
FIG. 47D is a flowchart illustrating an example of securely and reliably storing data in accordance with the present invention.

FIG. 47D is a flowchart illustrating an example of securely and reliably storing data. The method begins at step 568 where ingesting dispersed storage (DS) units of a set of DS units store respective portions of a large amount of data based on a data partitioning agreement of the set of DS units. The large amounts of data includes one or more real time data, multiple video streams, traffic on internet, company wide data traffic, etc. The data partitioning agreement includes at least one of an indication of a dispersed storage error coding function, an addressing scheme for storing the respective portions of the large amount of data, a data segment size indication, an indicator for data block size and data block quantity per data segment, a number of ingesting DS units, a number of redundancy DS units, and a logical division of the large amount of data to identify the respective portions (e.g., geographic location, timestamp, internet protocol address range, chapters, streaming video sources, source identifiers, etc.).

The method continues at step 570 where each of the ingesting DS units generates first respective partial redundancy data and second respective partial redundancy data for the respective portion of the large amount of data. Alternatively, each of the ingesting DS units generates a pillar width number minus a decode threshold number of respective partial redundancy data for the respective portion of the large amount of data. For example, each ingesting DS unit generates the first respective partial redundancy data and the second respective partial redundancy data when the pillar width is five and the decode threshold is three.

The generating includes at least one of a variety of generating approaches. In a first generating approach, a first ingesting DS unit of the ingesting DS units generates the first and second respective partial redundancy data of the first ingesting DS unit by a series of generating steps. A first generating step includes dividing a respective portion of the large amounts of data into a plurality of data segments in accordance with the data partitioning agreement. A second generating step includes, for each of the plurality of data segments, a series of sub-generating steps. A first sub-generating step includes dividing a current data segment into a set of data blocks in accordance with the data partitioning agreement. A second sub-generating step includes arranging the set of data blocks in a single row data matrix. A third sub-generating step includes multiplying the single row data matrix by a first value of a first error encoding row of an encoding matrix to produce first partial redundancy data for the current data segment. A fourth sub-generating step includes multiplying the single row data matrix by a second value of the first error encoding row to produce second partial redundancy data for the current data segment. The series of generating steps continues with a third generating step that includes combining the first partial redundancy data for each of the current data segments to produce the first respective redundancy data of the first ingesting DS unit. A fourth generating step includes combining the second partial redundancy data for each of the current data segments to produce the second respective redundancy data of the first ingesting DS unit.

In the first generating approach, a second ingesting DS unit of the ingesting DS units generates the first and second respective partial redundancy data of the second ingesting DS unit by a series of generating steps. A first generating step includes dividing a second respective portion of the large amounts of data into a plurality of data segments in accordance with the data partitioning agreement. A second generating step includes, for each of the plurality of data segments, a series of sub-generating steps. A first sub-generating step includes dividing a current data segment into a set of data blocks in accordance with the data partitioning agreement. A second sub-generating step includes arranging the set of data blocks in a single row data matrix. A third sub-generating step includes multiplying the single row data matrix by a first value of a second error encoding row of the encoding matrix to produce first partial redundancy data for the current data segment. A fourth sub-generating step includes multiplying the single row data matrix by a second value of the second error encoding row to produce second partial redundancy data for the current data segment. The series of generating steps continues with a third generating step that includes cumulating the first partial redundancy data for each of the current data segments to produce the first respective redundancy data of the second ingesting DS unit. A fourth generating step includes cumulating the second partial redundancy data for each of the current data segments to produce the second respective redundancy data of the second ingesting DS unit.

In a second generating approach, the first ingesting DS unit of the ingesting DS units generates the first and second respective partial redundancy data of the first ingesting DS unit by a series of generating steps. A first generating step includes dividing the respective portion of the large amounts of data into the plurality of data segments in accordance with the data partitioning agreement. A second generating step includes, for each of the plurality of data segments, a series of sub-generating steps. A first sub-generating step includes dividing a current data segment into the set of data blocks in accordance with the data partitioning agreement. A second sub-generating step includes exclusive ORing a first sub-set of the data blocks to produce first partial redundancy data for the current data segment. A third sub-generating step includes exclusive ORing a second sub-set of the data blocks to produce second partial redundancy data for the current data segment. The series of generating steps continues with a third generating step that includes combining the first partial redundancy data for each of the current data segments to produce the first respective redundancy data of the first ingesting DS unit. A fourth generating step includes combining the second partial redundancy data for each of the current data segments to produce the second respective redundancy data of the first ingesting DS unit.

In the second generating approach, the second ingesting DS unit of the ingesting DS units generates the first and second respective partial redundancy data of the second ingesting DS unit by a series of generating steps. A first generating step includes dividing the respective portion of the large amounts of data into the plurality of data segments in accordance with the data partitioning agreement. A second generating step includes, for each of the plurality of data segments, a series of sub-generating steps. A first sub-generating step includes dividing a current data segment into a set of data blocks in accordance with the data partitioning agreement. A second sub-generating step includes exclusive ORing a first sub-set of the data blocks to produce first partial redundancy data for the current data segment. A third sub-generating step includes exclusive ORing a second sub-set of the data blocks to produce second partial redundancy data for the current data segment. The series of generating steps continues with a third generating step that includes combining the first partial redundancy data for each of the current data segments to produce the first respective redundancy data of the second ingesting DS unit. A fourth generating step includes combining the second partial redundancy data for each of the current data segments to produce the second respective redundancy data of the second ingesting DS unit.

The method continues at step 572 where each of the ingesting DS units sends the first respective partial redundancy data to a first redundancy DS unit of the set of DS units. The method continues at step 574 where each of the ingesting DS unit sends the second respective partial redundancy data to a second redundancy DS unit of the set of DS units. The method continues at step 576 where the first redundancy DS unit generates first respective redundancy data based on the first respective partial redundancy data of each of the ingesting DS units. The first redundancy DS unit performs a first portion of a dispersed storage error encoding function (e.g., exclusive OR, a Galois field mathematical function, etc.) to combine the first respective partial redundancy data of each of the ingesting DS units to generate the first respective redundancy data. The method continues at step 578 where the first redundancy DS unit stores the first respective redundancy data.

The method continues at step 580 where the second redundancy DS unit generates second respective redundancy data based on the second respective partial redundancy data of each of the ingesting DS units. The second redundancy DS unit performs a second portion of the dispersed storage error encoding function to combine the second respective partial redundancy data of each of the ingesting DS units to generate the second respective redundancy data. The method continues at step 582 where the second redundancy DS unit stores the second respective redundancy data.

Still further ingesting DS units of the set of DS units may be utilized to store further large amounts of data. When storing further large amounts of data, the method continues at step 584 where second ingesting DS units of the set of DS units stores portions of a second large amount of data based on a second data partitioning agreement of the set of DS units. The method continues at step 586 where each of the second ingesting DS units generates another first respective partial redundancy data and another second respective partial redundancy data for the respective portion of the second large amount of data. The method continues at step 588 where each of the second ingesting DS units sends the other first respective partial redundancy data to another first redundancy DS unit of the set of DS units. The method continues at step 590 where each of the second ingesting DS unit sends the other second respective partial redundancy data to another second redundancy DS unit of the set of DS units.

The method continues at step 592 where the other first redundancy DS unit generates other first respective redundancy data based on the other first respective partial redundancy data of each of the second ingesting DS units. The method continues at step 594 where the other first redundancy DS unit stores the other first respective redundancy data. The method continues at step 596 where the other second redundancy DS unit generates other second respective redundancy data based on the other second respective partial redundancy data of each of the second ingesting DS units. The method continues at step 598 where the other second redundancy DS unit stores the other second respective redundancy data. The method of operation of the set of DS units is discussed in greater detail with reference to FIGS. 47E and 47F.

Figure 47E:
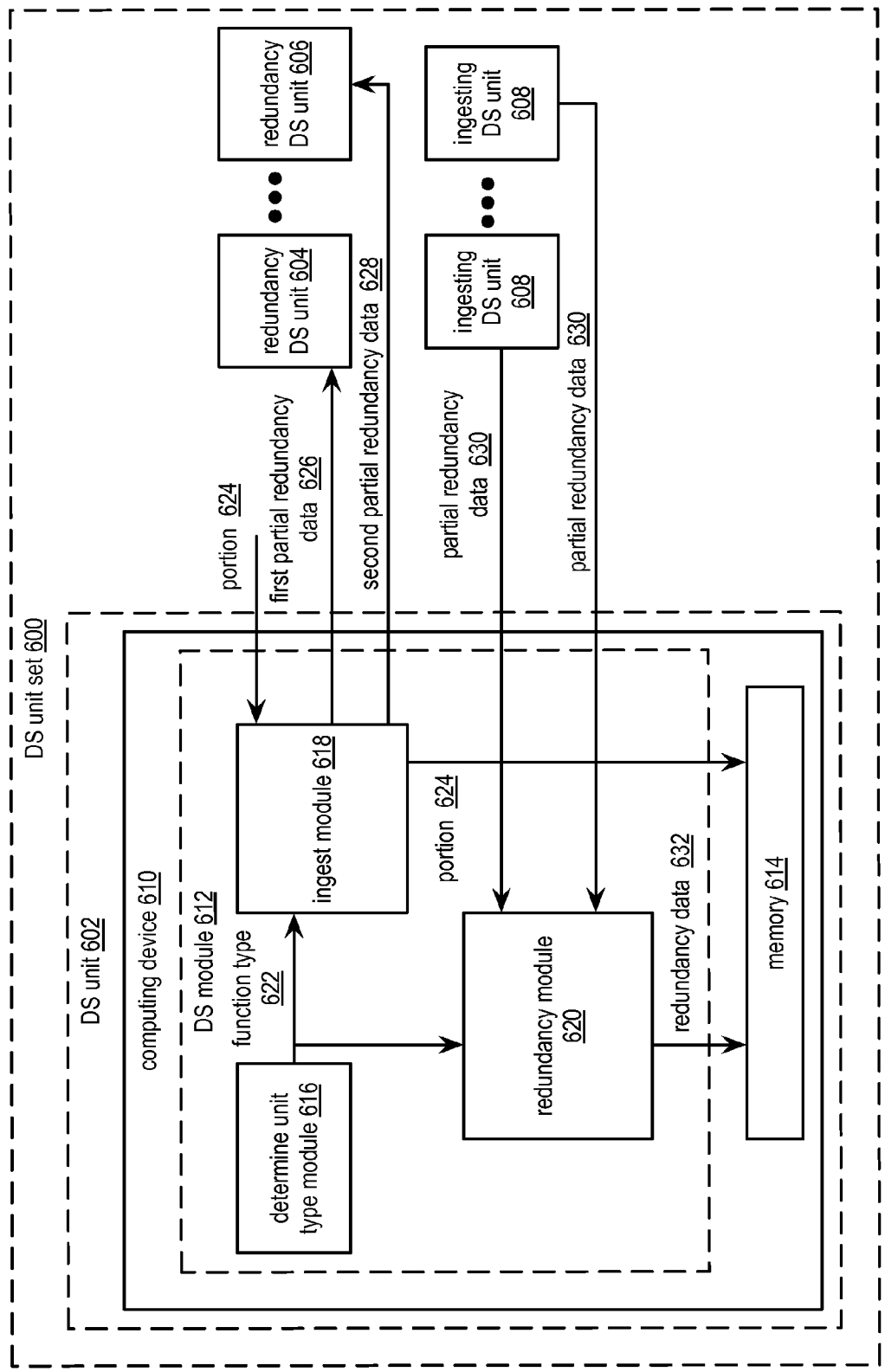
FIG. 47E is a schematic block diagram of another example of a dispersed storage network in accordance with the present invention.

FIG. 47E is a schematic block diagram of another example of a dispersed storage network that includes a dispersed storage (DS) unit set 600. The DS unit set 600 includes a DS unit 602, redundancy DS units 604-606, and ingesting DS units 608. At least one of the redundancy DS units 604-606 and ingesting DS units 608 includes the DS unit 602. The DS unit set 600 includes at least a pillar width number of DS units including at least a decode threshold number of ingesting DS units. The DS unit 602 includes a computing device 610. The computing device 610 may be implemented utilizing at least one of a server, a storage unit, a storage server, a storage module, a dispersed storage (DS) processing unit, a DS unit, a distributed storage and task (DST) execution unit, a user device, a DST processing unit, and a DST processing module. The computing device 610 includes a DS module 612 and a memory 614. The memory 614 may be implemented utilizing one or more of a memory device, a memory module, an optical memory, a magnetic memory, a solid-state memory, and a storage server. The DS module 612 may be implemented utilizing at least one of a processing module, one or more central processing unit cores, a software algorithm, a DST client module, and a DS processing module. The DS module 612 includes a determine unit type module 616, an ingest module 618, and a redundancy module 620.

The DS unit 602 functions include identifying a function type 622 of the DS unit 602 (e.g., ingesting DS unit, redundancy DS unit), ingesting data, and creating redundancy data. With regards to the identifying the function type 622 of the DS unit 602, the determine unit type module 616 determines whether the DS unit 602 is an ingesting DS unit or a redundancy DS unit of the set of DS units 600 based on a data partitioning agreement of the set of DS units 600 (e.g., role may change between DS units for different portions data for ingestion) to produce the function type 622.

With regards to the ingesting the data, the ingest module 618, when the DS unit 602 is the ingesting DS unit, performs a series of ingesting steps. In a first ingesting step, the ingest module 618 stores a respective portion 624 of a large amount of data in accordance with the data partitioning agreement of the set of DS units 600 in the memory 614. In a second ingesting step, the ingest module 618 generates first and second respective partial redundancy data 626-628 based on the respective portion 624 of the large amounts of data. The ingest module 618 generates the first and second respective partial redundancy data 626-628 utilizing a variety of generating partial redundancy data approaches.

In a first generating partial redundancy data approach, the ingest module 618 performs a series of approach generating steps. A first approach generating step includes the ingest module 618 dividing the respective portion 624 of the large amounts of data into a plurality of data segments in accordance with the data partitioning agreement. A second approach generating step includes, for each of the plurality of data segments, the ingest module 618 performing a series of sub-generating steps. A first sub-generating step includes the ingest module 618 dividing a current data segment into a set of data blocks in accordance with the data partitioning agreement. A second sub-generating step includes the ingest module 618 arranging the set of data blocks in a single row data matrix. A third sub-generating step includes the ingest module 618 multiplying the single row data matrix by a first value of a first error encoding row of an encoding matrix to produce first partial redundancy data for the current data segment. A fourth sub-generating step includes the ingest module 618 multiplying the single row data matrix by a second value of the first error encoding row to produce second partial redundancy data for the current data segment. The series of approach generating steps continues with a third approach generating step that includes the ingest module 618 combining the first partial redundancy data for each of the current data segments to produce the first respective redundancy data 626. A fourth approach generating step includes the ingest module 618 combining the second partial redundancy data for each of the current data segments to produce the second respective redundancy data 628.

In a second generating partial redundancy data approach, the ingest module 618 performs a series of alternative approach generating steps. A first alternative approach generating step includes, the ingest module 618 dividing the respective portion 624 of the large amounts of data into the plurality of data segments in accordance with the data partitioning agreement. A second alternative approach generating step includes, for each of the plurality of data segments, the ingest module 618 performing a series of sub-generating steps. A first sub-generating step includes the ingest module 618 dividing a current data segment into the set of data blocks in accordance with the data partitioning agreement. A second sub-generating step includes the ingest module 618 exclusive ORing a first sub-set of the data blocks to produce first partial redundancy data for the current data segment. A third sub-generating step includes the ingest module 618 exclusive ORing a second sub-set of the data blocks to produce second partial redundancy data for the current data segment. The series of alternative approach generating steps continues with a third approach generating step that includes the ingest module 618 combining the first partial redundancy data for each of the current data segments to produce the first respective redundancy data 626. A fourth approach generating step includes the ingest module 618 combining the second partial redundancy data for each of the current data segments to produce the second respective redundancy data 628.

The series of ingesting steps continues with a third ingesting step, where the ingest module 618 sends the first respective partial redundancy data 626 to a first redundancy DS unit 604 of the set of DS units 600. In a fourth ingesting step, the ingest module 618 sends the second respective partial redundancy data 628 to a second redundancy DS unit 606 of the set of DS units 600.

With regards to the creating the redundancy data, the redundancy module 620, when the DS unit 602 is the redundancy DS unit, generates respective redundancy data 632 based on respective partial redundancy data received 630 (e.g., the first respective partial redundancy data 626) from each ingesting DS unit 608 of the set of DS units 600 and stores the respective redundancy data 632 in memory 614. The redundancy module 620 generates the respective redundancy data 632 by receiving the respective partial redundancy data 630 received from each of the ingesting DS units 608 of the set of DS units 600 (e.g., first, second, etc.) and performing a respective portion of a dispersed storage error encoding function to combine the first respective partial redundancy data 626 of each of the ingesting DS units 608 to generate the respective redundancy data 632 (e.g., XOR, Galois field addition, etc.).

Figure 47F:
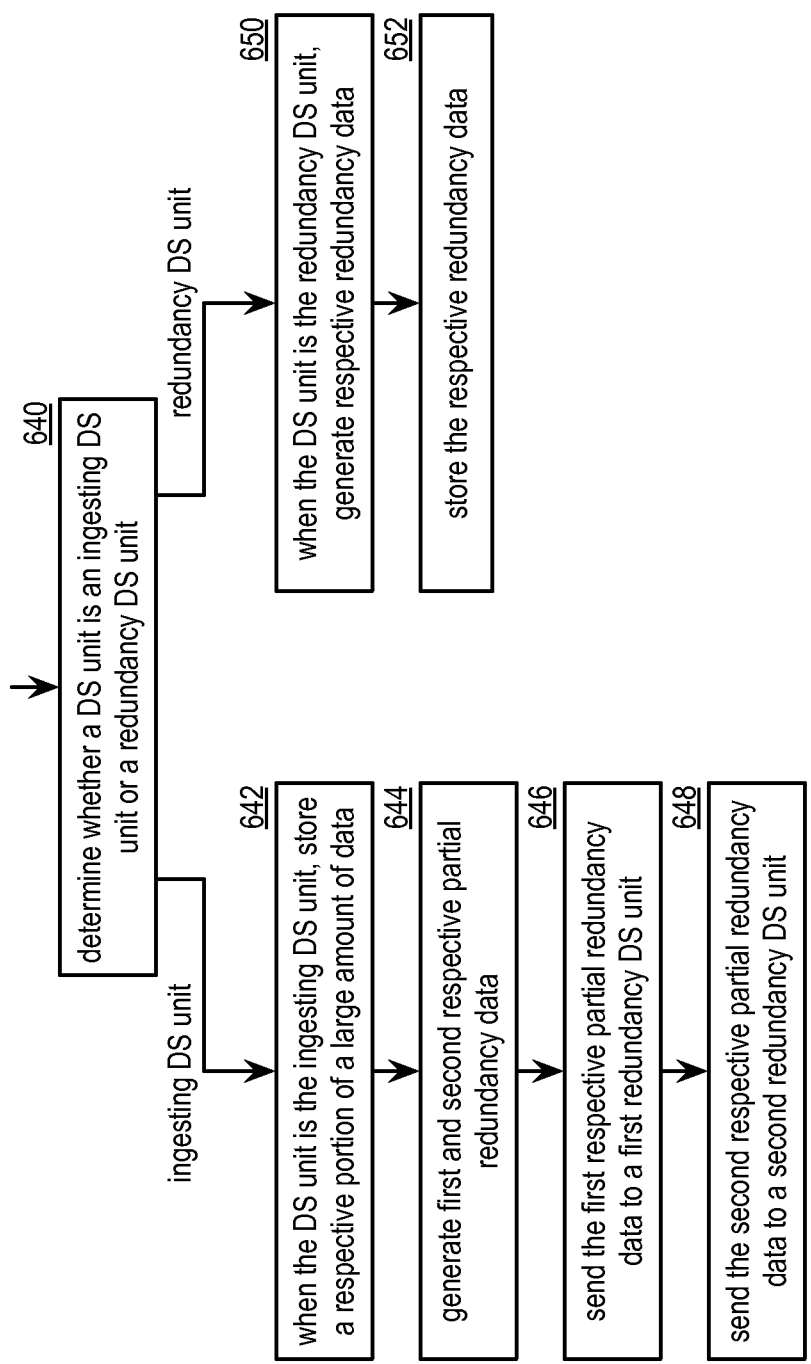
FIG. 47F is a flowchart illustrating another example of securely and reliably storing data in accordance with the present invention.

FIG. 47F is a flowchart illustrating another example of securely and reliably storing data. The method begins at step 640 where a processing module (e.g., of a dispersed storage (DS) unit) determines whether the DS unit is an ingesting DS unit or a redundancy DS unit of a set of DS units based on a data partitioning agreement of the set of DS units. When the DS unit is the ingesting DS unit, the method continues at step 642 where the processing module stores a respective portion of a large amount of data in accordance with the data partitioning agreement of the set of DS units (e.g., in a locally memory).

The method continues at step 644 where the processing module generates first and second respective partial redundancy data based on the respective portion of the large amounts of data. The generating the first and second respective partial redundancy data includes a variety of generating partial redundancy data approaches. In a first generating partial redundancy data approach, the processing module performs a series of approach generating steps. A first approach generating step includes the processing module dividing the respective portion of the large amounts of data into a plurality of data segments in accordance with the data partitioning agreement. A second approach generating step includes, for each of the plurality of data segments, the processing module performing a series of sub-generating steps. A first sub-generating step includes dividing a current data segment into a set of data blocks in accordance with the data partitioning agreement. A second sub-generating step includes arranging the set of data blocks in a single row data matrix. A third sub-generating step includes multiplying the single row data matrix by a first value of a first error encoding row of an encoding matrix to produce first partial redundancy data for the current data segment. A fourth sub-generating step includes multiplying the single row data matrix by a second value of the first error encoding row to produce second partial redundancy data for the current data segment. The series of approach generating steps continues with a third approach generating step that includes the processing module combining the first partial redundancy data for each of the current data segments to produce the first respective redundancy data. A fourth approach generating step includes the processing module combining the second partial redundancy data for each of the current data segments to produce the second respective redundancy data.

In a second generating partial redundancy data approach, the processing module performs a series of alternative approach generating steps. A first alternative approach generating step includes, the processing module dividing the respective portion of the large amounts of data into the plurality of data segments in accordance with the data partitioning agreement. A second alternative approach generating step includes, for each of the plurality of data segments, the processing module performing a series of sub-generating steps. A first sub-generating step includes dividing a current data segment into the set of data blocks in accordance with the data partitioning agreement. A second sub-generating step includes exclusive ORing a first sub-set of the data blocks to produce first partial redundancy data for the current data segment. A third sub-generating step includes exclusive ORing a second sub-set of the data blocks to produce second partial redundancy data for the current data segment. The series of alternative approach generating steps continues with a third approach generating step that includes the processing module combining the first partial redundancy data for each of the current data segments to produce the first respective redundancy data. A fourth approach generating step includes the processing module combining the second partial redundancy data for each of the current data segments to produce the second respective redundancy data.

The method continues at step 646 where the processing module sends the first respective partial redundancy data to a first redundancy DS unit of the set of DS units. The method continues at step 648 where the processing module sends the second respective partial redundancy data to a second redundancy DS unit of the set of DS units.

When the DS unit is the redundancy DS unit, the method continues at step 650 where the processing module generates respective redundancy data based on the respective partial redundancy data received from each ingesting DS unit of the set of DS units. The generating the respective redundancy data includes receiving the respective partial redundancy data received from each of the ingesting DS units of the set of DS units and performing a respective portion of a dispersed storage error encoding function to combine the first respective partial redundancy data of each of the ingesting DS units to generate the respective redundancy data. The method continues at step 652 where the processing module stores the respective redundancy data (e.g., in a locally memory).

Figure 48A:
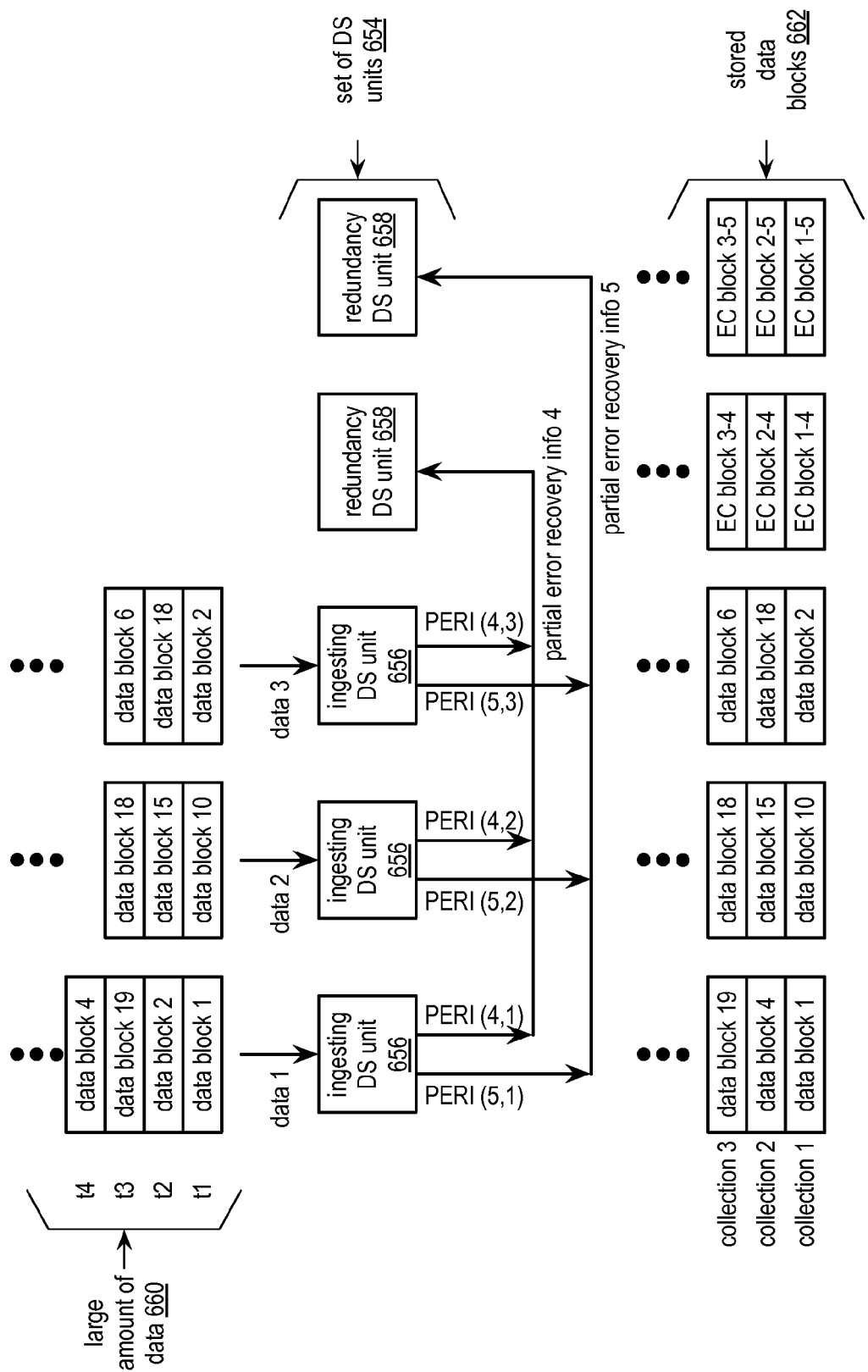
FIG. 48A is a schematic block diagram of another example of a dispersed storage network in accordance with the present invention.

FIG. 48A is a schematic block diagram of another example of a dispersed storage network that includes a set of dispersed storage (DS) units 654 that includes at least a decode threshold number of ingesting DS units 656 and a number of remaining redundancy DS units 658. Alternatively, the set of DS units 654 may be implemented utilizing one or more distributed storage and task (DST) execution units. The set of DS units 654 receives large amounts of data 660 and stores the large amounts of data 660 as stored data block 662. The ingesting DS units 656 of the set of DS units 654 are associated with storing data blocks of data and the redundancy DS units 658 of the set of DS units 654 are associated with storing error coded data blocks of redundancy data. The set of DS units 654 enables execution of partial tasks by the ingesting DS unit 656 on the data blocks of data, enables improved storage reliability via utilization of the redundancy DS units 658 that are associated with storing the redundancy data, and enables improved storage efficiency by identifying and remedying stores data blocks of the stored data blocks 662 that are substantially similar.

Each ingesting DS unit 656 receives a respective section (e.g., of a data 1-3) of the large amount of data 660 substantial in parallel, within a common time period (e.g., of t1, t2, t3, etc.), with other ingesting DS units 656 receiving other respective sections of the large amount of data 660 and divides the respective section to produce one or more data blocks. For example, during the first time period t1, a first ingesting DS unit 656 receives a data block 1 of data 1, a second ingesting DS unit 656 receives a data block 10 of data 2, and a third ingesting DS unit 656 receives a data block 2 of data 3.

The ingesting DS unit 656 store (e.g., at least temporarily) the store data blocks 662 as a plurality of collections (e.g., 1, 2, 3, . . . ) of data blocks where each collection includes a decode threshold number of data blocks stored in the ingesting DS unit 656 and corresponding error coded data blocks in the redundancy DS unit 658. For example, a first collection includes data block 1 stored in the first ingesting DS unit 656, data block 10 stored in the second ingesting DS unit 656, data block 2 stored in the third ingesting DS unit 656, an error coded data block 1-4 stored in a first redundancy DS unit 658, and an error coded data block 1-5 stored in a second redundancy DS unit 658.

With regards to improved storage reliability, for each collection, each ingesting DS unit 656 generates partial error recovery information (PERI) of data blocks for permanent storage for each redundancy DS unit 658 associated with storing redundancy data for the partitions by a series of steps. In an example of operation, for the first collection, a first step of a series of steps includes the first ingesting DS unit 656 generating partial error recovery information for the first redundancy DS unit 658 that is associated with storing redundancy data with respect to the first ingesting DS unit 656 as PERI (4,1); and, in a second step, the first ingesting DS unit 656 generates partial error recovery information for the second redundancy DS unit 658 that is associated with storing redundancy data with respect to the first ingesting DS unit 656 as PERI (5,1) etc. when a decode threshold is three and a pillar width is five of a dispersed storage error coding function.

The example of operation continues where each redundancy DS unit 658 associated with storing redundancy data receives partial error recovery information from each ingesting DS unit 656 associated with storing data blocks of a corresponding collection and generates corresponding respective redundancy data for storage as error coded data blocks within the redundancy DS unit 658. For instance, a first sub-step of a series of sub-steps includes the first redundancy DS unit 658 receiving the PERI (4, 1) from the first ingesting DS unit 656 and locally storing the PERI (4, 1). A second sub-step includes the first redundancy DS unit 658 receiving a PERI (4, 2) from the second ingesting DS unit 656. A third sub-step includes the first redundancy DS unit 658 performing an updating function (e.g., exclusive OR) on the PERI (4, 1) and utilizing the PERI (4, 2) to produce a temporary error coded data slice grouping. A fourth sub-step includes the first redundancy DS unit 658 receiving a PERI (4, 3) from the third ingesting DS unit 656. A fifth sub-step includes the first redundancy DS unit 658 performing the updating function on the temporary error coded data slice grouping utilizing the PERI (4, 3) to produce respective redundancy data that includes a completed error coded data slice grouping for the first collection. A sixth sub-step includes the first redundancy DS unit 658 storing the completed error coded data slice grouping as the error coded data block 1-4 (e.g., in a local memory of the first redundancy DS unit 658).

With regards to enabling improved storage efficiency by identifying and remedying stored data blocks of the stored data blocks 662 that are substantially similar, each ingesting DS unit 656 detects the substantially similar stored data blocks and facilitates a remedy. Each ingesting DS unit 656 may, from time period to time period, receive a data block that is substantially similar to a data block received by another ingesting DS unit 656 and/or by the ingesting DS unit 656 during another time period. For example, during the second time t2, the first ingesting DS unit 656 receives data block 2 which was previously received by the third ingesting DS unit 656 during the first time period t1.

The ingesting DS unit 656 detects the substantially similar stored data block when a new data block is received and/or by analyzing stored data blocks subsequent to storage of the data blocks and generation and storage of corresponding error coded data blocks. When detecting stored data blocks that are substantially similar, the ingesting DS unit 656 may determine a number of allowable substantially similar data blocks and identify desired data blocks when a number of substantially similar data blocks is greater than the number of allowable substantially similar data blocks. The identifying the desired data blocks may include selecting the desire data blocks based on one or more of an associated ingesting DS unit 656, a task execution capability level of the associated ingesting DS unit 656, a pending partial task for execution on a corresponding one of the substantially similar data blocks, a storage reliability goal, and a task execution goal. For example, the first ingesting DS unit 656 does not identify data block 2 as the desired data block (e.g., rather identifies data block 2 for elimination) and the third ingesting DS unit 656 does identify data block 2 as the desired data block when the allowable substantially similar data blocks is zero and a task execution capability level of the third ingesting DS unit 656 compares more favorably to the task execution goal than does a task execution capability level of the first ingesting DS unit 656. As another example, the second ingesting DS unit 656 identifies data block 18 of collection 3 as a desired substantially similar data block and the third ingesting DS unit 656 identifies data block 18 of collection to as a desired substantially similar data block when the allowable substantially similar data blocks is at least one.

When the associated ingesting DS unit 656 does not identify the substantially similar data block as the desired data block, the associated ingesting DS unit 656 may replace a temporarily stored data block for elimination with a data block that is to be stored permanently. The replacing includes one or more of establishing corresponding dispersed storage network addresses for the data block to be stored permanently to be associated with a partition of the temporarily stored data block for elimination and updating and/or establishing corresponding error coded data blocks. For example, the first ingesting DS unit 656 replaces data block 2 with newly received data block 4 that was not permanently stored and updates error coded data blocks 2-4 and 2-5 based on a data block 4. The method to identify and remedy stored data blocks that are substantially similar is discussed in greater detail with reference to FIGS. 48B-48E.

Figure 48B:
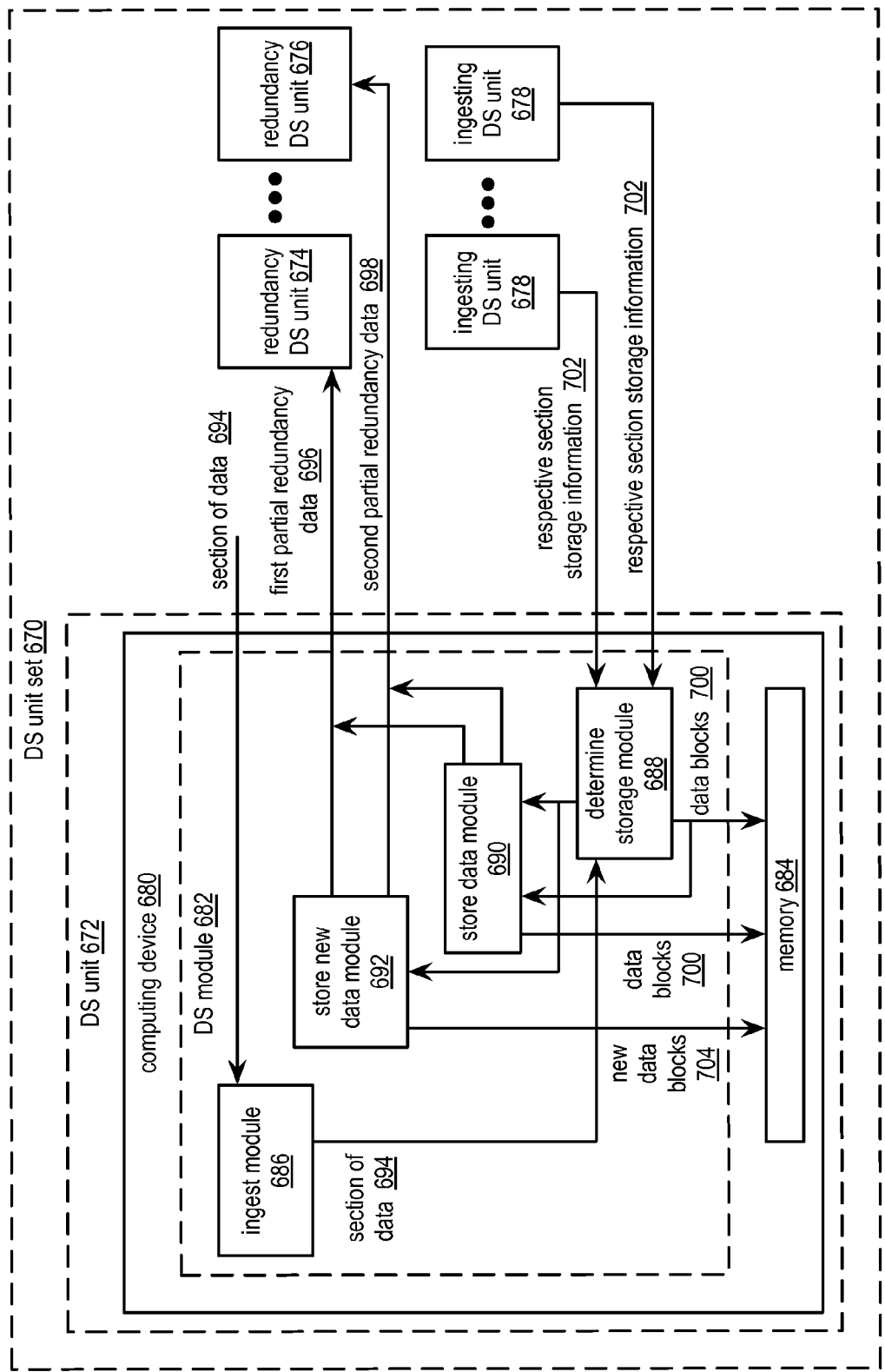
FIG. 48B is a schematic block diagram of another example of a dispersed storage network in accordance with the present invention.

FIG. 48B is a schematic block diagram of another example of a dispersed storage network that includes a dispersed storage (DS) unit set 670. The DS unit set 670 includes a DS unit 672, redundancy DS units 674-676, and ingesting DS units 678. At least one of the ingesting DS units 678 includes the DS unit 672. The DS unit set 670 includes at least a pillar width number of DS units including at least a decode threshold number of ingesting DS units 672, and 678. The DS unit 672 includes a computing device 680. The computing device 680 may be implemented utilizing at least one of a server, a storage unit, a storage server, a storage module, a dispersed storage (DS) processing unit, a DS unit, a DST execution unit, a user device, a distributed storage and task (DST) processing unit, and a DST processing module. The computing device 680 includes a DS module 682 and a memory 684. The memory 684 may be implemented utilizing one or more of a memory device, a memory module, an optical memory, a magnetic memory, a solid-state memory, a temporary storage module, a permanent storage module, and a storage server. The DS module 682 may be implemented utilizing at least one of a processing module, one or more central processing unit cores, a software algorithm, a DST client module, and a DS processing module. The DS module 682 includes an ingest module 686, a determine storage module 688, a store data module 690, and a store new data module 692.

The set of DS units 670 ingests a large amount of data. The set of DS units 670 divides large amount of data into a set of partitions and divides each of the sets of partitions into a set of sections. The DS unit 672 functions include ingesting data of the large amount of data, determining a storage approach for the data, permanently storing the data, and permanently storing other data. With regards to the ingesting data, the ingest module 686 ingests a respective section 694 of the large amount of data. For example, the ingest module 686 extracts a portion of a partition of the large amount of data in accordance with an extraction approach of the set of DS units 670 and divides the portion of the partition into the respective section 694.

With regards to the determining the storage approach for the data, the determine storage module 688, for the ingested respective section 694 of data, divides the ingested respective section 694 of data into a plurality of data segments and performs a series of determining storage steps for a data segment of the plurality of data segments. In a first determining storage step, the determine storage module 688 divides the data segment into a plurality of data blocks 700 (e.g., a row of a data matrix). In a second determining storage step, the determine storage module 688 temporarily stores the plurality of data blocks 700. For example, the plurality of data blocks 700 are stored in a temporary storage portion of memory 684. In a third determining storage step, the determine storage module 688 determines whether to not permanently store one or more of the plurality of data blocks 700.

The determine storage module 688 determines whether to not permanently store the one or more of the plurality of data blocks 700 by a variety of determining approaches. A determining approach includes the determine storage module 688 performing a series of determining approach steps. A first determining approach step includes the determine storage module 688 determining that at least one other DS unit (e.g., of the ingesting DS units 678) of the set of DS units 670 has ingested a respective section that is substantially similar to the ingested respective section 694. For example, the determine storage module 688 receives respective section storage information 702 from the at least one other DS unit that includes at least one of a representation (e.g., a hashing function result over the respective section of the other DS unit) of the respective section that is substantially similar to the ingested respective section 694 and the respective section that is substantially similar to the ingested respective section 694. Next, the determine storage module 688 performs at least one of two comparisons that includes comparing the representation from the other DS unit with a representation of the ingested respective section 694 and comparing the respective section from the other unit with the ingested respective section 694. In the example, the determine storage module 688 determines that the at least one other DS unit has ingested the respective section that is substantially similar to the ingested respective section 694 when at least one of the comparisons is favorable (e.g., substantially the same). Alternatively, the first determining approach step includes the determine storage module 688 determining that the DS unit 672 has ingested the respective section that is substantially similar to the ingested respective section 694 (e.g., stored temporarily or permanently by the DS unit 672).

In response to the determining that the at least one other DS unit has ingested the respective section that is substantially similar to the ingested respective section 694, the determine storage module 688 performs a second determining approach step that includes a series of sub-steps. A first sub-step includes the determine storage module 688 determining whether a de-duplication function is to be applied to the ingested respective section 694. The determining may be based on one or more of how many respective sections stored by other DS units are substantially similar to the ingested respective section 694, a desired maximum number of substantially similar ingested respective section 694, identities of the other DS units storing the respective sections that are substantially similar to the ingested respective section 694, task execution performance availability levels of the other DS units, storage capacity availability levels of the other DS units, a data type indicator, a lookup, a query, a replication goal, a storage goal, identity of the DS unit 672, and a performance goal. For example, the determine storage module 688 determines to apply the de-duplication function when another DS unit is associated with a preferred task execution performance availability level as compared to a task execution performance availability level of DS unit 672 and a desired maximum number of substantially similar ingested respective sections is zero. As another example, the determine storage module 688 determines not to apply the de-duplication function when the task execution performance availability level of DS unit 672 compares more favorably to the task execution performance availability level of the other DS unit and the desired maximum number of substantially similar ingested respective sections is zero. In addition, the determine storage module 688 may issue a request to the other DS unit to apply the de-duplication function on the corresponding substantially similar ingested respective section stored at the other DS unit.

When the de-duplication function is to be applied, a second sub-step of the second determining approach step includes the determine storage module 688 identifying the one or more of the plurality of data blocks 700 that are not to be permanently stored. When the de-duplication function is not to be applied, the second sub-step includes the determine storage module 688 indicating that the one or more of the plurality of data blocks 700 are to be permanently stored.

Another determining approach, of the variety of determining approaches, includes the determine storage module 688 performing a series of alternate determining approach steps. A first alternate determining approach step includes the determine storage module 688 analyzing the ingested respective section 694 in accordance with data analysis criteria. The data analysis criteria includes one or more of a data size, a data type, a data priority level, identification of an associated partial task, a data content indicator, and a pattern match. For example, the determine storage module 688 attempts to match a pattern to the ingested respective section 694 and indicates that the analysis is unfavorable when there is no match. When the analysis of the ingested respective section is unfavorable, a second alternate determining approach step includes the determine storage module 688 identifying the one or more of the plurality of data blocks 700 that are not to be permanently stored.

With regards to the permanently storing the data, the store data module 690, when the one or more of the plurality of data blocks is to be permanently stored, stores the one or more of the plurality of data blocks 700 (e.g., in a permanent storage portion of memory 684) and generates a group of partial redundancy data based on the one or more of the plurality of data blocks 700 and in accordance with a dispersed storage error coding function.

The store data module 690 generates the group of partial redundancy data based on the one or more of the plurality of data blocks 700 by a series of generating steps. A first generating step includes the store data module 690 generating a first partial redundancy data 696 for issuing to a first redundancy DS unit 674 based on at least some of the plurality of data blocks 700 and a first encoding parameter of the dispersed storage error coding function. A second generating step includes the store data module 690 generating a second partial redundancy data 698 for issuing to a second redundancy DS unit 676 based on at least another some of the plurality of data blocks 700 and a second encoding parameter of the dispersed storage error coding function. The generating the first and second partial redundancy data 696 and 698 includes a variety of redundancy data generating approaches. A first redundancy data approach includes a series of steps. A first step includes arranging the one or more of the plurality of data blocks 700 in a single row data matrix. A second generating step includes multiplying the single row data matrix by a first value of a first error encoding row of an encoding matrix to produce the first partial redundancy data 696. A third step includes multiplying the single row data matrix by a second value of the first error encoding row to produce the second partial redundancy data 698. A second redundancy data approach includes a series of alternative steps. A first alternative step includes exclusive ORing a first sub-set of the one or more of the plurality of data blocks 700 to produce the first partial redundancy data 696. A second alternative step includes exclusive ORing a second sub-set of the one or more of the plurality of data blocks 700 to produce the second partial redundancy data 698.

With regards to the permanently storing the other data, the store new data module 692, when the one or more of the plurality of data blocks 700 is not to be permanently stored performs a series of create new data steps. In a first create new data step, the store new data module 692 creates a new plurality of data blocks 704 from data blocks of the plurality of data blocks 700 that are to be permanently stored and data blocks from another data segment that are to be permanently stored. The store new data module 692 functions to create the new plurality of data blocks 704 including by identifying the other data segment as a data segment for which partial redundancy data does not yet exist (e.g., a newly ingested data segment). The store new data module 692 further functions to permanently store the new plurality of data blocks 704 (e.g., in the permanent storage portion of memory 684). In a second create new data step, the store new data module 692 generates the group of partial redundancy data based on the new plurality of data blocks 704 in accordance with the dispersed storage error coding function (e.g., for issuing as the first and second partial redundancy data 696 and 698 to redundancy DS units 674 and 676).

Figure 48C:
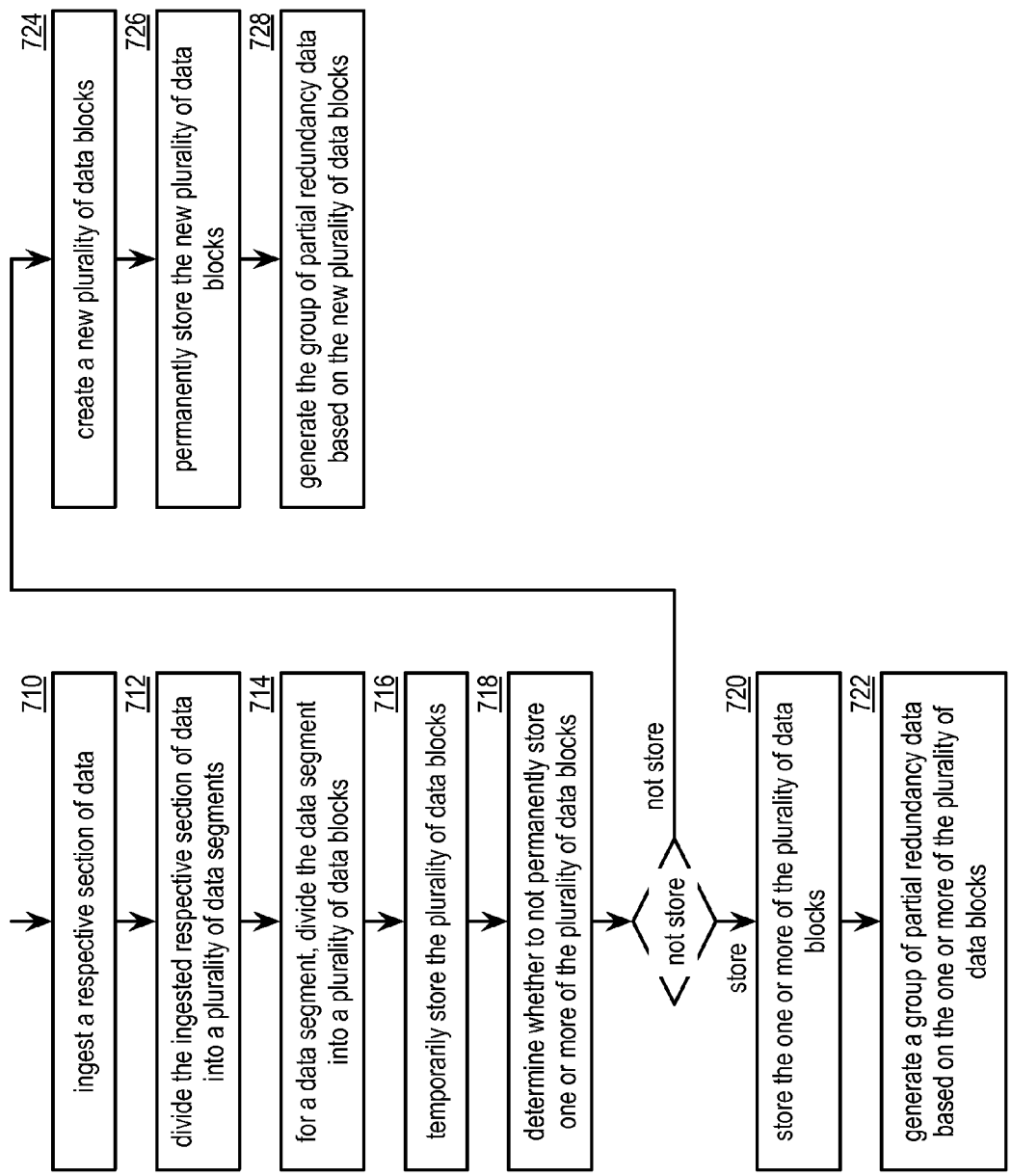
FIG. 48C is a flowchart illustrating an example of improving storage efficiency in accordance with the present invention.

FIG. 48C is a flowchart illustrating an example of improving storage efficiency. The method begins at step 710 where a processing module (e.g., of a dispersed storage (DS) unit of a set of DS units of a dispersed storage network (DSN)) ingests a respective section of data of a set of sections of the data. The set of DS units ingests the set of sections. A large amount of data is divided into sets of partitions and each of the sets of partitions is divided into a corresponding set of sections. For the ingested respective section of data, the method continues at step 712 where the processing module divides the ingested respective section of data into a plurality of data segments (e.g., in accordance with a dispersed storage error coding function). For data segments of the plurality of data segments, the method continues at step 714 where the processing module divides the data segment into a plurality of data blocks (e.g., a row of a data matrix). The method continues at step 716 where the processing module temporarily stores the plurality of data blocks.

The method continues at step 718 where the processing module determines whether to not permanently store one or more of the plurality of data blocks. The processing module determines whether to not permanently store the one or more of the plurality of data blocks by a variety of determining approaches. A determining approach includes the processing module performing a series of determining approach steps. A first determining approach step includes determining that at least one other DS unit (e.g., of ingesting DS units) of the set of DS units has ingested a respective section that is substantially similar to the ingested respective section (e.g., by comparing sections and/or comparing representations of the sections). Alternatively, the first determining approach step includes determining that the DS unit has ingested the respective section that is substantially similar to the ingested respective section (e.g., previously stored temporarily and/or permanently by the DS unit).

In response to the determining that the at least one other DS unit has ingested the respective section that is substantially similar to the ingested respective section, the processing module performs a second determining approach step that includes a series of sub-steps. A first sub-step includes determining whether a de-duplication function is to be applied to the ingested respective section. When the de-duplication function is to be applied, a second sub-step includes identifying the one or more of the plurality of data blocks that are not to be permanently stored. When the de-duplication function is not to be applied, the second sub-step indicating that the one or more of the plurality of data blocks are to be permanently stored.

Another determining approach, of the variety of determining approaches, includes the processing module performing a series of alternate determining approach steps. A first alternate determining approach step includes the processing module analyzing the ingested respective section in accordance with data analysis criteria. When the analysis of the ingested respective section is unfavorable, a second alternate determining approach step includes the processing module identifying the one or more of the plurality of data blocks that are not to be permanently stored.

The method branches to step 724 when the one or more of the plurality of data blocks is not to be permanently stored. The method continues to step 720 when the one or more of the plurality of data blocks is to be permanently stored. When the one or more of the plurality of data blocks is to be permanently stored, the method continues at step 720 where the processing module stores the one or more of the plurality of data blocks (e.g., in a permanent storage portion of a local memory).

The method continues at step 722 where the processing module generates a group of partial redundancy data based on the one or more of the plurality of data blocks and in accordance with the dispersed storage error coding function. The generating the group of partial redundancy data based on the one or more of the plurality of data blocks includes generating a first partial redundancy data for issuing to a first redundancy DS unit based on at least some of the plurality of data blocks and a first encoding parameter of the dispersed storage error coding function and generating a second partial redundancy data for issuing to a second redundancy DS unit based on at least another some of the plurality of data blocks and a second encoding parameter of the dispersed storage error coding function. The generating the first and second partial redundancy data includes a variety of redundancy data generating approaches. A first redundancy data approach includes a series of steps. A first step includes arranging the one or more of the plurality of data blocks in a single row data matrix. A second generating step includes multiplying the single row data matrix by a first value of a first error encoding row of an encoding matrix to produce the first partial redundancy data. A third step includes multiplying the single row data matrix by a second value of the first error encoding row to produce the second partial redundancy data. A second redundancy data approach includes an alternative series of steps. A first alternative step includes exclusive ORing a first sub-set of the one or more of the plurality of data blocks to produce the first partial redundancy data. A second alternative step includes exclusive ORing a second sub-set of the one or more of the plurality of data blocks to produce the second partial redundancy data.

When the one or more of the plurality of data blocks is not to be permanently stored, the method continues at step 724 where the processing module creates a new plurality of data blocks from data blocks of the plurality of data blocks that are to be permanently stored and data blocks from another data segment that are to be permanently stored. The creating the new plurality of data blocks includes identifying the other data segment as a data segment for which partial redundancy data does not yet exist (e.g., from the cache memory the DS unit or from another DS unit). The method continues at step 726 where the processing module permanently stores the new plurality of data blocks (e.g., in the permanent storage portion of the local memory). The method continues at step 728 where the processing module generates the group of partial redundancy data based on the new plurality of data blocks in accordance with the dispersed storage error coding function.

Figure 48D:
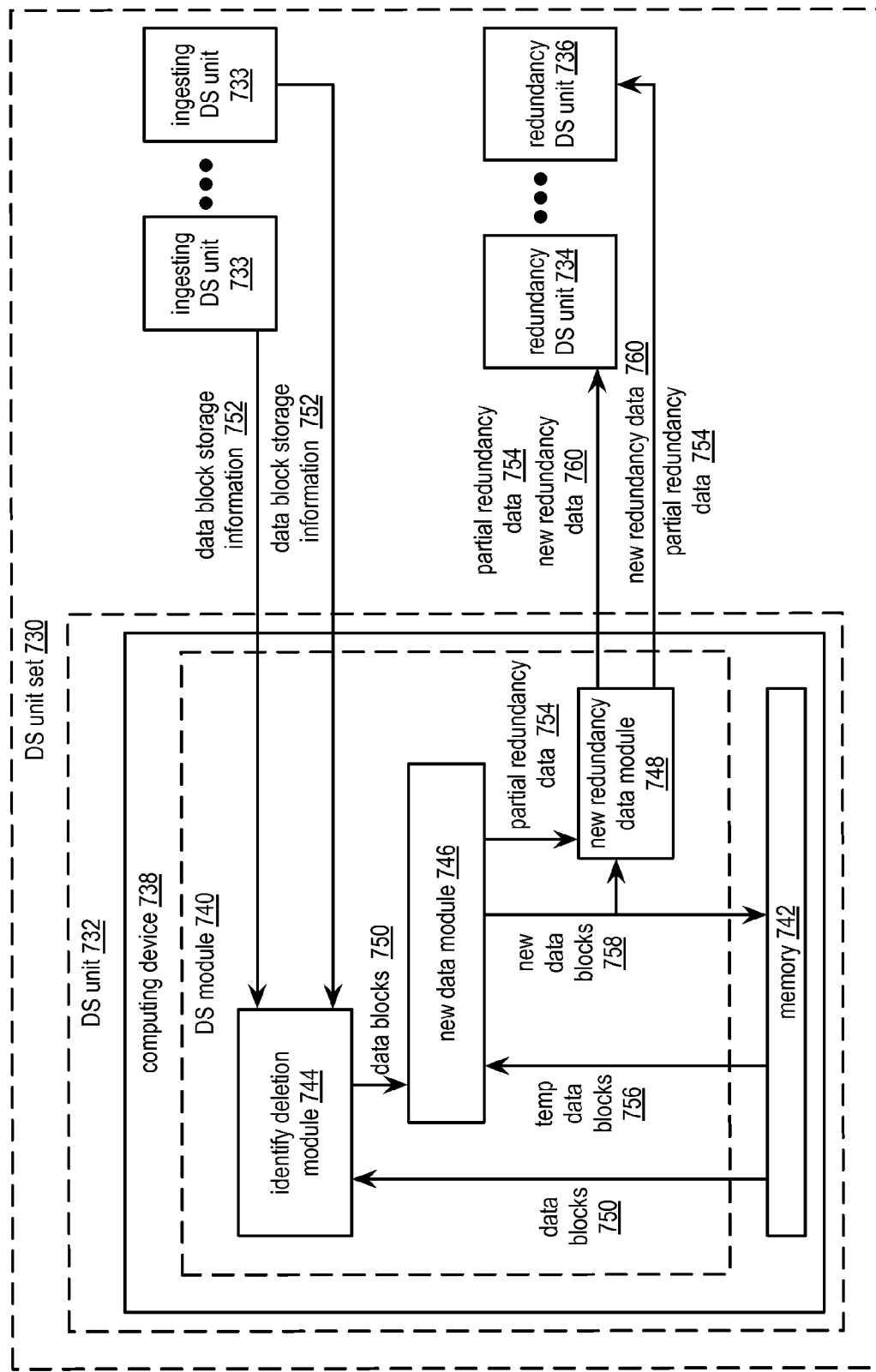
FIG. 48D is a schematic block diagram of another example of a dispersed storage network in accordance with the present invention.

FIG. 48D is a schematic block diagram of another example of a dispersed storage network that includes a dispersed storage (DS) unit set 730. The DS unit set 730 includes a DS unit 732, redundancy DS units 734-736, and ingesting DS units 733. At least one of the ingesting DS units 733 includes the DS unit 672. The DS unit set 730 includes at least a pillar width number of DS units including at least a decode threshold number of ingesting DS units 733 (e.g., including DS unit 732). The DS unit 732 includes a computing device 738. The computing device 738 may be implemented utilizing at least one of a server, a storage unit, a storage server, a storage module, a dispersed storage (DS) processing unit, a DS unit, a distributed storage and task (DST) execution unit, a user device, a DST processing unit, and a DST processing module. The computing device 738 includes a DS module 740 and a memory 742. The memory 742 may be implemented utilizing one or more of a memory device, a memory module, an optical memory, a magnetic memory, a solid-state memory, a temporary storage module, a permanent storage module, and a storage server. The DS module 740 may be implemented utilizing at least one of a processing module, one or more central processing unit cores, a software algorithm, a DST client module, and a DS processing module. The DS module 740 includes an identify deletion module 744, a new data module 746, and a new redundancy data module 748.

The set of DS units 730 stores a large amount of data and may ingest a portion of the large amount of data. When ingesting, the set of DS units 730 divides the large amount of data into a set of partitions and divides each of the sets of partitions into a set of sections. The DS unit 732 functions include identifying data for deletion, permanently storing new data, and updating redundancy data.

With regards to identifying data for deletion, the identify deletion module 744 determines that one or more data blocks of a permanently stored plurality of data blocks 750 are to be deleted. The identify deletion module 744 identifies that the one or more data blocks of the permanently stored plurality of data blocks 750 are to be deleted by a variety of identification approaches. An identification approach of the variety of identification approaches includes a series of identification steps. A first identification step includes the identify deletion module 744 determining that at least one other DS unit (e.g., ingesting DS unit 733) of the set of DS units 730 is storing data blocks that are substantially similar to the one or more data blocks 750. For example, the identify deletion module 744 receives data block storage information 752 from at least one other ingesting DS unit 733 where the data block storage information 752 includes the at least one of the data blocks that are substantially similar to the one or more data blocks 750 and a representation (e.g., a result of a deterministic function applied to the one or more data blocks that are substantially similar) of the at least one of the data blocks that are substantially similar to the one or more data blocks 750. The example continues where the identify deletion module 744 determines that the at least one other DS unit is storing data blocks that are substantially similar to the one or more data blocks 750 when a comparison of the representation of the at least one of the data blocks that are substantially similar compares favorably (e.g., substantially the same) to a representation of the one or more data blocks 750.

A second identification step of the identification approach includes the identify deletion module 744, in response to the determining that the at least one other DS unit is storing data blocks that are substantially similar to the one or more data blocks 750, performs a series of sub-steps. A first sub-step includes the identify deletion module 744 determining whether a de-duplication function is to be applied to the one or more data blocks 750. The determining may be based on one or more of how many data blocks stored by the other DS units are substantially similar to the one or more data blocks 750, a desired maximum number of substantially similar data blocks, identities of the other DS units, task execution performance availability levels of the other DS units, storage capacity availability levels of the other DS units, a data type indicator, a lookup, a query, a replication goal, a storage goal, identity of the DS unit 732, and a performance goal. When the de-duplication function is to be applied, a second sub-step includes the identify deletion module 744 determining that the one or more data blocks 750 are to be deleted. When the de-duplication function is not to be applied, the second sub-step includes the identify deletion module 744 determining that the one or more data blocks 750 are not to be deleted.

Another identification approach of the variety of identification approaches includes a series of alternative identification steps. A first alternative identification step includes the identify deletion module 744 analyzing the permanently stored plurality of data blocks 750 in accordance with data analysis criteria. For example, the identify deletion module 744 compares the permanently stored plurality of data blocks 752 to a data file identifier of the data analysis criteria, determines that the permanently stored plurality of data blocks 750 is associated with the data file identifier, and indicates that the analysis is unfavorable. When the analysis of the permanently stored plurality of data blocks 750 is unfavorable, a second alternative identification step includes the identify deletion module 744 determining that the one or more data blocks 750 of the permanently stored plurality of data blocks are to be deleted.

With regards to permanently storing new data, the new data module 746, in response to the determining that the one or more data blocks 750 are to be deleted, performs a series of storing steps. In a first storing step, the new data module 746 obtains a group of partial redundancy data 754 for the permanently stored plurality of data blocks 750. The obtaining includes at least one of retrieving from memory 742, retrieving from the redundancy DS units 734-736, and generating based on the permanently stored plurality of data blocks 750 and in accordance with a dispersed storage error coding function. In a second storing step, the new data module 746 identifies a temporarily stored plurality of data blocks 756 for which partial redundancy data does not yet exist (e.g., based on at least one of a query, a lookup, and retrieving the temporarily stored plurality of data blocks 756 from memory 742). In a third storing step, the new data module 746 creates a new plurality of data blocks 758 from data blocks of the permanently stored plurality of data blocks 750 that are to remain permanently stored and data blocks from the temporarily stored plurality of data blocks 756 that are to be permanently stored (e.g., based on data block for deletion identification). In a fourth storing step, the new data module 746 permanently stores the new plurality of data blocks 758 (e.g., in the memory 742).

With regards to updating redundancy data, the new redundancy data module 748 performs a series of updating steps. In a first updating step, the new redundancy data module 748 generates a new group of partial redundancy data 760 based on the new plurality of data blocks 758 and in accordance with the dispersed storage error coding function. The new redundancy data module 748 generates the new group of partial redundancy data 760 based on the new plurality of data blocks 758 by a series of generating steps. A first generating step includes the new redundancy data module 748 generating a first partial redundancy data for issuing to a first redundancy DS unit 734 as part of the new group of partial redundancy data 760 based on at least some of the new plurality of data blocks 758 and a first encoding parameter of the dispersed storage error coding function. A second generating step includes the new redundancy data module 748 generating a second partial redundancy data for issuing to a second redundancy DS unit 736 as part of the new group of partial redundancy data 760 based on at least another some of the new plurality of data blocks 758 and a second encoding parameter of the dispersed storage error coding function.

The generating the first and second partial redundancy data may further include a variety of redundancy data generating approaches. A first redundancy data approach includes a series of steps. A first step includes arranging the new plurality of data blocks 758 in a single row data matrix. A second generating step includes multiplying the single row data matrix by a first value of a first error encoding row of an encoding matrix to produce the first partial redundancy data. A third step includes multiplying the single row data matrix by a second value of the first error encoding row to produce the second partial redundancy data. A second redundancy data approach includes an alternative series of steps. A first alternative step includes exclusive ORing a first sub-set of the one or more of the new plurality of data blocks 758 to produce the first partial redundancy data. A second alternative step includes exclusive ORing a second sub-set of the new plurality of data blocks 758 to produce the second partial redundancy data.

In a second updating step of updating the redundancy data, the new redundancy data module 748 sends the new group of partial redundancy data 760 and the group of partial redundancy data 754 such that the redundancy DS units 734-736 are able to generate redundancy data regarding the new plurality of data blocks 758. Alternatively, the new redundancy data module 748 performs an exclusiveOR function on the new group of partial redundancy data 760 and the group of partial redundancy data 754 to produce an alternative of the new redundancy data 760.

The redundancy DS units 734-736 generate the redundancy data by performing the exclusiveOR function on the group of partial redundancy data 754 and a previous redundancy data (e.g., stored by a corresponding redundancy DS unit) to produce an updated redundancy data that excludes redundancy data associated with the one or more data blocks 750. Next, the redundancy DS units 734-736 performs the exclusiveOR function on the updated redundancy data and the new group of partial redundancy data 760 to produce the redundancy data (e.g., now associated with the new plurality of data blocks 758).

Figure 48E:
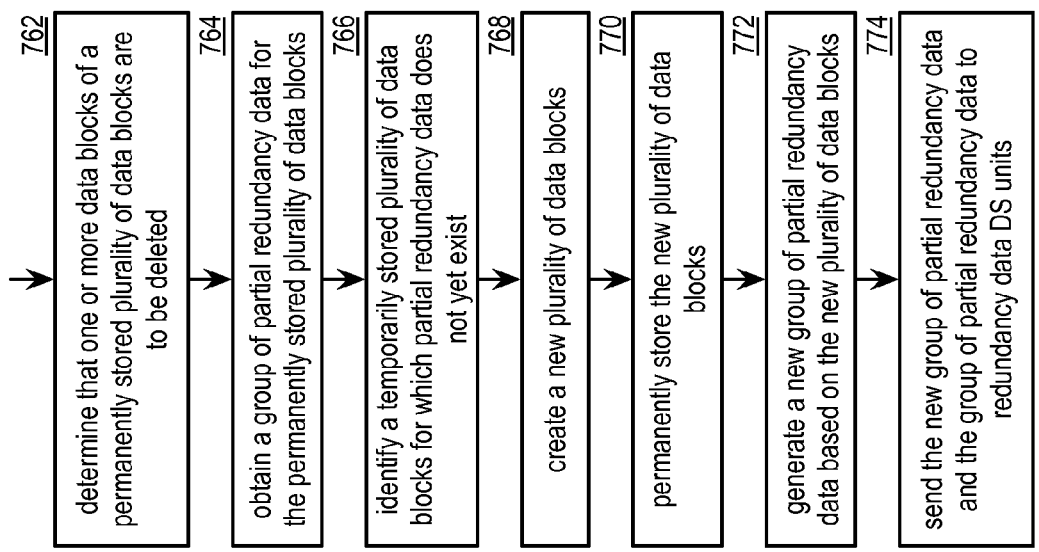
FIG. 48E is a flowchart illustrating another example of improving storage efficiency in accordance with the present invention.

FIG. 48E is a flowchart illustrating another example of improving storage efficiency. The method begins at step 762 where a processing module (e.g., of a dispersed storage (DS) unit of a set of DS units of a dispersed storage network (DSN)) determining that one or more data blocks of a permanently stored plurality of data blocks are to be deleted. The set of DS units ingests a large amount of data, where the large amount of data is divided into sets of partitions and each of the sets of partitions is divided into a set of sections. For each ingested respective section of data, a corresponding ingesting DS unit of the set of DS units divides the ingested respective section of data into a plurality of data segments (e.g., in accordance with a dispersed storage error coding function). For data segments of the plurality of data segments, the corresponding ingesting DS unit divides the data segment into a plurality of data blocks (e.g., a row of a data matrix) and stores the plurality of data blocks as the permanently stored plurality of data blocks.

The processing module determines that the one or more data blocks of the permanently stored plurality of data blocks are to be deleted by a variety of identification approaches. An identification approach of the variety of identification approaches includes a series of identification steps. A first identification step includes the processing module determining that at least one other DS unit (e.g., an ingesting DS unit) of the set of DS units is storing data blocks that are substantially similar to the one or more data blocks. For example, the processing module receives data block storage information from at least one other ingesting DS unit where the data block storage information includes the at least one of the data blocks that are substantially similar to the one or more data blocks and a representation (e.g., a result of a deterministic function applied to the one or more data blocks that are substantially similar) of the at least one of the data blocks that are substantially similar to the one or more data blocks. The example continues where the processing module determines that the at least one other DS unit is storing data blocks that are substantially similar to the one or more data blocks when a comparison of the representation of the at least one of the data blocks that are substantially similar compares favorably (e.g., substantially the same) to a representation of the one or more data blocks.

A second identification step of the identification approach includes the processing module, in response to the determining that the at least one other DS unit is storing data blocks that are substantially similar to the one or more data blocks, performs a series of sub-steps. A first sub-step includes determining whether a de-duplication function is to be applied to the one or more data blocks 750. The determining may be based on one or more of how many data blocks stored by the other DS units are substantially similar to the one or more data blocks, a desired maximum number of substantially similar data blocks, identities of the other DS units, task execution performance availability levels of the other DS units, storage capacity availability levels of the other DS units, a data type indicator, a lookup, a query, a replication goal, a storage goal, identity of the DS unit, and a performance goal. When the de-duplication function is to be applied, a second sub-step includes determining that the one or more data blocks are to be deleted. When the de-duplication function is not to be applied, the second sub-step includes determining that the one or more data blocks are not to be deleted.

Another identification approach of the variety of identification approaches includes a series of alternative identification steps. A first alternative identification step includes the processing module analyzing the permanently stored plurality of data blocks in accordance with data analysis criteria. For example, the processing module compares the permanently stored plurality of data blocks to a pattern of the data analysis criteria, determines that the permanently stored plurality of data blocks includes the pattern, and indicates that the analysis is unfavorable. When the analysis of the permanently stored plurality of data blocks is unfavorable, a second alternative identification step includes the processing module determining that the one or more data blocks of the permanently stored plurality of data blocks are to be deleted.

In response to the determining that the one or more data blocks are to be deleted, the method continues at step 764 where the processing module obtains a group of partial redundancy data for the permanently stored plurality of data blocks (e.g., generate, retrieve, receive). The method continues at step 766 where the processing module identifies a temporarily stored plurality of data blocks for which partial redundancy data does not yet exist (e.g., based on at least one of a query, a test, and receiving a message). The method continues at step 768 where the processing module creates a new plurality of data blocks from data blocks of the permanently stored plurality of data blocks that are to remain permanently stored and data blocks from the temporarily stored plurality of data blocks that are to be permanently stored (e.g., identifying data blocks that are not to be deleted from a previous identification of data blocks for deletion). The method continues at step 770 where the processing module permanently stores the new plurality of data blocks (e.g., stores in a permanent storage portion of a local memory).

The method continues at step 772 where the processing module generates a new group of partial redundancy data based on the new plurality of data blocks and in accordance with the dispersed storage error coding function. The processing module generates the new group of partial redundancy data based on the new plurality of data blocks by a series of generating steps. A first generating step includes the processing module generating a first partial redundancy data for issuing to a first redundancy DS unit as part of the new group of partial redundancy data based on at least some of the new plurality of data blocks and a first encoding parameter of the dispersed storage error coding function. A second generating step includes processing module generating a second partial redundancy data for issuing to a second redundancy DS unit as part of the new group of partial redundancy data based on at least another some of the new plurality of data blocks and a second encoding parameter of the dispersed storage error coding function.

The generating the first and second partial redundancy data may further include a variety of redundancy data generating approaches. A first redundancy data approach includes a series of steps. A first step includes arranging the new plurality of data blocks in a single row data matrix. A second generating step includes multiplying the single row data matrix by a first value of a first error encoding row of an encoding matrix to produce the first partial redundancy data. A third step includes multiplying the single row data matrix by a second value of the first error encoding row to produce the second partial redundancy data. A second redundancy data approach includes an alternative series of steps. A first alternative step includes exclusive ORing a first sub-set of the one or more of the new plurality of data blocks to produce the first partial redundancy data. A second alternative step includes exclusive ORing a second sub-set of the new plurality of data blocks to produce the second partial redundancy data.

The method continues at step 774 where the processing module sends the new group of partial redundancy data and the group of partial redundancy data such that redundancy data DS units are able to generate redundancy data regarding the new plurality of data blocks. Alternatively, the processing module an exclusiveOR function on the new group of partial redundancy data and the group of partial redundancy data to produce an alternative of the new redundancy data for issuing to the redundancy data DS units.

Figure 49:
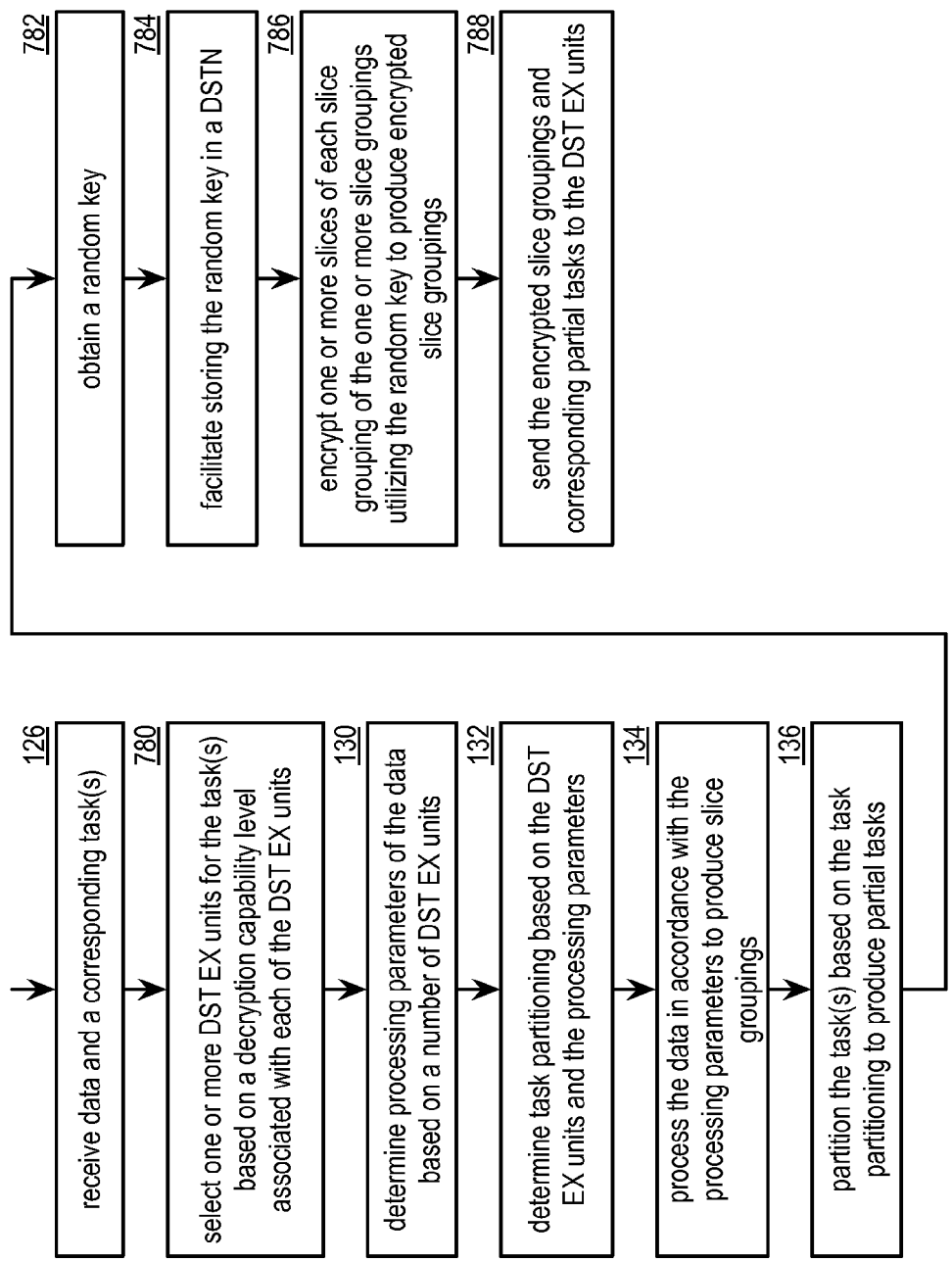
FIG. 49 is a flowchart illustrating an example of encrypting data in accordance with the present invention.

FIG. 49 is a flowchart illustrating an example of encrypting data, which includes similar steps to FIG. 5. The method begins with step 126 of FIG. 5 where a processing module (e.g., of a distributed storage and task (DST) client module) receives data and a corresponding task. The method continues at step 780 where the processing module selects one or more DST execution units from a plurality of DST execution units for execution of the task based on a decryption capability level associated with each of the one or more DST execution units. The selecting includes determining a desired number of DST execution units, obtaining decryption capability levels associated with at least some of the plurality of DST execution units, and selecting the desired number of DST execution units wherein each selected DST execution unit is associated with a corresponding encryption capability level that compares favorably with a desired decryption capability level. The decryption capability level includes one or more indicators for encryption algorithm support, key support, and availability. The processing module selects a DST execution unit when an associated decryption capability level includes required decryption capabilities (e.g., based on a lookup, based on the data, based on a received security requirement).

The method continues with steps 130-136 of FIG. 5 where the processing module determines processing parameters of the data based on the number of DST execution units, determines task partitioning based on the DST execution units in the processing parameters, processes the data in accordance with the processing parameters to produce slice groupings, and partitions the task based on the task partitioning to produce partial tasks. The method continues at step 782 where the processing module obtains a random key. The obtaining may be based on one or more of a random number generator, querying a random key generator, receiving the random key, and a lookup. The method continues at step 784 where the processing module facilitates storing the random key in a distributed storage and task network (DSTN). For example, the processing module dispersed storage error encodes the random key utilizing an all or nothing transformation followed by application of an information dispersal algorithm to produce a set of encoded key slices and sends the set of encoded key slices to the DSTN for storage therein. As another example, the processing module generates a store securely task request and sends the store securely task request and the random key to a DST client module to store the random key in the DSTN.

The method continues at step 786 where the processing module encrypts one or more slices of each slice groupings of the one more slice groupings utilizing the random key to produce encrypted slice groupings. For example, the processing module encrypts a first slice of slice grouping 1 to produce a first encrypted slice of encrypted slice grouping 1, encrypts a second slice of slice grouping 1 to produce a second encrypted slice of encrypted slice grouping 1, encrypts a third slice of slice grouping 1 to produce a third encrypted slice of encrypted slice grouping 1, etc. The method continues at step 788 where the processing module sends the encrypted slice groupings and corresponding partial tasks to the DST execution units.

Figure 50:
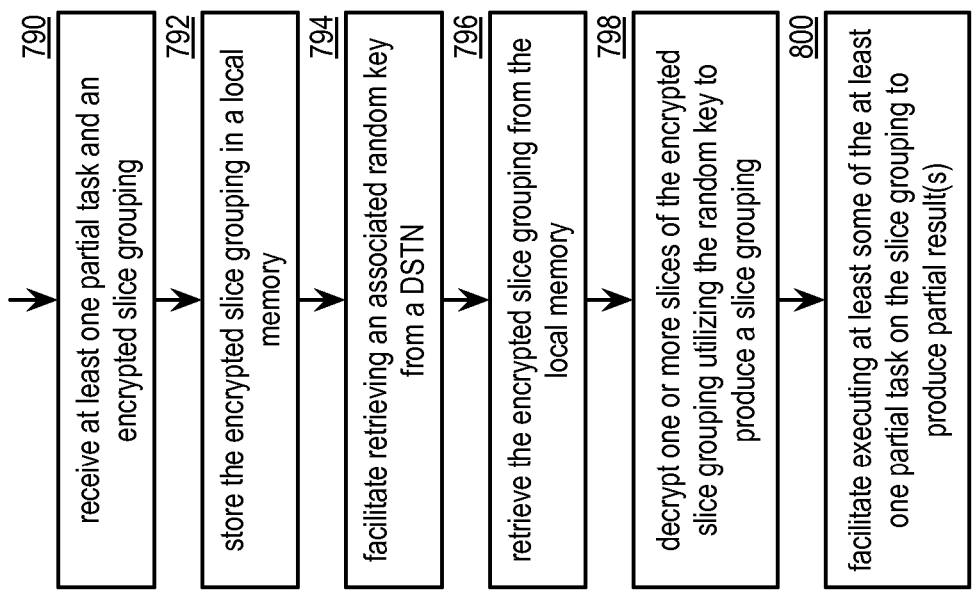
FIG. 50 is a flowchart illustrating an example of decrypting data in accordance with the present invention.

FIG. 50 is a flowchart illustrating an example of decrypting data. The method begins at step 790 where a processing module (e.g., of a distributed storage and task (DST) execution unit) receives at least one partial task and an encrypted slice grouping (e.g., from a DST client module). The method continues at step 792 where the processing module stores the encrypted slice grouping in a local memory. The method continues at step 794 where the processing module facilitates retrieving an associated random key from a distributed storage and task network (DSTN). The retrieving includes identifying at least a decode threshold number of DST execution units associated with storing random key, sending a retrieval request to the decode threshold number of DST execution units, receiving at least a decode threshold number of retrieval responses, and decoding the at least the decode threshold number of retrieval responses to reproduce the associated random key. The identifying may be based on one or more of interpreting an embedded associated random key identifier (e.g., a DSTN address source name) from at least one of the one partial task and the encrypted slice grouping and receiving a storage location of the associated random key.

The method continues at step 796 where the processing module retrieves the encrypted slice grouping from the local memory. The method continues at step 798 where the processing module decrypts one or more slices of the encrypted slice grouping utilizing the random key to produce a slice grouping. For example, the processing module decrypts a first encrypted slice of encrypted slice grouping 1 to produce a first slice of slice grouping 1, decrypts a second encrypted slice of encrypted slice grouping 1 to produce a second slice of slice grouping 1, etc. The method continues at step 800 where the processing module facilitates executing at least some of the at least one partial task on the slice grouping to produce at least one partial result.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A distributed method having a processing unit for securely and reliably storing large amounts of data, the method comprises:
   storing, by ingesting dispersed storage (DS) units of a set of DS units, respective portions of the large amounts of data based on a data partitioning agreement of the set of DS units;
   generating, by each of the ingesting DS units, first respective partial redundancy data and second respective partial redundancy data for the respective portion of the large amounts of data;
   sending, by each of the ingesting DS units, the first respective partial redundancy data to a first redundancy DS unit of the set of DS units;
   sending, by each of the ingesting DS units, the second respective partial redundancy data to a second redundancy DS unit of the set of DS units;
   performing, by the first redundancy DS unit, a first portion of a dispersed storage error encoding function to combine the first respective partial redundancy data of each of the ingesting DS units to generate first respective redundancy data;
   storing, by the first redundancy DS unit, the first respective redundancy data;
   performing, by the second redundancy DS unit, a second portion of the dispersed storage error encoding function to combine the second respective partial redundancy data of each of the ingesting DS units to generate second respective redundancy data;
   storing, by the second redundancy DS unit, the second respective redundancy data.

2. The method of claim 1 further comprises:
   generating, by a first ingesting DS unit of the ingesting DS units, the first and second respective partial redundancy data of the first ingesting DS unit by:
   dividing a respective portion of the large amounts of data into a plurality of data segments in accordance with the data partitioning agreement;
   for each of the plurality of data segments:
     dividing a current data segment into a set of data blocks in accordance with the data partitioning agreement;
     arranging the set of data blocks in a single row data matrix;
     multiplying the single row data matrix by a first value of a first error encoding row of an encoding matrix to produce first partial redundancy data for the current data segment; and
     multiplying the single row data matrix by a second value of the first error encoding row to produce second partial redundancy data for the current data segment;
   combining the first partial redundancy data for each of the current data segments to produce the first respective redundancy data of the first ingesting DS unit; and
   combining the second partial redundancy data for each of the current data segments to produce the second respective redundancy data of the first ingesting DS unit.

3. The method of claim 1 further comprises:
   generating, by a second ingesting DS unit of the ingesting DS units, the first and second respective partial redundancy data of the second ingesting DS unit by:
   dividing a second respective portion of the large amounts of data into a plurality of data segments in accordance with the data partitioning agreement;
   for each of the plurality of data segments:
     dividing a current data segment into a set of data blocks in accordance with the data partitioning agreement;
     arranging the set of data blocks in a single row data matrix;
     multiplying the single row data matrix by a first value of a second error encoding row of the encoding matrix to produce first partial redundancy data for the current data segment; and
     multiplying the single row data matrix by a second value of the second error encoding row to produce second partial redundancy data for the current data segment;
   cumulating the first partial redundancy data for each of the current data segments to produce the first respective redundancy data of the second ingesting DS unit; and cumulating the second partial redundancy data for each of the current data segments to produce the second respective redundancy data of the second ingesting DS unit.

4. The method of claim 1 further comprises:
generating, by a first ingesting DS unit of the ingesting DS units, the first and second respective partial redundancy data of the first ingesting DS unit by:
dividing a respective portion of the large amounts of data into a plurality of data segments in accordance with the data partitioning agreement;
for each of the plurality of data segments:
dividing a current data segment into a set of data blocks in accordance with the data partitioning agreement;
exclusive ORing a first sub-set of the set of data blocks to produce first partial redundancy data for the current data segment; and
exclusive ORing a second sub-set of the set of data blocks to produce second partial redundancy data for the current data segment;
combining the first partial redundancy data for each of the current data segments to produce the first respective redundancy data of the first ingesting DS unit; and
combining the second partial redundancy data for each of the current data segments to produce the second respective redundancy data of the first ingesting DS unit.

5. The method of claim 1 further comprises:
generating, by a second ingesting DS unit of the ingesting DS units, the first and second respective partial redundancy data of the second ingesting DS unit by:
dividing a respective portion of the large amounts of data into a plurality of data segments in accordance with the data partitioning agreement;
for each of the plurality of data segments:
dividing a current data segment into a set of data blocks in accordance with the data partitioning agreement;
exclusive ORing a first sub-set of the set of data blocks to produce first partial redundancy data for the current data segment; and
exclusive ORing a second sub-set of the set of data blocks to produce second partial redundancy data for the current data segment;
combining the first partial redundancy data for each of the current data segments to produce the first respective redundancy data of the second ingesting DS unit; and
combining the second partial redundancy data for each of the current data segments to produce the second respective redundancy data of the second ingesting DS unit.

6. The method of claim 1, wherein the data partitioning agreement comprises at least one of:
an indication of a dispersed storage error coding function;
an addressing scheme for storing the respective portions of the large amounts of data;
a data segment size indication;
an indicator for data block size and data block quantity per data segment;
a number of ingesting DS units;
a number of redundancy DS units; and
a logical division of the large amounts of data to identify the respective portions.

7. The method of claim 1 further comprises:
storing, by second ingesting distributed storage (DS) units of the set of DS units, respective portions of a second large amount of data based on a second data partitioning agreement of the set of DS units;
generating, by each of the second ingesting DS units, another first respective partial redundancy data and another second respective partial redundancy data for the respective portion of the second large amount of data;
sending, by each of the second ingesting DS units, the other first respective partial redundancy data to another first redundancy DS unit of the set of DS units;
sending, by each of the second ingesting DS units, the other second respective partial redundancy data to another second redundancy DS unit of the set of DS units;
generating, by the other first redundancy DS unit, other first respective redundancy data based on the other first respective partial redundancy data of each of the second ingesting DS units;
storing, by the other first redundancy DS unit, the other first respective redundancy data;
generating, by the other second redundancy DS unit, other second respective redundancy data based on the other second respective partial redundancy data of each of the second ingesting DS units; and
storing, by the other second redundancy DS unit, the other second respective redundancy data.

8. A method for execution by a dispersed storage (DS) unit having a processing unit, the method comprises:
determining whether the DS unit is an ingesting DS unit or a redundancy DS unit of a set of DS units based on a data partitioning agreement of the set of DS units;
when the DS unit is the ingesting DS unit:
storing a respective portion of large amounts of data in accordance with the data partitioning agreement of the set of DS units;
generating first and second respective partial redundancy data based on the respective portion of the large amounts of data;
sending the first respective partial redundancy data to a first redundancy DS unit of the set of DS units; and
sending the second respective partial redundancy data to a second redundancy DS unit of the set of DS units; and
when the DS unit is the redundancy DS unit:
performing a portion of a dispersed storage error encoding function to combine the respective partial redundancy data of each of the ingesting DS units to generate respective redundancy data;
storing the respective redundancy data.

9. The method of claim 8, wherein the generating the first and second respective partial redundancy data comprises:
dividing the respective portion of the large amounts of data into a plurality of data segments in accordance with the data partitioning agreement;
for each of the plurality of data segments:
dividing a current data segment into a set of data blocks in accordance with the data partitioning agreement;
arranging the set of data blocks in a single row data matrix;
multiplying the single row data matrix by a first value of a first error encoding row of an encoding matrix to produce first partial redundancy data for the current data segment; and
multiplying the single row data matrix by a second value of the first error encoding row to produce second partial redundancy data for the current data segment;

combining the first partial redundancy data for each of the current data segments to produce the first respective redundancy data; and combining the second partial redundancy data for each of the current data segments to produce the second respective redundancy data.

10. The method of claim 8, wherein the generating the first and second respective partial redundancy data comprises:

dividing the respective portion of the large amounts of data into a plurality of data segments in accordance with the data partitioning agreement;

for each of the plurality of data segments:
dividing a current data segment into a set of data blocks in accordance with the data partitioning agreement;
exclusive ORing a first sub-set of the set of data blocks to produce first partial redundancy data for the current data segment; and
exclusive ORing a second sub-set of the set of data blocks to produce second partial redundancy data for the current data segment;

combining the first partial redundancy data for each of the current data segments to produce the first respective redundancy data; and combining the second partial redundancy data for each of the current data segments to produce the second respective redundancy data.

11. A dispersed storage (DS) module of a dispersed storage (DS) unit, the DS module comprises:

a first module, when executed within a computing device, causes the computing device to:
determine whether the DS unit is an ingesting DS unit or a redundancy DS unit of a set of DS units based on a data partitioning agreement of the set of DS units;

a second module, when executed within the computing device, causes the computing device to:
when the DS unit is the ingesting DS unit:
store a respective portion of large amounts of data in accordance with the data partitioning agreement of the set of DS units;
generate first and second respective partial redundancy data based on the respective portion of the large amounts of data;
send the first respective partial redundancy data to a first redundancy DS unit of the set of DS units; and
send the second respective partial redundancy data to a second redundancy DS unit of the set of DS units; and a third module, when executed within the computing device, causes the computing device to:
when the DS unit is the redundancy DS unit:
performing a portion of a dispersed storage error encoding function to combine the respective partial redundancy data of each of the ingesting DS units to generate respective redundancy data;
store the respective redundancy data; and wherein the dispersed storage (DS) module, the first, second, and third modules are stored on a memory and executed by a processing unit of the computing device.

12. The DS module of claim 11, wherein the second module functions to generate the first and second respective partial redundancy data by:

dividing the respective portion of the large amounts of data into a plurality of data segments in accordance with the data partitioning agreement;

for each of the plurality of data segments:
dividing a current data segment into a set of data blocks in accordance with the data partitioning agreement;
arranging the set of data blocks in a single row data matrix;
multiplying the single row data matrix by a first value of a first error encoding row of an encoding matrix to produce first partial redundancy data for the current data segment; and
multiplying the single row data matrix by a second value of the first error encoding row to produce second partial redundancy data for the current data segment;

combining the first partial redundancy data for each of the current data segments to produce the first respective redundancy data; and combining the second partial redundancy data for each of the current data segments to produce the second respective redundancy data.

13. The DS module of claim 11, wherein the second module functions to generate the first and second respective partial redundancy data by:

dividing the respective portion of the large amounts of data into a plurality of data segments in accordance with the data partitioning agreement;

for each of the plurality of data segments:
dividing a current data segment into a set of data blocks in accordance with the data partitioning agreement;
exclusive ORing a first sub-set of the set of data blocks to produce first partial redundancy data for the current data segment; and
exclusive ORing a second sub-set of the set of data blocks to produce second partial redundancy data for the current data segment;

combining the first partial redundancy data for each of the current data segments to produce the first respective redundancy data; and combining the second partial redundancy data for each of the current data segments to produce the second respective redundancy data.

* * * * *